US010526066B2

(12) United States Patent
Suzuki et al.

(10) Patent No.: US 10,526,066 B2
(45) Date of Patent: Jan. 7, 2020

(54) AIRCRAFT, CONTROLLER AND CONTROL METHOD OF AIRCRAFT, AND RECORDING MEDIUM STORING COMPUTER SOFTWARE PROGRAM FOR CONTROLLING AIRCRAFT

(71) Applicant: Hideo Suzuki, Chibashi, Chiba (JP)

(72) Inventors: Hideo Suzuki, Chibashi (JP); Sachihiro Suzuki, Takigun (JP); Kotaro Matsushita, Tokyo (JP); Masaki Hanada, Tokyo (JP); Toru Shinohara, Chibashi (JP); Noriko Niijima, Tokyo (JP); Tadao Nakamura, Sendai (JP)

(73) Assignee: Hideo Suzuki, Chiba (JP)

( * ) Notice: Subject to any disclaimer, the term of this patent is extended or adjusted under 35 U.S.C. 154(b) by 0 days.

(21) Appl. No.: 16/398,344

(22) Filed: Apr. 30, 2019

(65) Prior Publication Data
US 2019/0256191 A1    Aug. 22, 2019

Related U.S. Application Data

(63) Continuation of application No. PCT/JP2017/039804, filed on Nov. 2, 2017.

(30) Foreign Application Priority Data

Nov. 4, 2016   (JP) .................................. 2016-226317
Jul. 7, 2017    (WO) .................. PCT/JP2017/024917

(51) Int. Cl.
*B64C 9/06*       (2006.01)
*B64D 27/02*   (2006.01)
(Continued)

(52) U.S. Cl.
CPC ................ *B64C 9/06* (2013.01); *B64C 17/00* (2013.01); *B64C 19/02* (2013.01);
(Continued)

(58) Field of Classification Search
CPC ..... B64C 17/00; B64C 19/02; B64C 29/0016; B64D 27/02
See application file for complete search history.

(56) References Cited

U.S. PATENT DOCUMENTS 3,002,712 A * 10/1961 Beckwith ................ B64C 27/20
                                                        244/17.23
8,646,720 B2 * 2/2014 Shaw .................. B64C 29/0025
                                                        244/17.23
(Continued)

FOREIGN PATENT DOCUMENTS

JP        2006-051841 A        2/2006
JP        2010-075568 A        4/2010
(Continued)

*Primary Examiner* — Justin M Benedik
(74) *Attorney, Agent, or Firm* — Metrolex IP Law Group, PLLC

(57) ABSTRACT

An aircraft encompasses a main-body, a frame-structure to support the main-body, main and auxiliary rotors provided to the frame-structure and a controller for controlling rotations of the main and auxiliary rotors. In a first mode, the controller delivers a same control signal for rotating the set of the main and auxiliary rotors, and when one of the main and auxiliary rotors becomes abnormal, the controller delivers the same control signal for compensating a decrease of the lift. In a second mode, the controller delivers a control signal only to the normal rotor for increasing the rotation of the normal rotor. Sets of the main and auxiliary rotors in divided regions adjacent to a subject divided region are rotated in a direction counter to the subject divided region. By the first and second modes, the lifts are equalized for balancing the aircraft.

16 Claims, 51 Drawing Sheets

(51) Int. Cl.
*B64C 19/02* (2006.01)
*B64C 17/00* (2006.01)
*B64C 29/00* (2006.01)

(52) U.S. Cl.
CPC .......... *B64C 29/0016* (2013.01); *B64D 27/02* (2013.01); *B64C 2201/14* (2013.01)

(56) References Cited

U.S. PATENT DOCUMENTS

| | | | |
|---|---|---|---|
| 9,242,714 B2 * | 1/2016 | Wang | B64C 39/028 |
| 9,388,794 B2 * | 7/2016 | Weddendorf | F03D 5/00 |
| 9,856,016 B2 | 1/2018 | Mueller et al. | |
| 2006/0266881 A1 * | 11/2006 | Hughey | B64C 27/08 |
| | | | 244/17.23 |
| 2009/0008499 A1 * | 1/2009 | Shaw | B64C 27/20 |
| | | | 244/17.23 |
| 2016/0107751 A1 | 4/2016 | D'Andrea et al. | |
| 2016/0122018 A1 | 5/2016 | Matsue et al. | |
| 2016/0272312 A1 | 9/2016 | Mallard | |
| 2017/0036762 A1 * | 2/2017 | Gamble | B64C 27/08 |
| 2018/0354623 A1 * | 12/2018 | Bhat | B64C 17/00 |

FOREIGN PATENT DOCUMENTS

| | | |
|---|---|---|
| JP | 2013-189036 A | 9/2013 |
| JP | 2016-060468 A | 4/2016 |
| JP | 2016-88111 A | 5/2016 |
| JP | 2016-88121 A | 5/2016 |
| JP | 2016-524567 A | 8/2016 |

\* cited by examiner

AIRCRAFT, CONTROLLER AND CONTROL METHOD OF AIRCRAFT, AND RECORDING MEDIUM STORING COMPUTER SOFTWARE PROGRAM FOR CONTROLLING AIRCRAFT

CROSS REFERENCE TO RELATED APPLICATIONS AND INCORPORATION BY REFERENCE

This application is a continuation application of International Application No. PCT/JP2017/039804, filed on Nov. 2, 2017 and claims benefit of priority under 35 USC 119 based on Japanese Patent Application No. P2016-226317 filed on Nov. 4, 2016, and PCT Application No. PCT/JP2017/024917 filed on Jul. 7, 2017, the entire contents of all of which are incorporated by reference herein.

BACKGROUND OF THE INVENTION

1. Field of the Invention

The present invention relates to aircrafts including a vertical take-off and landing (VTOL) aircraft, a controller and a control method of the VTOL aircraft, and a recording medium storing computer software program for controlling the VTOL aircraft.

2. Description of the Related Art

A drone has been developed as an unmanned multicopter, and the governments of the various nations have been pursuing a policy such as formulating standards of license. However, as the multicopter spreads rapidly, the number of crashes of VTOL aircrafts such as multicopters is increased. Thus, an aircraft capable of reducing a risk of a crash maximally is desired.

SUMMARY OF THE INVENTION

A first aspect of the present invention inheres in an aircraft configured to take-off and land vertically, encompassing (a) a main-body, in which a gravity center is defined in a planar pattern, (b) a frame-structure configured to support the main-body, generating lifts in a same direction independently in each of a plurality of divided regions, which are defined around the gravity center, (c) a plurality of main rotors rotating around corresponding first rotation shafts, respectively, each of the main rotors is provided to the frame-structure, being assigned in each of the plurality of divided regions, (d) a plurality of auxiliary rotors rotating around corresponding second rotation shafts, respectively, each of the second rotation shafts is provided to the frame-structure and is rotated by a power-drive system independent from a power-drive system for the first rotation shaft, in each divided regions selected from the plurality of divided regions, the auxiliary rotor rotated in a same direction as the main rotor, and (e) a controller configured to control rotations of the main and auxiliary rotors with first and second modes, such that in the first mode, the controller delivers a same control signal for rotating the set of the main and auxiliary rotors in each of the plurality of divided regions at a same rotation frequency, and when one of the main and auxiliary rotors in any one of the plurality of divided regions becomes abnormal and a value of lift in an abnormal divided region becomes insufficient, the controller delivers the same control signal for increasing a rotation of a normal rotor other than the abnormal rotor for compensating a decrease of the lift by the abnormal rotor, and that in the second mode, the controller delivers a control signal only to the normal rotor for increasing the rotation of the normal rotor.

In the aircraft pertaining to the first aspect of the present invention, sets of the main and auxiliary rotors in divided regions adjacent to a subject divided region are controlled to be rotated in a direction counter to a rotation direction of the main rotor in the subject divided region. And furthermore, in the aircraft pertaining to the first aspect of the present invention, in the first and second modes, the lifts of any set of the divided regions, in which the rotation directions counter to each other, are equalized for balancing an orientation of the aircraft about a yaw axis, and furthermore, the lifts in all of the plurality of divided regions are equalized for balancing the orientation about a roll axis and a pitch axis.

A second aspect of the present invention inheres in a method for controlling an aircraft configured to take-off and land vertically, the aircraft encompassing a main-body in which a gravity center for first to fourth quadrants is defined in a planar pattern, a frame-structure for supporting the main-body, four sets of main and auxiliary rotors allocated in the first to fourth quadrants, and a rotation direction of the set of the main and auxiliary rotors in the second and fourth quadrants is opposite to a rotation direction of the main rotor in the first quadrant.

The method pertaining to the second aspect of the present invention includes (a) rotating the main rotors being arranged with rotation shafts, which are allocated to the frame-structure, in each of the first to fourth quadrants for lifting the main-body in a same direction, independently in each of the first to fourth quadrants, (b) rotating the auxiliary rotors being arranged with rotation shafts, which are allocated to the frame-structure in each of the first to fourth quadrants and are rotated in a same rotation direction as the main rotor, respectively, by power-drive systems independent from power-drive systems of the main rotors, and (c) controlling rotations of the main and auxiliary rotors with first and second modes, such that in the first mode, by delivering a same control signal for rotating the set of the main and auxiliary rotors in the first to fourth quadrants at a same rotation frequency, and when one of the main and auxiliary rotors in any one of the first to fourth quadrants becomes abnormal and a value of lift in an abnormal quadrant becomes insufficient, delivering the same control signal for increasing a rotation of a normal rotor other than the abnormal rotor for compensating a decrease of the lift by the abnormal rotor, and that in the second mode, delivering a control signal only to the normal rotor for increasing the rotation of the normal rotor.

In the method pertaining to the second aspect of the present invention, values of lifts in each of the two quadrants having the rotation directions counter to each other are equalized for balancing an orientation of the aircraft about a yaw axis, and values of lifts in each of the first to fourth quadrants are equalized for balancing the orientation about a roll axis and a pitch axis.

A third aspect of the present invention inheres in a controller for controlling an aircraft configured to take-off and land vertically, the aircraft encompassing a main-body in which a gravity center for first to fourth quadrants is defined in a planar pattern, a frame-structure for supporting the main-body, four sets of main and auxiliary rotors allocated in the first to fourth quadrants to the frame-structure.

The controller pertaining to the third aspect of the present invention encompasses (a) a flight controller configured to rotate the main and auxiliary rotors, the auxiliary rotor is rotated by a power-drive system independent from a power-drive system of the main rotor, to generate lifts in a same direction independently in the first to fourth quadrants, and (b) a line-control unit configured to rotate the set of the main and auxiliary rotors in each of the first to fourth quadrants, operating with first and second modes, such that in the first mode, by delivering a same control signal for rotating the set of the main and auxiliary rotors at a same rotation frequency, and when one of the main and auxiliary rotors in any one of the first to fourth quadrants becomes abnormal and a value of lift in an abnormal quadrant becomes insufficient, the line-control unit delivers the same control signal for increasing a rotation of a normal rotor other than the abnormal rotor for compensating a decrease of the lift by the abnormal rotor, and that in the second mode, the line-control unit delivers a control signal only to the normal rotor for increasing the rotation of the normal rotor.

In the controller pertaining to the third aspect of the present invention, rotation direction of the set of the main and auxiliary rotors in the second and fourth quadrants is opposite to a rotation direction of the main rotor in the first quadrant, and a rotation direction of the set of the main and auxiliary rotors in the second and fourth quadrants is a same as the rotation direction of the main rotor in the first quadrant. Furthermore, in the controller pertaining to the third aspect of the present invention, values of the lifts in each of the two quadrants having the rotation directions counter to each other are equalized for balancing an orientation of the aircraft about a yaw axis, and values of the lifts in the first to fourth quadrants are equalized for balancing the orientation about a roll axis and a pitch axis.

A fourth aspect of the present invention inheres in a recording medium for storing a control program of an aircraft configured to take-off and land vertically, the aircraft encompassing a main-body in which a gravity center for first to fourth quadrants is defined in a planar pattern, a frame-structure for supporting the main-body, four sets of main and auxiliary rotors allocated in the first to fourth quadrants, and a rotation direction of the set of the main and auxiliary rotors in the second and fourth quadrants is opposite to a rotation direction of the main rotor in the first quadrant.

The control program pertaining to the fourth aspect of the present invention causes a computer to execute processing for controlling the aircraft by a series of instructions, which includes (a) instructions of rotating the main rotors being arranged with rotation shafts, which are allocated to the frame-structure, in each of the first to fourth quadrants for lifting the main-body in a same direction, independently in each of the first to fourth quadrants, (b) instructions of rotating the auxiliary rotors being arranged with rotation shafts, which are allocated to the frame-structure in each of the first to fourth quadrants and are rotated in a same rotation direction as the main rotor, respectively, by power-drive systems independent from power-drive systems of the main rotors, and (c) instructions of controlling rotations of the main and auxiliary rotors with first and second modes, such that in the first mode, by delivering a same control signal for rotating the set of the main and auxiliary rotors in the first to fourth quadrants at a same rotation frequency, and when one of the main and auxiliary rotors in any one of the first to fourth quadrants becomes abnormal and a value of lift in an abnormal quadrant becomes insufficient, delivering the same control signal for increasing a rotation of a normal rotor other than the abnormal rotor for compensating a decrease of the lift by the abnormal rotor, and that in the second mode, delivering a control signal only to the normal rotor for increasing the rotation of the normal rotor.

In the control program pertaining to the fourth aspect of the present invention, by the control program, the computer executes processing for equalizing values of lifts in each of the two quadrants having the rotation directions counter to each other so that an orientation of the aircraft about a yaw axis are balanced, and for equalizing values of lifts in each of the first to fourth quadrants so that the orientation about a roll axis and a pitch axis are balanced.

A fifth aspect of the present invention inheres in an aircraft having a plurality of dense rotors, the dense rotors includes a main rotor rotating around a first rotation shaft and an auxiliary rotor rotating around a second rotation shaft, the second rotation shaft is parallelly away from the first rotation shaft in a cross sectional plane vertical to a rotation plane of the main rotor, the second rotation shaft is rotated by a power-drive system independent from the first rotation shaft, the auxiliary rotor rotates in a same direction as the main rotor, the rotation planes of the main and auxiliary rotors are away from each other in the cross sectional plane, and the rotation planes of the first and auxiliary rotors partially overlap with each other.

The aircraft pertaining to the fifth aspect of the present invention encompasses (a) an airframe in which a gravity center for first to fourth quadrants is defined in a planar pattern, (b) a main wing configured to generate lifts by advancement of the airframe, the main wing being fixed to a center of the airframe, (c) a plurality of the dense rotors arranged in the first to fourth quadrants to generate lifts in a same direction independently in the first to fourth quadrants, and (d) a controller configured to control rotations of the dense rotors with first and second modes, such that in the first mode, the controller delivers a same control signal for rotating the dense rotors in each of the first to fourth quadrants at a same rotation frequency, and when one of the main and auxiliary rotors in any one of the first to fourth quadrants becomes abnormal and a value of lift in an abnormal quadrant becomes insufficient, the controller delivers the same control signal for increasing a rotation of a normal rotor other than the abnormal rotor for compensating a decrease of the lift by the abnormal rotor, and that in the second mode, the controller delivers a control signal only to the normal rotor for increasing the rotation of the normal rotor.

In the aircraft pertaining to the fifth aspect of the present invention, the dense rotors in another quadrant adjacent to a first quadrant are rotated in a direction counter to a rotation direction of the dense rotor in the first quadrant, and values of the lifts in each of the two quadrants having the rotation directions counter to each other are equalized for balancing an orientation of the aircraft about a yaw axis, and the values of the lifts in the first to fourth quadrants are equalized for balancing the orientation about a roll axis and a pitch axis.

DETAILED DESCRIPTION OF THE INVENTION

Figure 1:
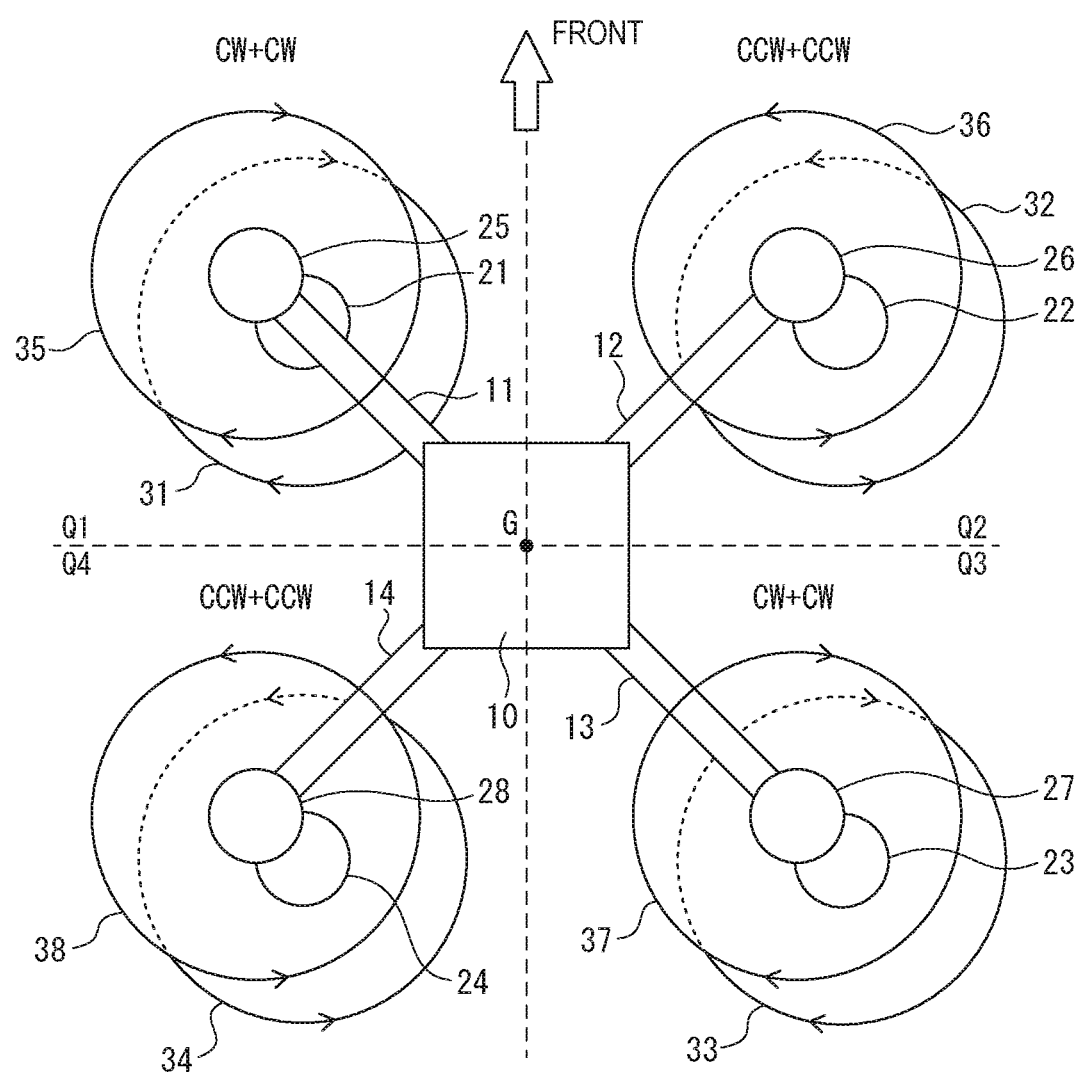
FIG. 1 is a schematic top view illustrating a basic configuration of an aircraft, or a VTOL aircraft according to a first embodiment of the present invention.

With reference to the drawings, first to ninth embodiments of the present invention are described. It is to be noted that the same or similar reference numerals are applied to the same or similar parts and elements throughout the drawings, and the description of the same or similar parts and elements will be omitted or simplified. However, the drawings are schematic, and dimensional relationships and ratios are different from the reality in some cases. Further, parts that have dimensional relationships and ratios different among the drawings may be included. Further, in the first to ninth embodiments described below, a device and a method for achieving the technical idea of the present invention are exemplified. In the technical idea of the present invention, a shape, a structure, arrangement, and the like of the components are not specified by those described below.

First Embodiment

As illustrated in FIG. 1, an aircraft according to a first embodiment of the present invention is an octocopter, which is classified as a VTOL aircraft. The aircraft according to the first embodiment includes a main-body 10, a frame-structure (11, 12, 13 and 14) configured to support the main-body 10 disposed at a center of the frame-structure (11 to 14), and eight rotors (propellers) 31, 32, . . . , and 38 arranged to the frame-structure (11 to 14). In a planar pattern, a gravity center G, or a quadrant center G, is defined in the inside of the main-body 10. The frame-structure (11 to 14) supports the main-body 10 so as to generate a plurality of lifts in the same direction independently in each of a first divided region (quadrant) Q1, a second divided region (quadrant) Q2, a third divided region (quadrant) Q3, and a fourth divided region (quadrant) Q4, which surround the gravity center G. Each of the rotors 31 to 38 rotates in a direction of generating an upward lift. Note that, in FIG. 1, the rotors 31 to 38 are schematically illustrated as rotation planes.

For example, the rotors 31 to 38 are classified into two groups including the main rotors 31 to 34 positioned in lower levels and the auxiliary rotors 35 to 38 positioned in upper levels of the main rotors 31 to 34, respectively. Note that, the "main rotor" and the "auxiliary rotor" in the present invention are merely selections of names for convenience. The "main rotor" may be assigned as the "auxiliary rotor," and the "auxiliary rotor" may be assigned as the "main rotor" by replacing the names. The main rotors (first rotors) 31 to 34 are arranged with rotation shafts provided to the frame-structure (11 to 14) in the first quadrant Q1, the second quadrant Q2, the third quadrant Q3, and the fourth quadrant Q4, respectively. The auxiliary rotors (second rotors) 35 to 38 are arranged with rotation shafts provided to the frame-structure (11 to 14) in the first quadrant Q1, the second quadrant Q2, the third quadrant Q3, and the fourth quadrant Q4, respectively. The auxiliary rotors 35 to 38 are rotated in the same direction as the main rotors 31 to 34 in the first quadrant Q1, the second quadrant Q2, the third quadrant Q3, and the fourth quadrant Q4, respectively.

Specifically, the main rotor 31 and the auxiliary rotor 35 arranged in the first quadrant Q1 and the main rotor 33 and the auxiliary rotor 37 arranged in the third quadrant Q3 are rotated in clockwise directions (CW) when seen from above the frame-structure (11 to 14). Meanwhile, the main rotor 32 and the auxiliary rotor 36 arranged in the second quadrant Q2 and the main rotor 34 and the auxiliary rotor 38 arranged in the fourth quadrant Q4 are rotated in counter-clockwise directions (CCW). That is, the rotation directions in the first quadrant Q1 and the third quadrant Q3 is a counter to the rotation directions in the second quadrant Q2 and the fourth quadrant Q4.

In FIG. 1, a pair of the main rotor 31 and the auxiliary rotor 35, a pair of the main rotor 32 and the auxiliary rotor 36, a pair of the main rotor 33 and the auxiliary rotor 37, and a pair of the main rotor 34 and the auxiliary rotor 38 are schematically illustrated so as to have first and second rotation shafts and first and second rotation planes different from each other for easy understanding. Each of the second rotation shafts is supposed to be rotated by a power-drive system independent from a power-drive system for the first rotation shaft. However, in the reality, each pair of the main rotor 31 and the auxiliary rotor 35, the main rotor 32 and the auxiliary rotor 36, the main rotor 33 and the auxiliary rotor 37, and the main rotor 34 and the auxiliary rotor 38 is arranged to have the coaxial rotation shafts and has a double-level structure. Even with the coaxial rotation shaft, each of the auxiliary rotors can be rotated by a power-drive system independent from a power-drive system for each of the main rotors. As described above, in each of the quadruple divided regions or the quadrants, the double rotor, which have the same rotation shafts and are rotated in the same directions, are arranged. The rotation direction in a subject divided region is counter to those in the adjacent divided regions to the subject divided region.

Figure 2:
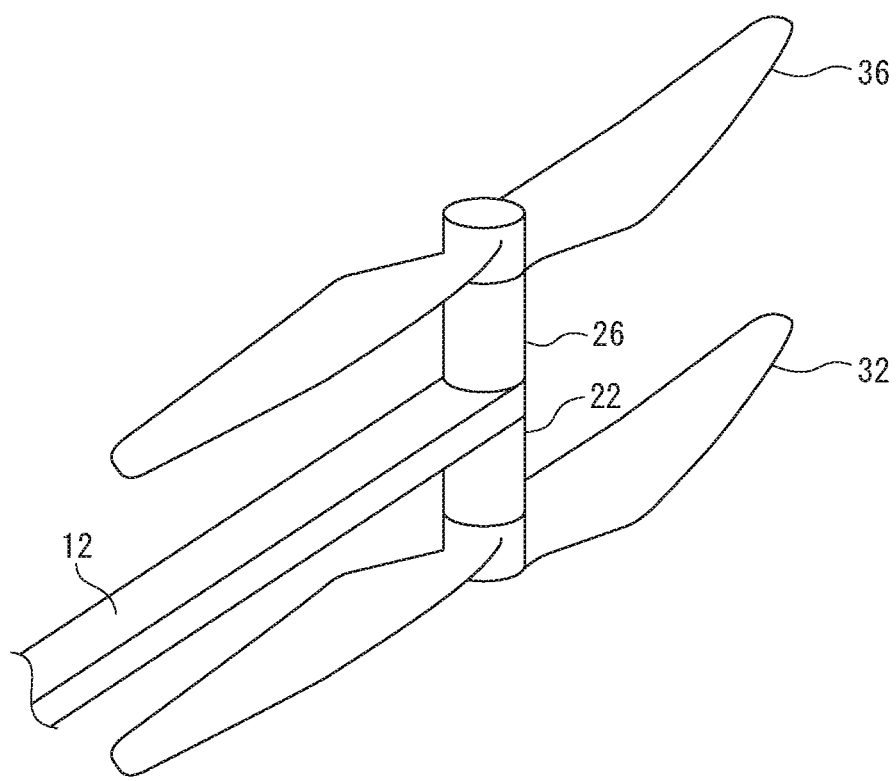
FIG. 2 is an enlarged perspective view illustrating an example of rotors included in the aircraft according to the first embodiment.

For example, with regard to the second quadrant Q2 as illustrated in FIG. 2, the respective blades of the main rotor 32 and the auxiliary rotor 36 are adjusted in pitch angles so as to generate upward lift of the frame-structure (11 to 14) when the main rotor 32 and the auxiliary rotor 36 are rotated in the CCW direction as seen from above the frame-structure (11 to 14). Similarly, with regard to the fourth quadrant Q4 that is positioned on a side opposite to the second quadrant Q2 with respect to the gravity center G, the respective blades of the main rotor 34 and the auxiliary rotor 38 are adjusted in pitch angles so as to generate upward lift of the frame-structure (11 to 14) when the main rotor 34 and the auxiliary rotor 38 are rotated in the CCW direction.

Meanwhile, the respective blades of the main rotor 31 and the auxiliary rotor 35 in the first quadrant Q1 and the respective blades of the main rotor 33 and the auxiliary rotor 37 in the third quadrant Q3 are adjusted in pitch angles so as to generate upward lift of the frame-structure (11 to 14) when the main rotor 31 and the auxiliary rotor 35, and the main rotor 33 and the auxiliary rotor 37 are rotated in the CW direction.

In the configuration illustrated in FIG. 2, for example, each of the main rotor 32 and the auxiliary rotor 36 has two blades. However, the number of blades that each of the rotors 31 to 38 includes may be three or more. By increasing the number of blades, lift generated by the rotation can be increased. Further, the main rotors 31 to 34 and the auxiliary rotors 35 to 38 may include the numbers of blades, which are different from each other between the upper and lower levels. Further, the rotors may have diameters, which are different from each other between the upper and lower levels.

The frame-structure (11 to 14) is a structure including a plurality of beams 11, 12, 13, and 14 radially extending from the gravity center G to the outside in the first quadrant Q1, the second quadrant Q2, the third quadrant Q3, and the fourth quadrant Q4, respectively. Thus, the frame-structure (11 to 14) may have a configuration merged with the main-body 10 into a single structure. The main-body 10 functions as a casing configured to place electronic components such as a power supply and a processing circuit. Each of the beams 11 to 14 has, for example, a cylindrical shape, and stores wires and the like. For example, in a planar pattern, the beams 11 to 14 are arranged to have longitudinal center lines that match with radial lines passing through the center of gravity of the frame-structure (11 to 14). For example, in a planar pattern, the center of gravity of the frame-structure (11 to 14) is the gravity center G. The frame-structure (11 to 14) may have double or quadruple rotation symmetry with respect to the center axis vertical to the frame-structure (11 to 14) passing through the center of gravity.

The aircraft according to the first embodiment further includes a plurality of motors 21 to 28 configure to drive the rotors 31 to 38, respectively. Specifically, the motors 21 to 28 are classified into two groups including the first motors 21 to 24 configured to rotate the main rotors 31 to 34, respectively, and the second motors 25 to 28 configured to rotate the auxiliary rotors 35 to 38, respectively. In a case where the rotors 31 to 38 are directly connected to the shafts (rotary shafts) of the motors 21 to 28, respectively. The first motor 21 and the second motor 25, the first motor 22 and the second motor 26, the first motor 23 and the second motor 27, and the first motor 24 and the second motor 28 are arranged to have the shafts coaxial with each other.

The rotors 31 to 38 are capable of being rotated independently from each other by the corresponding motors 21 to 28. That is, the rotors 31 to 38 are rotated by power-drive systems independent from each other. As the motors 21 to 28, for example, a brushless DC motor having high output efficiency with respect to input electric power, a brush DC motor, and an AC or DC servomotor can be adopted for the power-drive systems.

As illustrated in FIG. 2, the first motor 22 and the main rotor 32 in the lower level are mounted to a lower side of a distal end of the beam 12, and the second motor 26 and the auxiliary rotor 36 in the upper level is mounted to an upper side of the distal end of the beam 12. The auxiliary rotor 36 is rotated by a power-drive system independent from a power-drive system of the main rotor 32. Similarly, in the first quadrant Q1, the first motor 21 and the main rotor 31 in the lower level are mounted to a lower side of a distal end of the beam 11, and the second motor 25 and the auxiliary rotor 35 in the upper level are mounted to an upper side of the distal end of the beam 11. The auxiliary rotor 35 is rotated by a power-drive system independent from a power-drive system of the main rotor 31. In the third quadrant Q3, the first motor 23 and the main rotor 33 in the lower level are mounted to a lower side of a distal end of the beam 13, and the second motor 27 and the auxiliary rotor 37 in the upper level are mounted to an upper side of the distal end of the beam 13. The auxiliary rotor 37 is rotated by a power-drive system independent from a power-drive system of the main rotor 33. In the fourth quadrant Q4, the first motor 24 and the main rotor 34 in the lower level are mounted to a lower side of a distal end of the beam 14, and the second motor 28 and the auxiliary rotor 38 in the upper level are mounted to an upper side of the distal end of the beam 14. The auxiliary rotor 38 is rotated by a power-drive system independent from a power-drive system of the main rotor 34.

Figure 3:
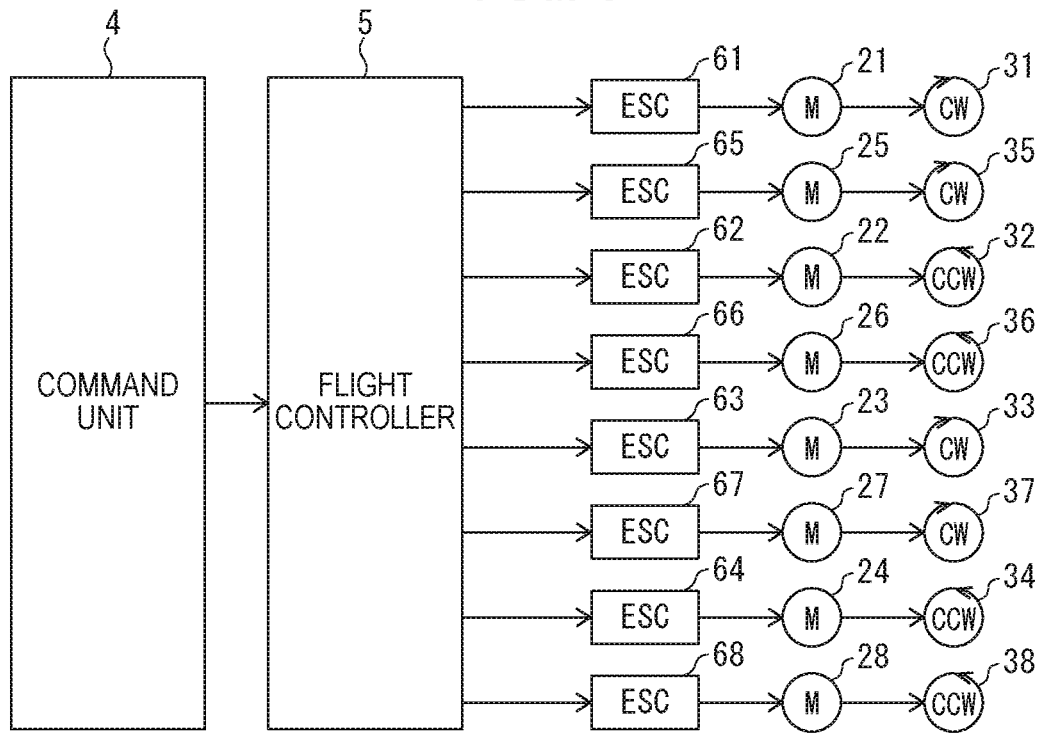
FIG. 3 is a block diagram illustrating an example of a control system of the aircraft according to the first embodiment.

As illustrated in FIG. 3, the aircraft according to the first embodiment further includes a command unit 4, a flight controller (FC) 5, and a plurality of electronic speed controllers (ESCs) 61, 62, . . . , and 68, each of which implementing a part of the corresponding independent power-drive systems. The command unit 4, the FC 5, and the ESCs 61 to 68 are placed in the main-body 10, for example.

The command unit 4 is a circuit configured to deliver an instruction signal, which indicates a flight operation of the aircraft according to the first embodiment, to the FC 5. The flight operation includes a rise, a fall, an advance, a retreat, a left move, a right move, a left turn, a right turn, and the like. The command unit 4 may be, for example, a receiver configured to receive an instruction signal from a transmitter that wirelessly transmits the instruction signal in response to an operation of a user. The command unit 4 or the FC 5 may include a global navigation satellite system (GNSS) receiver that acquires positional information indicating latitude, longitude, and altitude based on signals received from a plurality of navigation satellites. The command unit 4 may automatically generate an instruction signal for indicating a flight path set in advance based on positional information acquired by the GNSS receiver. Alternatively, when the aircraft is a manned aircraft, the command unit 4 may receive an operation from a crew member, and may deliver an instruction signal corresponding to the operation to the FC 5.

Figure 4:
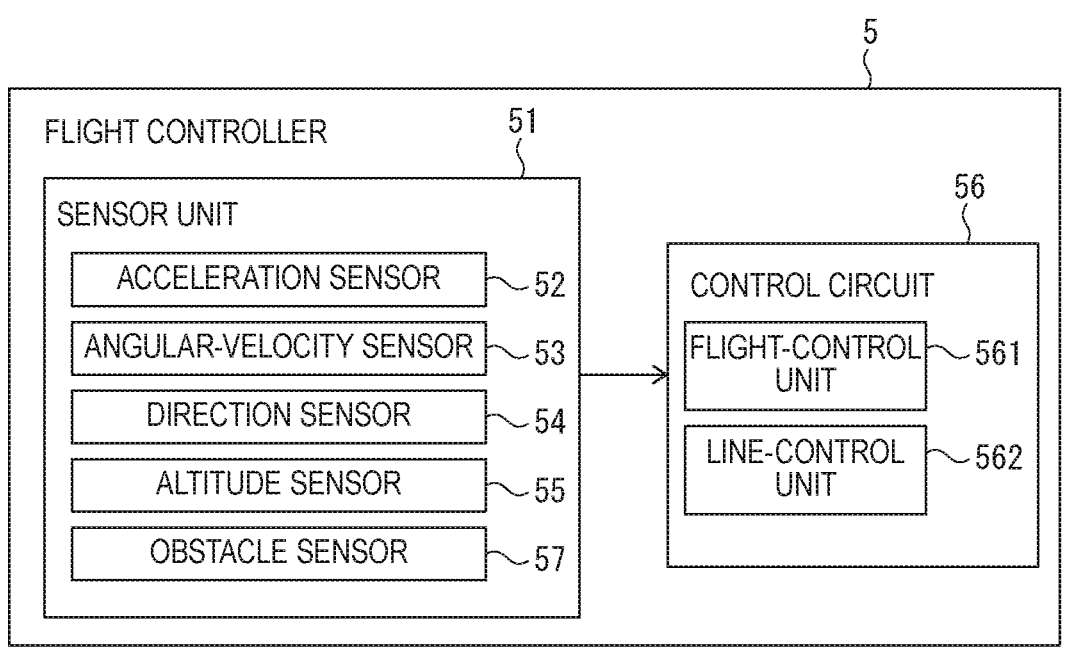
FIG. 4 is a block diagram for illustrating a flight controller of the aircraft according to the first embodiment.

As illustrated in FIG. 4, for example, the FC 5 includes a sensor unit 51 and a control circuit 56. For example, the sensor unit 51 includes an acceleration sensor 52, an angular-velocity sensor 53, a direction sensor 54, an altitude sensor 55, and an obstacle sensor 57. The acceleration sensor 52 detects acceleration in three axial directions perpendicular to one another, specifically, a roll axis, a pitch axis, and a yaw axis. The angular-velocity sensor 53 detects a flight attitude of the frame-structure (11 to 14) with respect to the ground surface by detecting angular velocity about the three axial direction perpendicular to one another. The direction sensor 54 detects a direction of the frame-structure (11 to 14) by detection terrestrial magnetism. The altitude 55 detects altitude by detecting an atmospheric pressure. The obstacle sensor 57 detects a fixed obstacle and a moving obstacle on a flight path. The sensor unit 51 detects a flight state of the aircraft according to the first embodiment, such as velocity, a flight attitude, a direction, and altitude with the acceleration sensor 52, the angular-velocity sensor 53, the direction sensor 54, the altitude 55, and the obstacle sensor 57.

The control circuit 56 is formed of a computer such as a micro controller including, for example, a processor, a memory, and an input/output interface. The processor of the control circuit 56 is, for example, a central processing unit (CPU). The processor may be achieved by a functional logical circuit set in a general-purpose semiconductor integrated circuit. For example, the processor may include a programmable logic device (PLD) such as a field programmable gate array (FPGA).

The control circuit 56 includes a flight-control unit 561 and a line-control unit 562 as functional or physical hardware resources for controlling the ESCs 61 to 68 in accordance with an instruction signal entered from the command unit 4 and a flight attitude detected by the sensor unit 51. The flight-control unit 561 is a logic circuit that sets a target state of the frame-structure (11 to 14) based on the instruction signal entered from the command unit 4 and generates a plurality of control signals indicating rotation frequencies of the rotors 31 to 38 so as to achieve the target states based on differences from the flight attitude detected from the sensor unit 51. The flight-control unit 561 transfers the generated control signals to the ESCs 61 to 68.

The line-control unit 562 is a logic circuits that sets output destinations of the control signals from the ESCs 61 to 68 by, for example, switching lines of the control signals with respect to the ESCs 61 to 68. The line-control unit 562 may have, for example, first and second modes. In the first mode, the same control signals are provided to the plurality of ESCs in the quadruple respective divided regions. In the second mode, control signals are provided to any of the plurality of ESCs in the quadruple respective divided regions.

In the first mode, the line-control unit 562 transfers the same control signals to the first ESC 61 and the second ESC 65 for the first quadrant Q1, the first ESC 62 and the second ESC 66 for the second quadrant Q2, the first ESC 63 and the second ESC 67 for the third quadrant Q3, and the first ESC 64 and the second ESC 68 for the fourth quadrant Q4.

In the second mode, the line-control unit 562 transfers a plurality of control signals to any of the first ESC 61 and the second ESC 65, any of the first ESC 62 and the second ESC 66, any of the first ESC 63 and the second ESC 67, and any of the first ESC 64 and the second ESC 68. In this manner, the FC 5 generates a plurality of control signals for the respective ESCs 61 to 68, facilitating the driving of the eight motors 21 to 28 independently. Thus, the FC 5 and the ESCs 61 to 68 are connected to each other by independent interconnections.

Each of the ESCs 61 to 68 is a motor-drive circuit of the corresponding independent power-drive systems that receives a control signal from the FC 5, generates a drive signal for driving each of the motors 21 to 28 at a rotation frequency indicated by the control signal, and transfers the drive signal to each of the motors 21 to 28. That is, the FC 5 controls rotation of the rotors 31 to 38 via the ESCs 61 to 68, respectively. The ESCs 61 to 68 are classified into two groups including the first ESCs 61 to 64 configured to drive the first motors 21 to 24 in the lower level and the second ESCs 65 to 68 configured to drive the second motors 25 to 28 in the upper level.

Flight Operations

Now, with reference to a set of flight-state charts illustrated in FIG. 5, a plurality of models of respective flight operations of the aircraft according to the first embodiment will be explained. The flight-state chart (a) in the center represents a hovering state in which the aircraft stops in the air. The numbers and the symbols such as "1.0 CW" denoted in each of the first quadrant Q1, the second quadrant Q2, the third quadrant Q3, and the fourth quadrant Q4 indicate values of lifts and rotation directions of the rotors in the upper level and the lower level. The value of lift is expressed proportionally to the value of lift of one rotor being 1.0 in the flight-state chart (a), and indicates a standard of the control state by the FC. Thus, the lift may be different from the reality in some cases.

Figure 5:
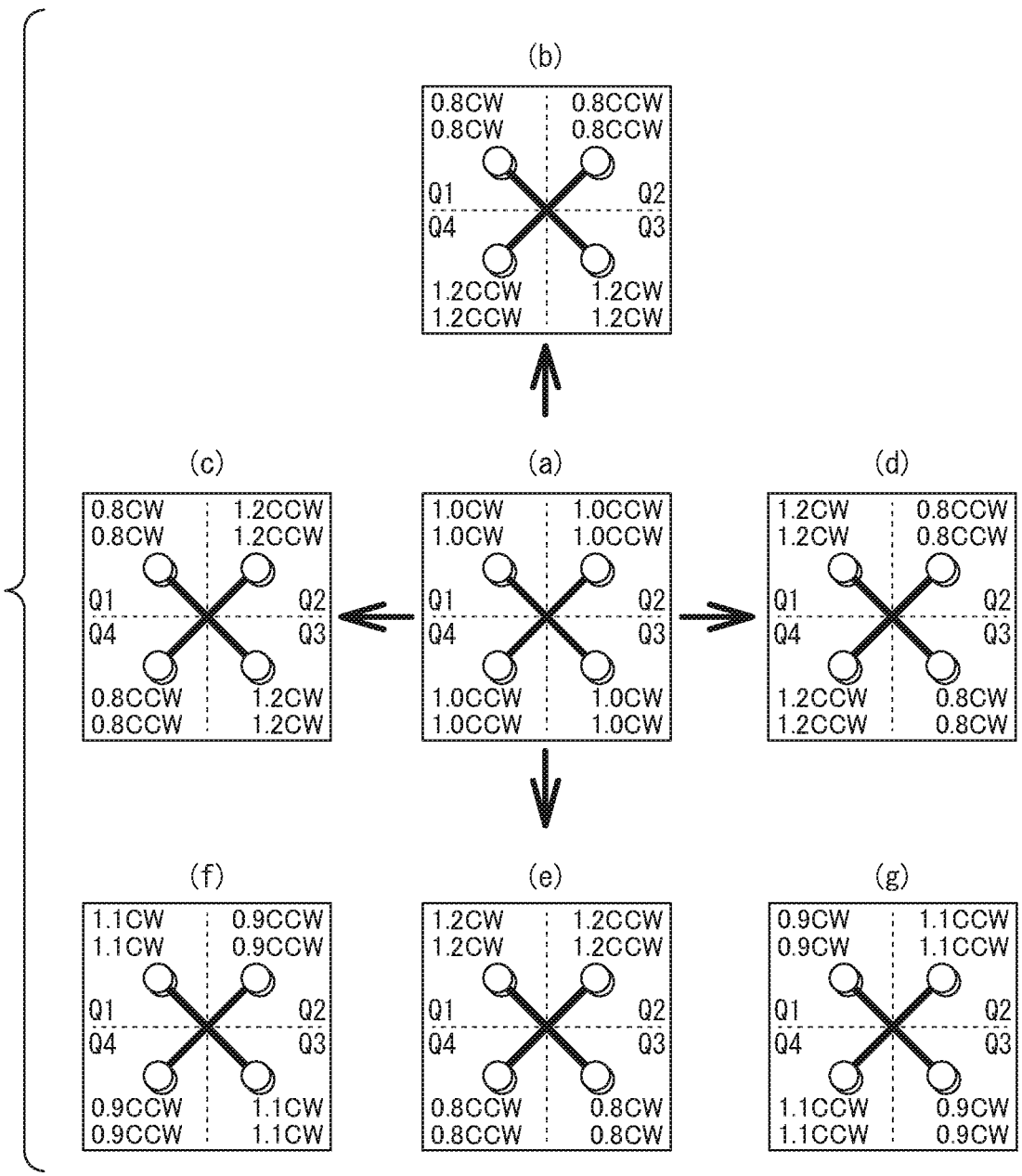
FIG. 5 is a set of flight-state charts illustrating schematic states of models in each of flight operations of the aircraft according to the first embodiment.

In the flight-state chart (a) of FIG. 5, the FC performs control so that the first quadrant Q1, the second quadrant Q2, the third quadrant Q3, and the fourth quadrant Q4 have the equal lift. In this case, the lift generated by the rotors in the upper level and the lower level in each divided region is 1.0, for example. The sum of the lift in the respective divided regions is 2.0, and hence, stability is obtained about the roll axis and the pitch axis. Further, the sum of the lift generated by the rotors rotated in the CW direction is 4, and is equal to the sum of the lift generated by the rotors rotated in the CCW direction. Thus, the airframe is stable about the yaw axis, and is in the hovering state.

The flight-state chart (b) represents an advancing mode. In the flight-state chart (b), the lift of each of the rotors in the upper level and the lower level in the first quadrant Q1 and the second quadrant Q2 on the front side is 0.8, and the lift of each of the rotors in the upper level and the lower level in the third quadrant Q3 and the fourth quadrant Q4 on the rear side is 1.2. Thus, the lift on the front side is relatively small, and the front side of the airframe is relatively lowered. Accordingly, the nose of the airframe pitches downward about lateral axis. The sum of the lift in the first quadrant Q1 and the fourth quadrant Q4 on the right side, the sum of the lift in the second quadrant Q2 and the third quadrant Q3 on the left side, the sum of the lift generated by the rotors rotated in the CW direction, and the sum of the lift generated by the rotors rotated in the CCW direction are all 4 (obtained by adding 0.8, 0.8, 1.2, and 1.2). Thus, the airframe is stable about the roll axis and the yaw axis. As a result, the airframe advances.

The flight-state chart (c) represents a left moving state. The sum of the lift in the first quadrant Q1 and the fourth quadrant Q4 on the left side is 3.2 (obtained by adding 0.8, 0.8, 0.8, and 0.8), and the sum of the lift in the second quadrant Q2 and the third quadrant Q3 on the right side is 4.8 (obtained by adding 1.2, 1.2, 1.2, and 1.2). Thus, the left side of the airframe is relatively lowered, and the orientation of the airframe rolls leftward. The sum of the lift in the first quadrant Q1 and the second quadrant Q2 on the front side, the sum of the lift in the third quadrant Q3 and the fourth quadrant Q4 on the rear side, the sum of the lift generated by the rotors rotated in the CW direction, and the sum of the lift generated by the rotors rotated in the CCW direction are all 4. Thus, the orientation of the airframe is stable about the pitch axis and the yaw axis. As a result, the airframe moves leftward.

The flight-state chart (d) represents a right moving state. The right moving state is substantially the same as the state obtained by rotating the state (c) being the left moving state about the yaw axis by 180 degrees. Thus, detailed description is omitted. The flight-state chart (e) represents a retreating mode. The retreating mode is substantially the same as the state obtained by reversing the advancing mode about the yaw axis by 180 degrees. Thus, as for the retreating mode, detailed description is also omitted.

The flight-state chart (f) represents the left turning state. The sum of the lift in the first quadrant Q1 and the third quadrant Q3 in which the rotors rotated in the CW direction are arranged is 4.4 (obtained by adding 1.1, 1.1, 1.1, and 1.1). The sum of the lift in the second quadrant Q2 and the fourth quadrant Q4 in which the rotors rotated in the CCW direction are arranged is 3.6 (obtained by adding 0.9, 0.9, 0.9, and 0.9). The lift has a value corresponding to a rotation frequency, and hence, the orientation of the airframe yaws in the direction CCW due to anti-torque of the rotors and turns leftward. Note that, the lift is balanced in the front-and-rear direction and the right-and-left direction. Thus, the orientation of the airframe is stable about the roll axis and pitch axis.

The flight-state chart (g) represents a right turning state. The sum of the lift in the first quadrant Q1 and the third quadrant Q3 in which the rotors rotated in the CW direction are arranged is 3.6 (obtained by adding 0.9, 0.9, 0.9, and 0.9). The sum of the lift in the second quadrant Q2 and the fourth quadrant Q4 in which the rotors rotated in the CCW direction are arranged is 4.4 (obtained by adding 1.1, 1.1, 1.1, and 1.1). Thus, the orientation of the airframe yaws in the direction CW, and turns rightward. The lift is balanced in the front-and-rear direction and the right-and-left direction. Thus, the orientation of the airframe is stable about the roll axis and the pitch axis.

In all the flight-state charts (a) to (g), the total sum of the lift is 8.0, and hence the altitude is constant. The airframe can be rise or fall by increasing or reducing the total sum of the lift under a state in which the ratio of the lift in the respective divided regions is maintained. As described above, the aircraft according to the first embodiment can freely fly.

Flow Analysis of Failure

Figure 6:
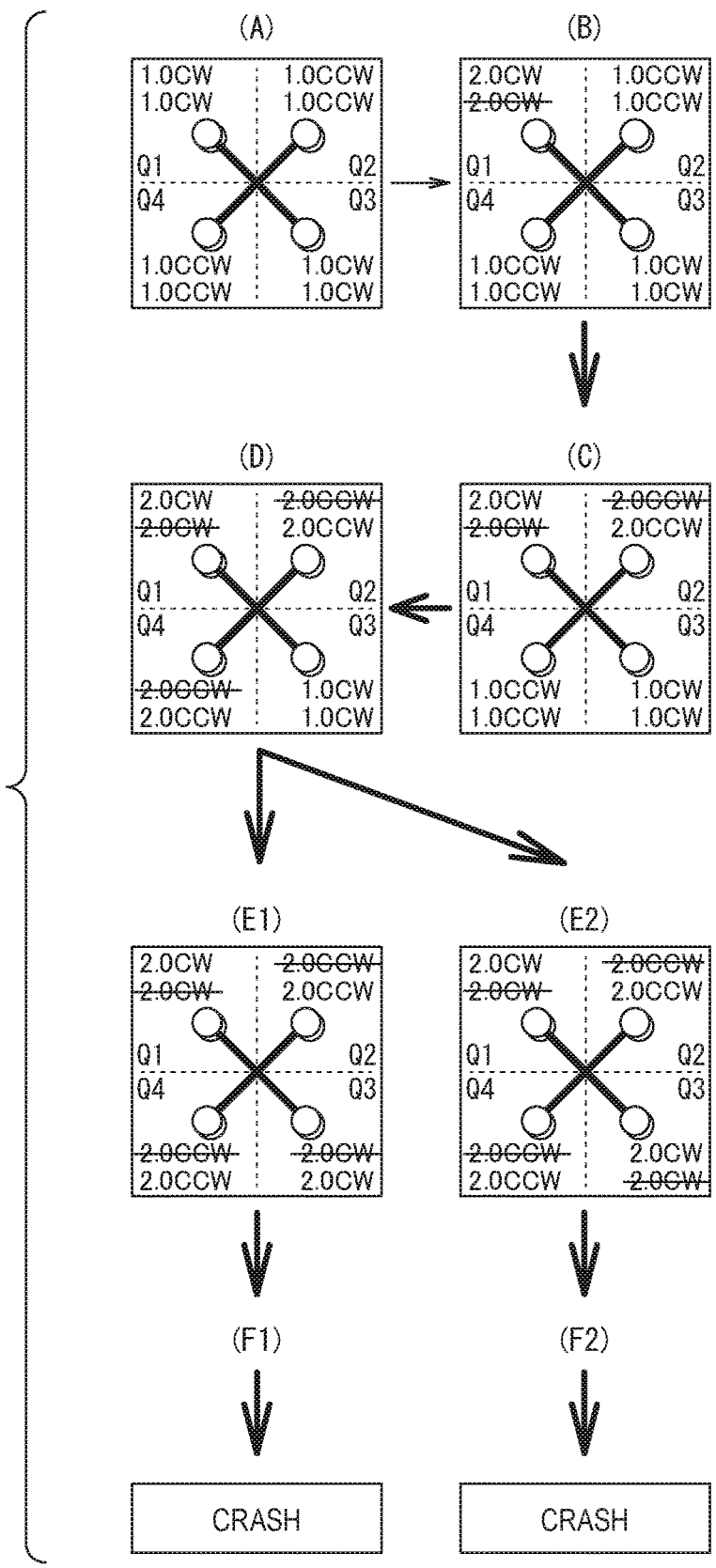
FIG. 6 is a set of flight-state charts illustrating a flow analysis for abnormal states of the aircraft according to the first embodiment.

Now, with reference to a set of flight-state charts illustrated in FIG. 6, description is made of a flow analysis regarding failures of the rotors of the aircraft according to the first embodiment. FIG. 6 is a view illustrating a state in which the airframe hovers in the respective abnormal states. Note that, in the following description, a "failure of the rotors" indicates the state in which the lift is not caused by the rotation of the rotors for some cause.

First, the mode (A) is a normal state without a faulty rotor. As described above, in the mode (A), the airframe can fly freely without any problem. Two conditions are required to be satisfied, for facilitate the airframe to fly in a balanced manner. The first condition is that the first quadrant Q1, the second quadrant Q2, the third quadrant Q3, and the fourth quadrant Q4 have the equal lift. With the equal lift condition, the orientation of the airframe is balanced about the roll axis and the pitch axis. The second condition is that the lift of the rotors rotated in the CW direction and the rotors rotated in the CCW direction shall be equal to each other. When the second condition is satisfied, the orientation of the airframe is balanced about the yaw axis.

The mode (B) is a state in which one of the double rotors rotated in the CW direction in the first quadrant Q1 is failed to operate properly. In the first quadrant Q1, one of the rotors is failed to operate properly, and the lift is insufficient. Thus, the FC increases a rotation frequency of the other rotor in order to increase the lift in the first quadrant Q1. At this point, the control signal of the FC is delivered to the double rotors in the first quadrant Q1. "2.0 CW", which is scratched out by a horizontal strikethrough line, in the first quadrant Q1 indicates imaginary lift to be caused by the faulty rotor in response to the control signal of the FC. However, in reality, because the rotor is failed to operate properly, the lift is 0. The lift of the other rotor in the first quadrant Q1 is 2.0 to satisfy the first condition and the second condition. Accordingly, the orientation of the airframe is balanced.

Developed from the mode (B), the mode (C) is a state in which one of the double rotors rotated in the CCW direction in the second quadrant Q2 is failed to operate properly, that is, a mode in which double rotors in total are failed. Also in the mode (C), the FC increases a rotation frequency of the other rotor in order to increase the lift in the second quadrant Q2 having insufficient value of lift. The lift of the other rotor in the second quadrant Q2 is 2.0 to satisfy the first condition and the second condition. Accordingly, the orientation of the airframe is balanced.

Developed from the mode (C), the mode (D) is a state in which one of the double rotors rotated in the CCW direction in the fourth quadrant Q4 is failed to operate properly, that is, a mode in which triple rotors in total are failed. Also in the mode (D), the FC increases a rotation frequency of the other rotor in order to increase the lift in the fourth quadrant Q4. The lift of the other rotor in the fourth quadrant Q4 is 2.0 to satisfy the first condition and the second condition. Accordingly, the orientation of the airframe is balanced.

Developed from the mode (D), each of the modes (E1) and (E2) is a state in which one of the double rotors rotated in the CW direction in the third quadrant Q3 is failed to operate properly, that is, a mode in which quadruple rotors in total are failed. Also in the modes (E1) and (E2), the FC increases a rotation frequency of the other rotor in order to increase the lift in the third quadrant Q3. The lift of the other rotor in the third quadrant Q3 is 2.0 to satisfy the first condition and the second condition. Accordingly, the orientation of the airframe is balanced.

Note that, in the mode (F1), which is developed from the mode and has another faulty rotor, and the mode (F2), which is developed from the mode (E2) and has another faulty rotor, the first condition is not satisfied. Thus, the airframe crashes.

As described above, the aircraft according to the first embodiment can allow four faulty rotors at maximum. That is, with the aircraft according to the first embodiment, it can be confirmed that stable flight can be maintained during 100% of the time from take-off to landing when quadruple rotors are failed at maximum.

Flight Operation in Abnormal State

Figure 7:
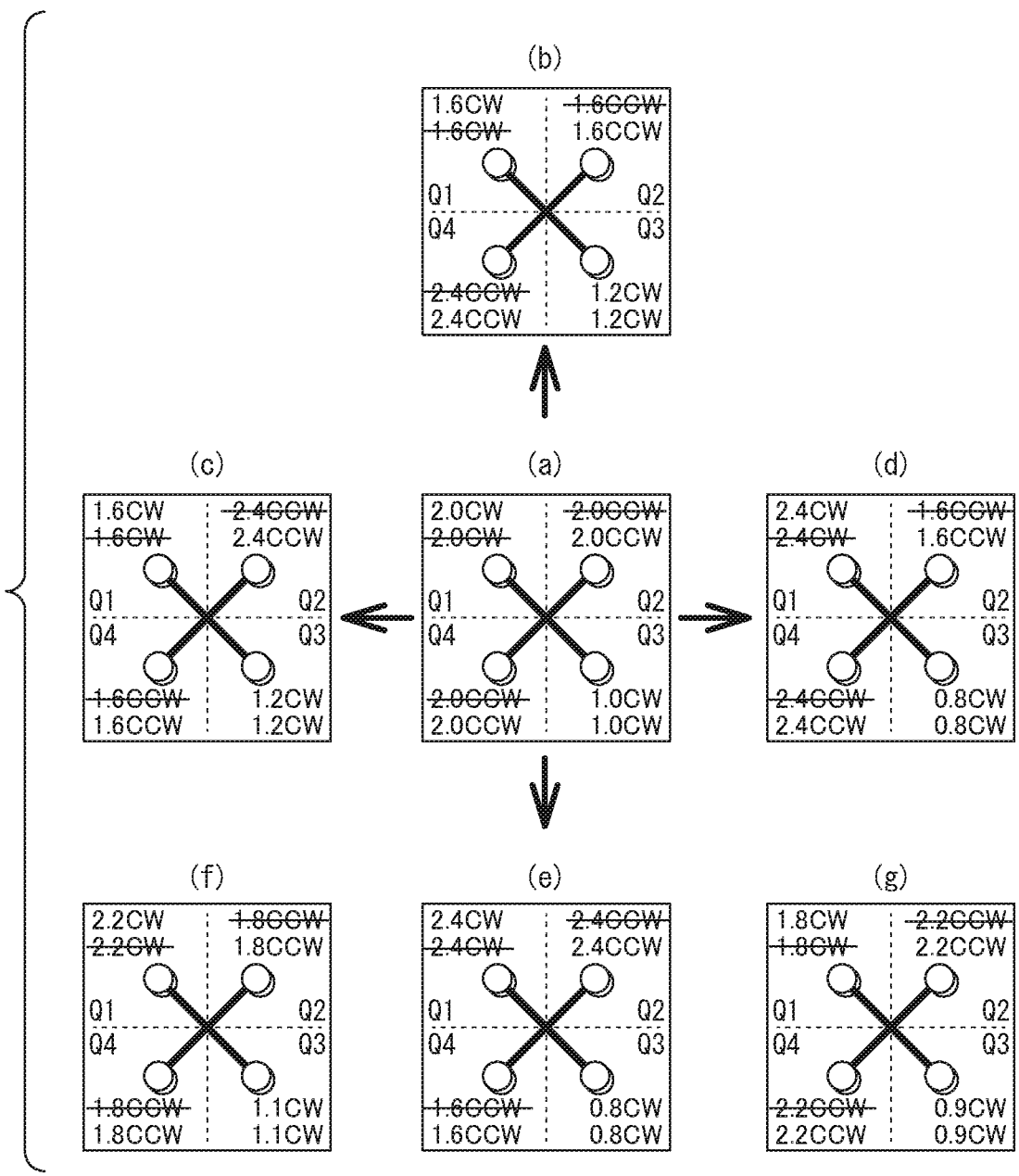
FIG. 7 is a set of flight-state charts illustrating flight operations of the aircraft according to the first embodiment at the time of a rotor failure.

Now, with reference to a set of flight-state charts illustrated in FIG. 7 as an example, description is made to illustrate that the respective flight operations can be performed with the aircraft according to the first embodiment in the above-mentioned mode (D) in which triple rotors are failed.

In the flight-state chart (a), one of the rotors is failed to operate properly, and the lift is recovered by the other normal rotor in each of the first quadrant Q1, the second quadrant Q2, and the fourth quadrant Q4. The respective divided regions have the equal sum of the lift, and the lift generated by the rotors rotated in the CW direction and the lift generated by the rotors rotated in the CCW direction are equal to each other. Thus, the first condition and the second condition described above are satisfied.

In the flight-state chart (b), the sum of the lift in the first quadrant Q1 and the second quadrant Q2 on the front side is 1.6, and the sum of the lift in the third quadrant Q3 and the fourth quadrant Q4 on the rear side is 2.4. Thus, the nose of the airframe pitches downward about lateral axis. Further, the sum of the lift generated by the rotors rotated in directions CW and the sum of the lift generated by the rotors rotated in the CCW direction are both 4. Thus, the orientation of the airframe is stable about the roll axis and the yaw axis. As a result, the airframe advances.

In the flight-state chart (c), the lift of the first quadrant Q1 and the fourth quadrant Q4 on the left side is 1.6, and the lift of the second quadrant Q2 and the third quadrant Q3 on the right side is 2.4. Thus, the left side of the airframe is relatively lowered, and the orientation of the airframe rolls leftward. The sum of the lift generated by the rotors rotated in directions CW and the sum of the lift generated by the rotors rotated in the CCW direction are both 4. Thus, the orientation of the airframe is stable about the pitch axis and the yaw axis. As a result, the airframe moves leftward.

The flight-state chart (d) is substantially the same as the state obtained by rotating the airframe about the yaw axis by 180 degrees from the flight-state chart (c). Thus, detailed description is omitted. The flight-state chart (e) is substantially the same as the state obtained by reversing the airframe about the yaw axis by 180 degrees from the advancing mode. Thus, as for the retreat, detailed description is omitted.

In the flight-state chart (f), the lift generated by the rotors rotated in the CW direction is 4.4, and the lift generated by the rotors rotated in the CCW direction is 3.6. The lift has a value corresponding to a rotation frequency, and hence, the orientation of the airframe yaws in the direction CCW due to anti-torque of the rotors and turns leftward. Note that, the lift is balanced in the front-and-rear direction and the right-and-left direction. Thus, the orientation of the airframe is stable about the roll axis and the pitch axis.

In the flight-state chart (g), the lift generated by the rotors rotated in the CW direction is 3.6, and the lift generated by the rotors rotated in the CCW direction is 4.4. Thus, the orientation of the airframe yaws in the direction CW, and turns rightward. The lift is balanced in the front-and-rear direction and the right-and-left direction. Thus, the orientation of the airframe is stable about the roll axis and the pitch axis.

Actually, the results describe above have already been demonstrated, proved and substantiated by the inventors through use of a multicopter, which has been manufactured by the inventors, having the similar configuration as that of the aircraft according to the first embodiment. From the above, it has been confirmed that the aircraft according to the first embodiment can freely fly even when one of the rotors is failed to operate properly in each of the triple divided regions.

Comparative Example

Figure 8:
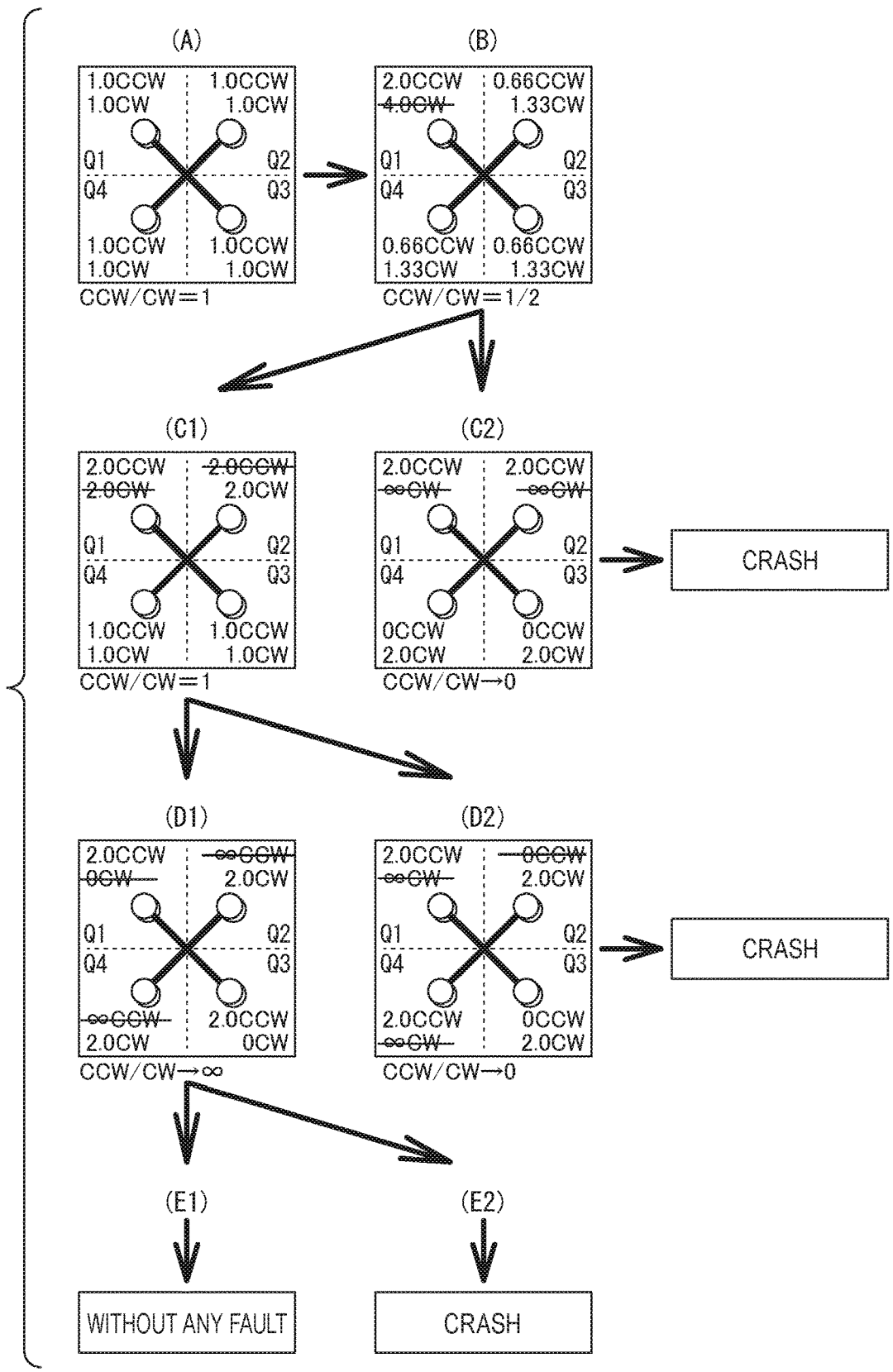
FIG. 8 is a set of flight-state charts illustrating a flow analysis for abnormal states of a general coaxial contra-rotating octocopter.

Now, with reference to a set of flight-state charts illustrated in FIG. 8, description is made of a flow analysis regarding failures of rotors of a general coaxial contra-rotating (reverse turn) octocopter having an X-shaped airframe. The coaxial contra-rotating octocopter is different from the aircraft according to the first embodiment in that double rotors rotated in the CW direction and the counter direction of CCW are arranged in each of the divided regions, respectively.

First, the mode (A) is a normal state without a failed or faulty rotor. All the rotors have the equal lift, and hence the first quadrant Q1, the second quadrant Q2, the third quadrant Q3, and the fourth quadrant Q4, which have the center of the airframe as the gravity center, have the equal lift. Thus, stability of the airframe-orientation is achieved about the roll axis and the pitch axis. Further, the sum of the lift generated by the rotors rotated in the CW direction and the sum of the lift generated by the rotors rotated in the CCW direction are 4. Thus, the orientation of the airframe is stable about the yaw axis, and the airframe-orientation is balanced.

The mode (B) is a state in which one of the double rotors in the first quadrant Q1, which is rotated in the CW direction, is failed to operate properly. In the first quadrant Q1, the rotor rotated in the CW direction is failed to operate properly, and the lift is insufficient. Thus, the lift generated by the rotor rotated in the CCW direction is increased. Specifically, the FC does not detect the failure of the rotor. Thus, the FC adjust the lift in the respective divided regions so that the airframe-orientation is stable about the roll axis and the pitch axis, and adjusts the lift generated by the rotors rotated in the CW direction and the lift generated by the rotors rotated in the CCW direction so that the airframe-orientation is stable about the yaw axis. As a result, in a case where the lift in the direction CCW in the first quadrant Q1 is 2.0, when the lift in the direction CCW in each of the second quadrant Q2, the third quadrant Q3, and the fourth quadrant Q4 is 0.66 and the lift in the direction CCW in each of the second quadrant Q2, the third quadrant Q3, and the fourth quadrant Q4 is 1.33, the airframe-orientation is stable. A ratio CCW/CW, which is a ratio of the lift in the direction CW to the lift in the direction CCW, is 1/2 in each of the second quadrant Q2, the third quadrant Q3, and the fourth quadrant Q4. However, because the FC does not recognize which rotor is failed to operate properly, the FC performs control so that CCW/CW=1/2 is satisfied. Therefore, although not achieved due to the failure, a control signal for causing the rotor rotated in the CW direction in the first quadrant Q1 to have the lift of 4.0 is provided from the FC.

Note that, in the mode (B), a flight operation in which adjustment of the ratio CCW/CW is always required is frequently performed in order to achieve stability of the orientation about the yaw axis. Thus, at the time of manned flight, there is a problem in that riding comfort is degraded due to instability of the orientation about the yaw axis. Further, in the respective flight operations, there may be a risk in that an excessive current will flow to the motor for the rotor rotated in the CW direction in the first quadrant Q1. Thus, it is highly associated with a risk that a desired cruising distance cannot be achieved due to consumption of a battery.

Developed from the mode (B), the mode (C1) is a state in which the rotor rotated in the CCW direction in the second quadrant Q2 is failed to operate properly, that is, a state in which double rotors in total are failed. Also in the mode (C1), the FC increases the lift of the rotor rotated in the CW direction in the second quadrant Q2 in order to recover the lift in the second quadrant Q2. By the recovery of the lift in the second quadrant Q2, the lift in the respective divided regions and the lift generated by the rotors rotated in the CW direction and the lift generated by the rotors rotated in the CCW direction can be balanced. Also, in the mode (C1), a flight operation in which adjustment of the ratio CCW/CW is always required is frequently performed in order to achieve stability of the orientation about the yaw axis. Thus, at the time of manned flight, there is a problem in that riding comfort is degraded due to instability of the orientation about the yaw axis.

Developed from the mode (B), the mode (C2) is a state in which the rotor rotated in the CW direction in the second quadrant Q2 is failed to operate properly, that is, an abnormal state in which double rotors in total are failed. In the mode (C2), in each of the first quadrant Q1 and the second quadrant Q2 on the front side, the rotor rotated in the CW direction does not function, and one rotor rotated in the CCW direction is positioned. In the mode (C2), when the orientation of the airframe pitches upward and retreats, the lift in the first quadrant Q1 and the second quadrant Q2 on the front side is required to be larger than that in the third quadrant Q3 and the fourth quadrant Q4 on the rear side. Thus, the sum of the lift in the direction CCW is always larger than the sum of the lift in the direction CW. Accordingly, the airframe-orientation yaws in the direction CW. As the number of rotors rotated in the CW direction is insufficient, yaw of the airframe-orientation cannot be stopped. As a result, the airframe crashes. When a retreating operation cannot be performed, the state cannot be shifted to a hovering state after advancement, which leads to a problem.

Further, as the rotors rotated in the CW direction do not function in the two divided regions on the front side, the orientation of the airframe cannot yaw in the CCW direction under a stable state. In this case, when the ratio CCW/CW is 0 or infinite ($\infty$), a motor, which theoretically has a current being infinite ($\infty$), is always present. In the mode (C2), a flight operation in which CCW/CW=0 is satisfied is frequent. Thus, an abnormally high current frequently flows to a motor for the rotor rotated in the CW direction. When the abnormally high current frequently flows to the motor, it is highly liable to be led to a state that consumption of the battery is promoted and that a desired cruising distance cannot be achieved.

Developed from the mode (C1), the mode (D1) is a state in which the rotor rotated in the CCW direction in the fourth quadrant Q4 is failed to operate properly, that is, an abnormal state in which triple rotors in total are failed. In the mode (D1), when the airframe-orientation yaws in the direction CW, the airframe is tilted. Accordingly, the orientation of the airframe cannot yaw in the CW direction under a stable state. Further, a flight operation in which CCW/CW=$\infty$ is satisfied is frequent. Thus, an excessive current frequently flows to the motor for the rotor rotated in the CCW direction. With the flow of the excessive current, it is concerned that consumption of the battery will be promoted and that a desired cruising distance cannot be achieved.

Developed from the mode (D1), the mode (E1) is a state in which the rotor rotated in the CW direction in the third quadrant Q3 is failed to operate properly, that is, an abnormal state in which quadruple rotors in total are failed. In the mode (E1), the rotors are arranged in the same manner as a general quadcopter. That is, the rotation directions of the rotors in the first quadrant Q1, the second quadrant Q2, the third quadrant Q3, and the fourth quadrant Q4 are counter to those in the adjacent divided regions. Thus, it is apparent that the airframe can freely fly in the mode (E1). However, in the mode (E1), as the rotor in the direction CW in the first quadrant Q1, the rotor in the direction CCW in the second quadrant Q2, and the rotor in the direction CCW in the fourth quadrant Q4 are failed, the probability of occurring the mode (E1) is extremely low, and therefore, the occurrence of the mode (E1) is a rare case.

Developed from the mode (D1), the mode (E2) is a state in which the rotor rotated in the CCW direction in the third quadrant Q3 is failed to operate properly, that is, an abnormal state in which quadruple rotors in total are failed. In the mode (E2), among the first quadrant Q1, the second quadrant Q2, the third quadrant Q3, and the fourth quadrant Q4, the rotor rotated in the CCW direction functions only in the first quadrant Q1. Thus, it is apparent that the stable flight operation cannot be achieved, and therefore, a crash cannot be avoided.

From the above, in the modes (C2), (D1), and (D2) in which the ratio CCW/CW is 0 or infinite, a crash is caused easily. There is an extremely low probability of the mode (E1) that enables a stable flight. That is, the coaxial contra-rotating octocopter, which does not detect a faulty rotor, can allow only a single rotor failure or double rotors failure for the stable flight, in most cases. The coaxial contra-rotating octocopter can be considered to a combination of first and second groups. Here, the first group includes the rotor rotated in the CW direction in the first quadrant Q1, the rotor rotated in the CCW direction in the second quadrant Q2, the rotor rotated in the CW direction in the third quadrant Q3, and the rotor rotated in the CCW direction in the fourth quadrant Q4, and the second group includes the rotor rotated in the CCW direction in the first quadrant Q1, the rotor rotated in the CW direction in the second quadrant Q2, the rotor rotated in the CCW direction in the third quadrant Q3, and the rotor rotated in the CW direction in the fourth quadrant Q4. Thus, in a case where a failure can be detected, when a rotor belonging to one of the groups is failed to operate properly, all the quadruple rotors belonging to the group shall be stopped, thereby performing a stable flight. The mode (D1) is a state in which triple rotors in the same group are failed fortunately, and a stable flight can be achieved as far as a failure is detected. However, a probability that only rotors in the same group are failed fortunately is extremely low and unrealistic. In the modes (B) and (C1), a flight can be performed without a crash. Still, as described above, a problem of instability of the orientation about the yaw axis remains. Further, when the target value of the lift becomes excessive, a risk of a failure of the ESCs and the motors, which are assigned to a specific independent power-drive system, will arise.

Arrangement of Rotors

Figure 9:
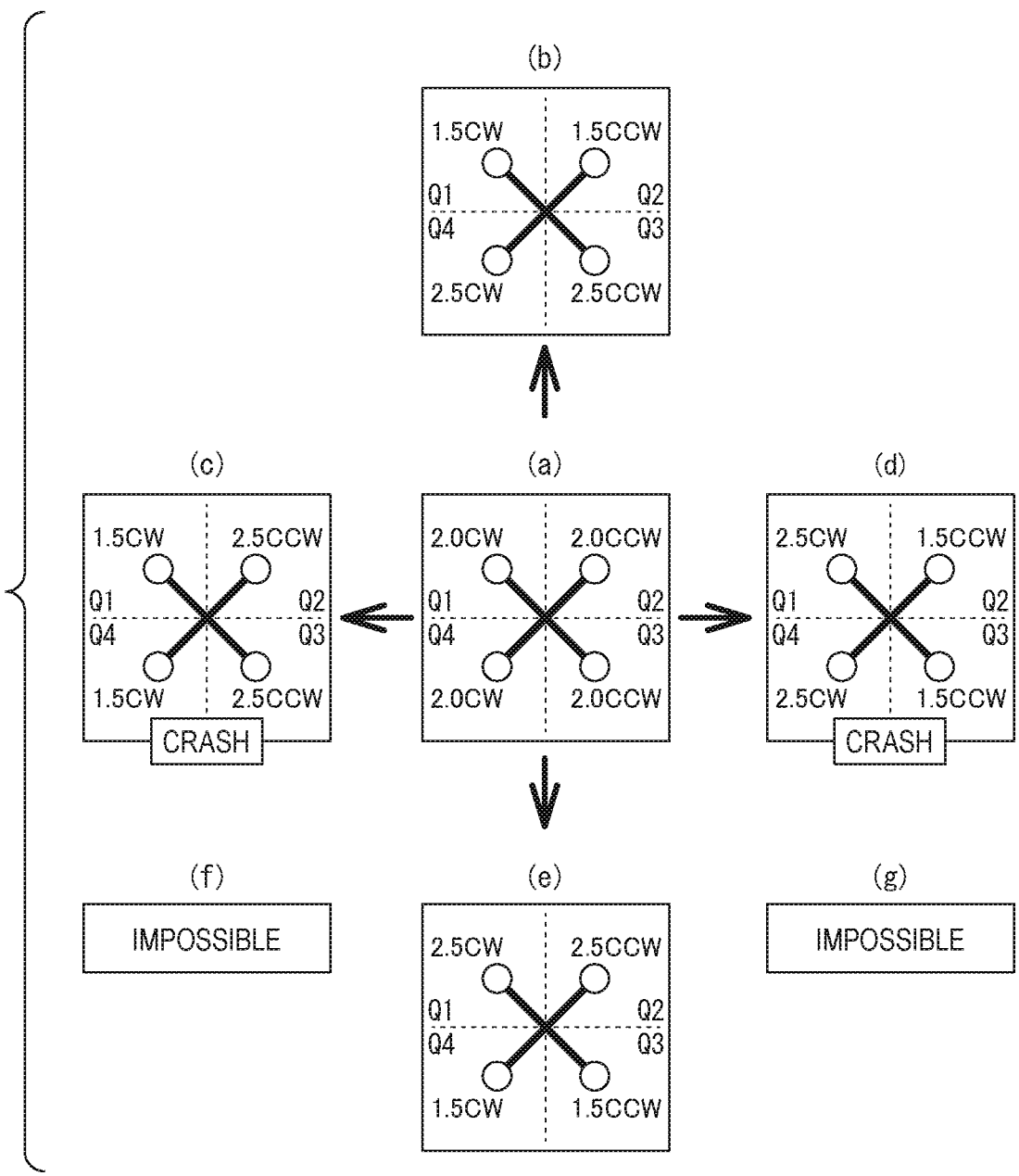
FIG. 9 is a set of flight-state charts illustrating schematic states of models in each of flight operations of an X-shaped type quadcopter with inappropriate rotor arrangement.

Next, with reference to a set of flight-state charts illustrated in FIG. 9, inappropriate rotor arrangements in an X-shaped quadcopter will be considered. In the flight-state charts illustrated in FIG. 9, the rotors rotated in the CW direction are arranged in the first quadrant Q1 and the fourth quadrant Q4 that are adjacent to each other, and the rotors rotated in the CCW direction are arranged in the second quadrant Q2 and the third quadrant Q3 that are adjacent to each other.

In the flight-state charts illustrated in FIG. 9, because the rotors rotated in the CW direction and the rotors rotated in the CCW direction are arranged eccentrically in the right-and-left direction, the airframe-orientation yaws at the time of a left or right move. As a result, the airframe crashes. Similarly, a left or right turn cannot be performed under as stable state. As described above, when the rotors rotated in the CW direction and the rotor rotated in the CCW direction are arranged eccentrically in the front-and-rear direction and the right-and-left direction, it is difficult to perform a stable flight.

Thus, it is required that the rotors in the first quadrant Q1, the second quadrant Q2, the third quadrant Q3, and the fourth quadrant Q4 be arranged so that the rotation directions are counter to those in the adjacent divided regions. However, in the case where means for detecting a rotor failure is not provided like the above-mentioned coaxial contra-rotating octocopter, there may be a risk of an unstable flight when the rotor rotated in the CW direction and the rotor rotated in the CCW direction are arranged in each of the first quadrant Q1, the second quadrant Q2, the third quadrant Q3, and the fourth quadrant Q4.

In contrast, in the aircraft according to the first embodiment, the main rotors 31 to 34 having the rotation directions counter to those in the adjacent divided regions and the auxiliary rotors 35 to 38 having the same rotation directions as the main rotors are arranged in the first quadrant Q1, the second quadrant Q2, the third quadrant Q3, and the fourth quadrant Q4. Thus, redundancy for a rotor failure can be improved, and a risk of a crash can be suppressed.

Further, in the aircraft according to the first embodiment, it is only required that control signals for quadruple control families in total be generated against the first quadrant Q1, the second quadrant Q2, the third quadrant Q3, and the fourth quadrant Q4, respectively. In the coaxial contra-rotating octocopter, the rotors in the upper level and the rotors in the lower level are required to be controlled independently. Thus, control signals for eight control families in total are required to be generated. Therefore, with the aircraft according to the first embodiment, a processing load of the control circuit 56 can be reduced, and power consumption can be reduced.

Scheme by First Mode

As describe above, the flight-control unit 561 generates a plurality of control signals for achieving an objective flight attitude, and transfers the control signals to the ESCs 61 to 68, each of which implementing a part of the corresponding independent power-drive systems. At this point, the flight-control unit 561 generates a plurality of control signals of the quadruple signal lines throughout the airframe for the first ESC 61 and the second ESC 65, the first ESC 62 and the second ESC 66, the first ESC 63 and the second ESC 67, and the first ESC 64 and the second ESC 68, each of which is assigned to independent power-drive systems, respectively. Therefore, as compared to a case where control signals of the eight signal lines are generated in correspondence to the number of the rotors 31 to 38, the FC 5 has a lower processing load. Thus, calculation time can be shortened, and a risk of a failure can be suppressed.

Even when one in each of the ESCs 61 and 65, the ESCs 62 and 66, the ESCs 63 and 67, and the ESCs 64 and 68 is failed to operate properly, the failure does not affect input of a control signal for the other one, because each of which is assigned to independent power-drive systems. Thus, the aircraft according to the first embodiment can improves reliability to a rotor failure, and can continue a stable flight.

Figure 10:
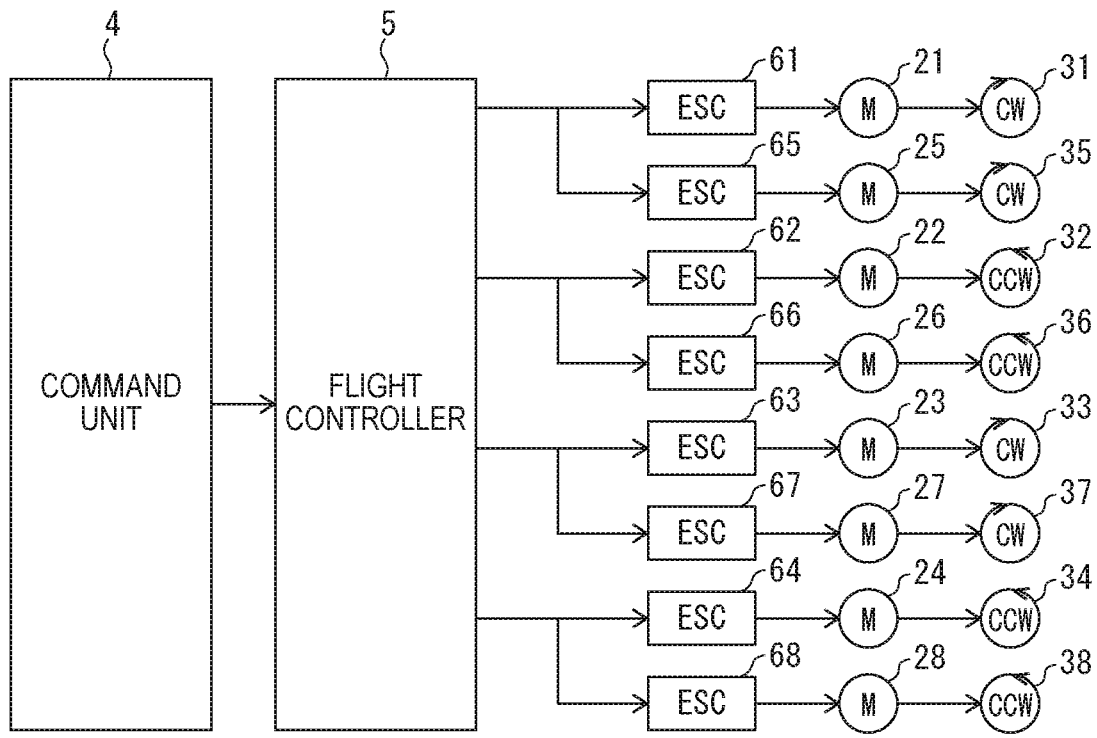
FIG. 10 is a block diagram illustrating another example of a control system of the aircraft according to the first embodiment.

Note that, as illustrated in FIG. 10, in order to achieve a specific control scheme in accordance with the first mode, the first ESC 61 and the second ESC 65, the first ESC 62 and the second ESC 66, the first ESC 63 and the second ESC 67, and the first ESC 64 and the second ESC 68 may be connected to the FC 5 so that the same control signal is entered. Therefore, when the second mode is not required, the FC 5 of the aircraft according to the first embodiment is only required to generate control signals, which are scheduled to be transmitted through the quadruple signal lines for controlling the first quadrant Q1, the second quadrant Q2, the third quadrant Q3, and the fourth quadrant Q4. Thus, a general-purpose FC of a known quadcopter, which includes quadruple rotors, pertaining to the earlier technology can be used in the aircraft pertaining to the first embodiment.

Scheme by Second Mode

Now, with reference to the flowchart illustrated in FIG. 11, an example of a control scheme in accordance with the second mode performed by the FC 5 of the aircraft according to the first embodiment will be explained. In the following description, the first quadrant Q1 is mainly exemplified. The same processing is performed in the second quadrant Q2, the third quadrant Q3, and the fourth quadrant Q4, and hence description is omitted.

First, as an initial setting, for example, the line-control unit 562 sets the first ESCs 61 to 64 as output destinations of control signals, thereby selectively using the main rotors 31 to 34 in the lower level for performing a flight. As compare to the auxiliary rotors 35 to 38 in the upper level, the main rotors 31 to 34 in the lower level can generate the lift more efficiently because there is no obstacle such as the beams 11 to 14 and the rotors below.

In Step S11, the flight-control unit 561 determines whether the lift generated by the main rotor 31 in the first quadrant Q1 is insufficient based on a difference between the objective flight attitude of the frame-structure (11 to 14) and a flight attitude detected by the sensor unit 51. For example, the flight-control unit 561 determines that the value of the lift is insufficient in a case where the frame-structure (11 to 14) is at an inclined orientation by lowering the beam 11 side in the first quadrant Q1 with respect to the objective flight attitude and where the flight attitude is not recovered even when a rotation frequency of the auxiliary rotor 35 is increased. Alternatively, the lift may be determined to be insufficient in a case where anti-torque in the direction CW is insufficient due to a failure of the main rotor 31 rotated in the CW direction and where the orientation of the frame-structure (11 to 14) yaws with respect to the objective flight attitude. When the value of the lift is determined to be reduced, or be insufficient, the processing proceeds to Step S12. When the value of the lift is determined to be sufficient, Step S11 is repeated.

In Step S12, the line-control unit 562 changes the output destination of the control signal, which is generated by the flight-control unit 561, from the first ESC 61 to the second ESC 65, and switches an output line of the control signal. When the output destination of the control signal is changed to the second ESC 65, the control signal fed to the first ESC 61 is transferred to the second ESC 65. Then, the driving of the first motor 21 is turned off, and the driving of the second motor 25 is turned on. Accordingly, the lift generated by the main rotor 31 rotated in the CW direction is recovered by the auxiliary rotor 35 rotated in the CW direction, which is the same rotation direction.

Figure 11:
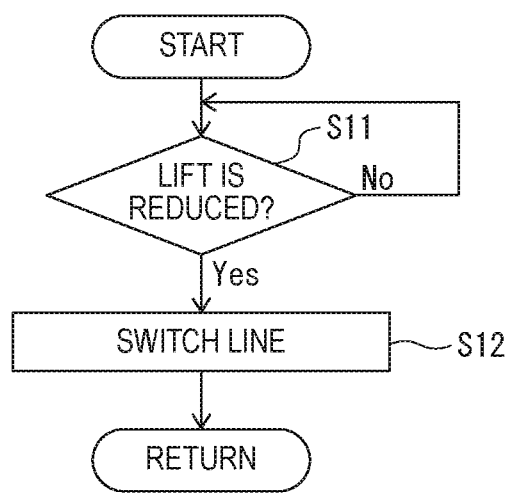
FIG. 11 is a flowchart illustrating an example of a control scheme by a second mode of the aircraft pertaining to the first embodiment.

The series of processing given in the flowchart illustrated in FIG. 11 may be performed in parallel in the first quadrant Q1, the second quadrant Q2, the third quadrant Q3, and the fourth quadrant Q4, or may be performed repeatedly in the order of, for example, the first quadrant Q1, the second quadrant Q2, the third quadrant Q3, and the fourth quadrant Q4. Further, description is made of the case where the main rotors 31 to 34 are used as the initial setting. However, the rotated rotors may be the auxiliary rotors 35 to 38. That is, in the initial state, the output destinations of the control signals may be the second ESCs 65 to 68, and a mix of any specific divided regions that use the auxiliary rotors 35 to 38 and the corresponding divided regions that use the main rotors 31 to 34 may exist.

The series of the control method for the aircraft, which is illustrated in FIG. 11, can be performed by controlling the control circuit 56 of the FC 5 illustrated in FIG. 4 with a computer software program having algorithm equivalent to that in FIG. 11. The computer software program may be stored in a storage unit (not shown) of a computer system implementing the control circuit 56 of the present invention. Further, the computer software program is stored in a computer-readable recording medium, and the recording medium is read out by a storage unit of an information processing apparatus. With the information processing apparatus, the series of the control method for the aircraft according to the present invention can be performed. Here, the "computer-readable recording medium" refers to, for example, a medium that can record the computer software program, such as an external memory unit of the computer, a semiconductor memory, a magnetic disc, an optical disc, a magnet-optic disc, and a magnetic tape.

Specifically, the "computer-readable medium" includes a flexible disc, a compact disk (CD)-ROM, a magneto-optical (MO) disc, a cassette tape, and an open-reel tape. For example, a main body of the information processing apparatus may have a flexible disc unit (flexible disc drive) and an optical disc unit (optical disc drive) built-in or may be connected externally to a flexible disc unit (flexible disc drive) and an optical disc unit (optical disc drive). A flexible disc or a CD-ROM is inserted to an insertion slot of a flexible disc drive or an optical disc drive, and a predetermined reading out operation is performed. With the reading out operation, the computer software program stored in those recording media can be installed to the storage unit implementing the control circuit 56C. Further, in addition to connection of the predetermined drive device, the computer software program can be stored in the storage unit via an information processing network such as the Internet.

The aircraft according to the first embodiment flies by rotating one of the rotors in each of the first quadrant Q1, the second quadrant Q2, the third quadrant Q3, and the fourth quadrant Q4, and rotates the other rotors that have not been rotated when the value of the lift is insufficient. In the aircraft according to the first embodiment, one of the overlapping double-level rotors is selectively rotated in each of the divided regions. Thus, the lift can be generated efficiently, and power consumption can be reduced by driving the plurality of motors.

First Modification

Figure 12:
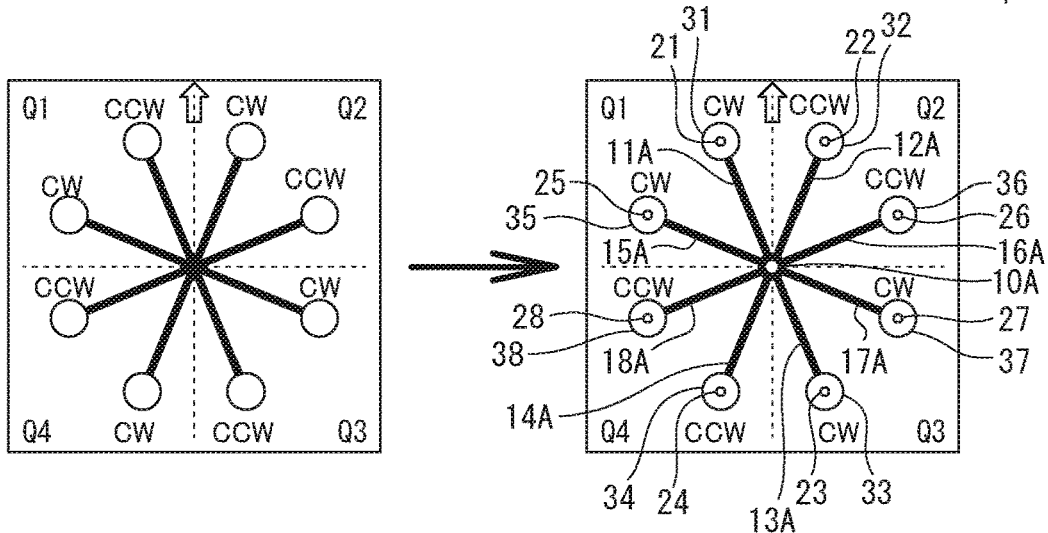
FIG. 12 is a schematic top view illustrating a VTOL aircraft according to a first modification of the first embodiment.

On the right side of FIG. 12 a flight-state chart of an aircraft according to a first modification of the first embodiment is represented. Although the aircraft according to the first modification is an octocopter, which is classified as the VTOL aircraft, is similar to that of the first embodiment described above in that a main-body 10A, a frame-structure (11A, 12A, . . . , and 18A) configured to support the main-body 10A at a center, and the eight rotors 31 to 38 arranged to the frame-structure (11A to 18A) are included, the structure of the frame-structure (11A to 18A) is different from the first embodiment in that the frame-structure (11A to 18A) includes eight beams 11A, 12A, . . . , and 18A. Each of the eight beams 11A, 12A, . . . , and 18A extends radially from the gravity center defined in the main-body 10A in a planar pattern. In addition, the structure of the aircraft according to the first modification is different from the first embodiment in that the rotors 31 to 38 arranged to distal ends of the beams 11A to 18A, respectively. The configuration, operations, and technical effects that are not described in the first modification are the same as those disclosed in the first embodiment described above, and overlapping description is omitted.

For example, the rotors 31 to 38 are disposed so that each of the rotation shafts of the rotors 31 to 38 is assigned at respective apexes of a regular octagon, which has the gravity center at a center of the arrangement of the rotors 31 to 38, in a planar pattern. Specifically, the main rotor 31 and the auxiliary rotor 35 arranged in the first quadrant Q1 and the main rotor 33 and the auxiliary rotor 37 arranged in the third quadrant Q3 rotate in the directions CW. The main rotor 32 and the auxiliary rotor 36 arranged in the second quadrant Q2 and the main rotor 34 and the auxiliary rotor 38 arranged in the fourth quadrant Q4 rotate in the directions CCW.

The rotors 31 to 38 may be mounted to upper levels at the distal ends of the beams 11A to 18A, respectively, or may be mounted to lower levels at the distal ends of the beams 11A to 18A, respectively. Alternatively, a mix of the rotors mounted to the upper levels on the beams 11A to 18A and the rotor mounted to the lower levels on the beams 11A to 18A may exist. The rotors 31 to 38 are arranged so that each of the areas of the rotation planes do not coincident in a planar pattern. In a planar pattern, the gravity center may be defined in the center of gravity of the frame-structure (11A to 18A).

Figure 13:
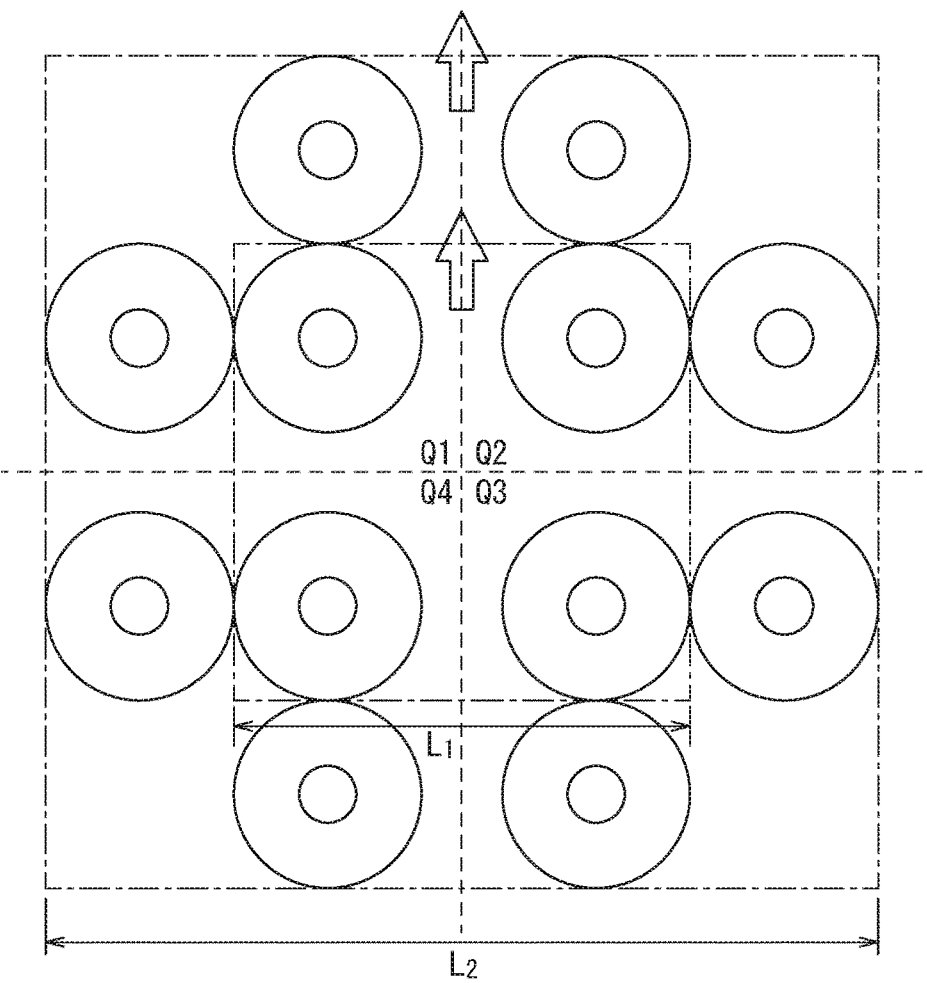
FIG. 13 is a view for comparing dimensions of the aircraft according to the first embodiment and the aircraft according to the first modification of the first embodiment in a planar pattern.

Thus, as illustrated in FIG. 13, in some cases, a dimension L2 of the aircraft according to the first modification of the first embodiment, which is defined in a planar pattern, may be about twice as large as a dimension L1 of the aircraft according to the first embodiment at a maximum, and an area in the case of the dimension L2 may be about four times as large as that in the case of the dimension L1 at the maximum. The respective rotors 31 to 38 are arranged so as not to overlap with each other in a planar pattern. The lift generated by the respective rotors 31 to 38 is acted efficiently. Meanwhile, the weight of the frame member is increased because the number of frame-structures is doubled, which is eight, and a length of the frame-structure is large. In contrast, with the aircraft according to the first embodiment, the rotors overlap with each other, and hence the airframe can be reduced in size and weight.

As illustrated in FIG. 12 on the left side, in the traditional octocopter including a radial frame-structure, the double rotors rotated in the CW direction and the direction CCW are arranged in each of the first quadrant Q1, the second quadrant Q2, the third quadrant Q3, and the fourth quadrant Q4, and the rotation directions of the rotors adjacent to each other are counter to each other. Thus, the flow analysis of the coaxial contra-rotating octocopter, which is described with reference to FIG. 8, can be applied to the traditional octocopter including a radial frame-structure, and the above-mentioned problems arise.

In contrast, similarly to the first embodiment, in the aircraft according to the first modification of the first embodiment, the main rotors 31 to 34 and the auxiliary rotors 35 to 38 rotated in the same directions as far as the main rotors are arranged in the same first quadrant Q1, the same second quadrant Q2, the same third quadrant Q3, and the same fourth quadrant Q4. Thus, redundancy for a rotor failure can be improved, and a risk of a crash can be suppressed.

Second Modification

Figure 14:
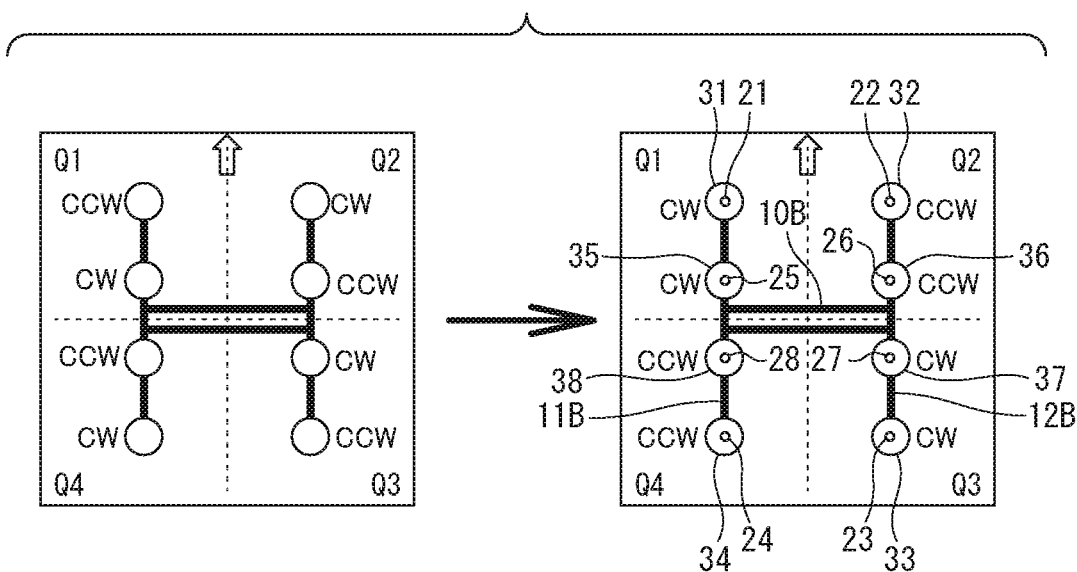
FIG. 14 is a schematic top view illustrating a VTOL aircraft according to a second modification of the first embodiment.

As illustrated in FIG. 14 on the right side, an aircraft or a VTOL aircraft according to a second modification of the first embodiment is different from the first embodiment and the first modification of the first embodiment described above in that a substantially H-shaped frame-structure (11B and 12B) is included in a planar pattern. The configuration, operations, and technical effects that are not described in the second modification are the same as those disclosed in the first embodiment and the first modification described above, and overlapping description is omitted.

The frame-structure (11B and 12B) includes a first beam 11B extending from the first quadrant Q1 to the fourth quadrant Q4 and a second beam 12B extending from the second quadrant Q2 to the third quadrant Q3 in parallel to the first beam 11B. A central main-body 10B is supported by the frame-structure (11B and 12B) between the first beam 11B and the second beam 12B. The main rotor 31, the auxiliary rotor 35, the auxiliary rotor 38, and the main rotor 34 are arrayed in the longitudinal direction of the first beam 11B. The main rotor 32, the auxiliary rotor 36, the auxiliary rotor 37, and the main rotor 33 are arrayed in the longitudinal direction of the second beam 12B. The rotors 31 to 38 are arranged so that each of the areas of the rotation planes do not coincident in a planar pattern.

On the left side of FIG. 14, a traditional octocopter including an H-shaped frame-structure is illustrated. With H-shaped frame-structure, double rotors, which rotate in the direction CW and the direction CCW, are arranged in each of the first quadrant Q1, the second quadrant Q2, the third quadrant Q3, and the fourth quadrant Q4, and the rotors adjacent to each other are rotated in the counter directions. In contrast, as illustrated on the right side of FIG. 14, in the aircraft according to the first modification of the first embodiment, the main rotors 31 to 34 and the auxiliary rotors 35 to 38 rotated in the same directions as far as the main rotors are arranged in the same first quadrant Q1, the same second quadrant Q2, the same third quadrant Q3, and the same fourth quadrant Q4. Thus, redundancy for a rotor failure can be improved, and a risk of a crash can be suppressed.

Third Modification

Figure 15:
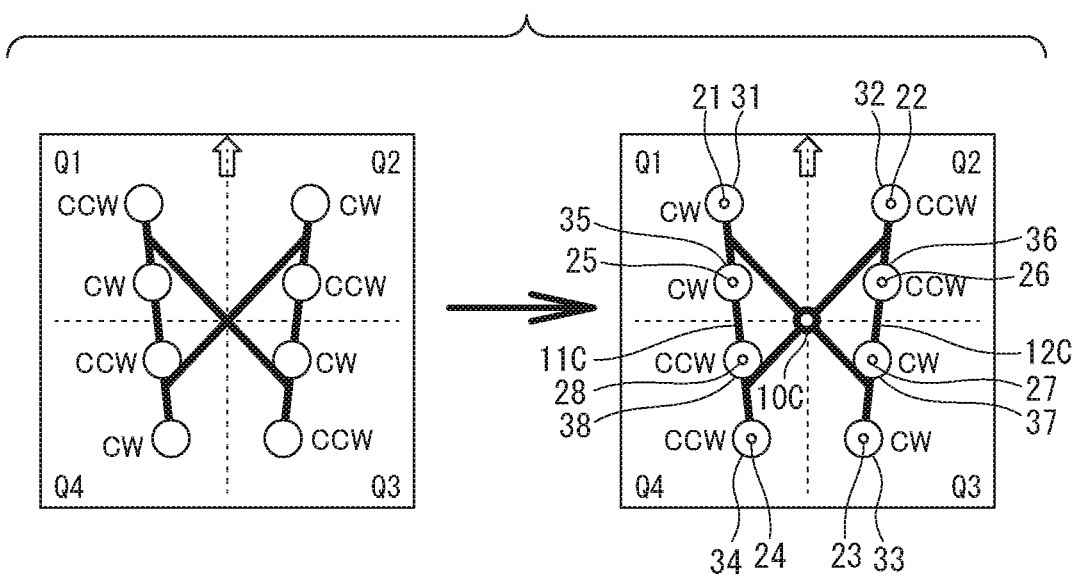
FIG. 15 is a schematic top view illustrating a VTOL aircraft according to a third modification of the first embodiment.

On the right side of FIG. 15, an aircraft or a VTOL aircraft according to a third modification of the first embodiment is illustrated. The aircraft according to the third modification is different from the first and second modifications of the first embodiment described above in that a substantially V-shaped frame-structure (11C and 12C) is included in a planar pattern. The configuration, operations, and technical effects that are not described in the third modification are the same as those disclosed in the first embodiment and the first and second modifications described above, and overlapping description is omitted.

The frame-structure (11C and 12C) includes a first inclined linear beam 11C extending from the first quadrant Q1 to the fourth quadrant Q4 and a second inclined linear beam 12C extending from the second quadrant Q2 to the third quadrant Q3. The first beam 11C and the second beam 12C are arranged to be close to each other as approaching from the front side to the rear side. A main-body 10C is supported by the frame-structure (11C and 12C) between the first beam 11C and the second beam 12C. The main rotor 31, the auxiliary rotor 35, the auxiliary rotor 38, and the main rotor 34 are arrayed in the substantially longitudinal direction of the first beam 11C. The main rotor 32, the auxiliary rotor 36, the auxiliary rotor 37, and the main rotor 33 are arrayed in the substantially longitudinal direction of the second beam 12C. The rotors 31 to 38 are arranged so that each of the areas of the rotation planes do not coincident in a planar pattern.

On the left side of FIG. 15, a traditional octocopter including a V-shaped frame-structure is illustrated. In the traditional octocopter illustrated on the left side, double rotors rotated in the CW direction and the direction CCW are arranged in each of the first quadrant Q1, the second quadrant Q2, the third quadrant Q3, and the fourth quadrant Q4, and the rotors adjacent to each other are rotated in the counter directions. In contrast, in the aircraft according to the first modification of the first embodiment, the main rotors 31 to 34 and the auxiliary rotors 35 to 38 rotated in the same directions as far as the main rotors are arranged in the same first quadrant Q1, the same second quadrant Q2, the same third quadrant Q3, and the same fourth quadrant Q4. Thus, redundancy for a rotor failure can be improved, and a risk of a crash can be suppressed.

Second Embodiment

Figure 16:
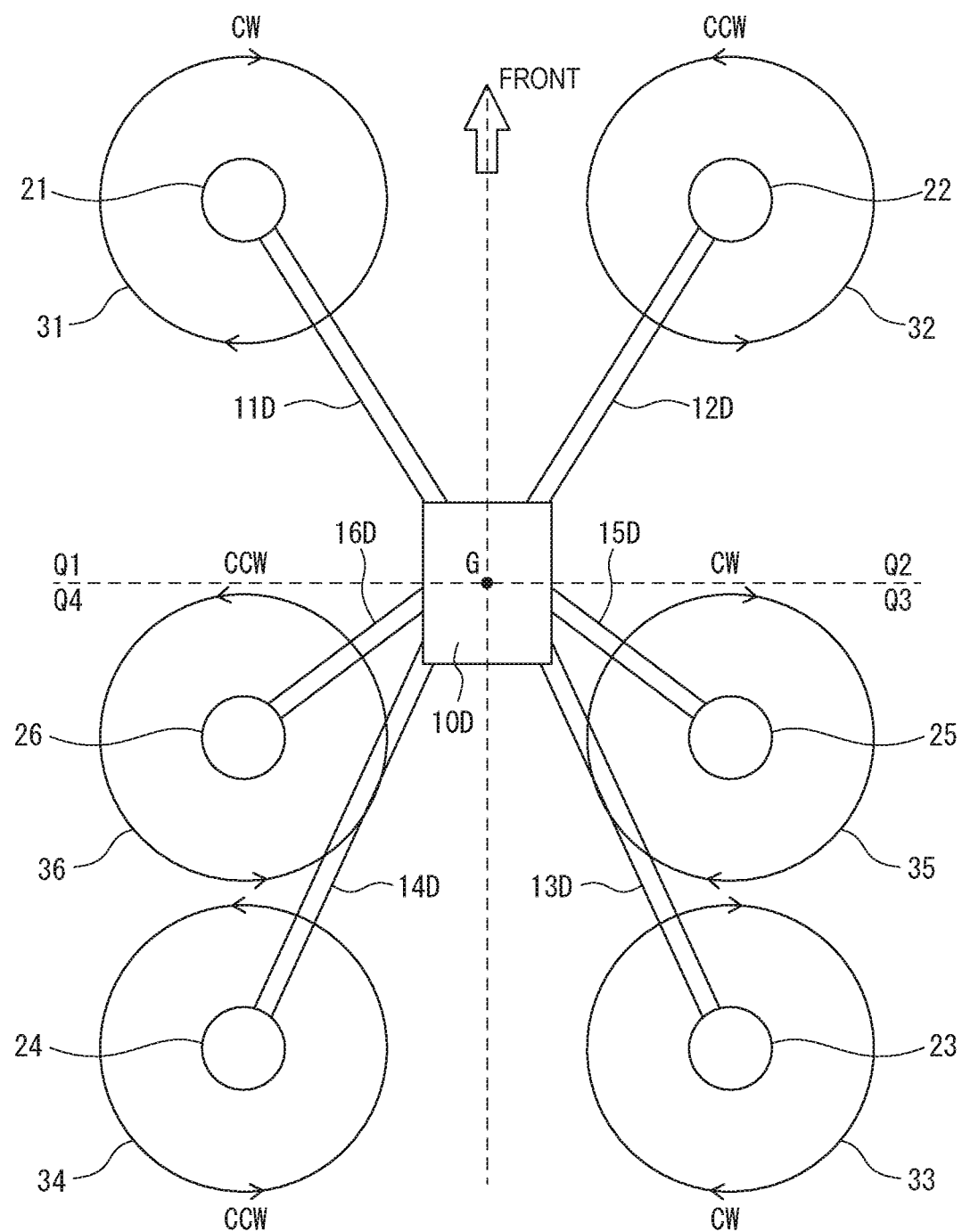
FIG. 16 is a schematic top view illustrating a basic configuration of a VTOL aircraft according to a second embodiment of the present invention.

In the first embodiment, description is made of the example in which the double rotors are arranged in each of the first quadrant Q1, the second quadrant Q2, the third quadrant Q3, and the fourth quadrant Q4. However, the double rotors are not required to be arranged in all the divided regions. That is, as illustrated in FIG. 16, an aircraft, or a VTOL aircraft according to a second embodiment of the present invention is a hexacopter including hextuple rotors in total, which are the rotors 31 to 36. A main rotor 31 is arranged in the first quadrant Q1. A main rotor 32 is arranged in the second quadrant Q2. A main rotor 33 and an auxiliary rotor 35 are arranged in the third quadrant Q3. A main rotor 34 and an auxiliary rotor 36 are arranged in the fourth quadrant Q4. The configuration, operations, and technical effects that are not described in the second embodiment are the same as those disclosed in the first embodiment described above, and hence description is omitted.

A frame-structure (11D, 12D, . . . , and 16D) of the aircraft according to the second embodiment includes six beams 11D, 12D, . . . , and 16D corresponding to the hextuple rotors 31 to 36, respectively. The frame-structure (11D to 16D) supports a main-body 10D at a center. In a planar pattern, the gravity center G is defined in the main-body 10D. The beams 11D to 16D extend radially from the gravity center G side to the outside. The motors 21 to 26, each of which implementing a part of the corresponding independent power-drive systems, configured to rotate the hextuple rotor 31 to 36 are mounted to distal ends of the beams 11D to 16D, respectively. The rotors 31 to 36 may be mounted to upper levels at the distal ends of the beams 11D to 16D, or may be mounted to lower levels at the distal ends of the beams 11D to 16D. Alternatively, a mix of the rotors mounted to the upper levels on the beams 11D to 16D and the rotors mounted to the lower levels on the beams 11D to 16D may exist.

The main rotor 31 arranged in the first quadrant Q1 is rotated in the CW direction. The main rotor 32 arranged in the second quadrant Q2 is rotated in the CCW direction. The main rotor 33 and the auxiliary rotor 35 arranged in the third quadrant Q3 are rotated in the CW direction. The main rotor 34 and the auxiliary rotor 36 arranged in the fourth quadrant Q4 are rotated in the CCW direction. As described above, the rotors rotated in the same directions are arranged in the third quadrant Q3 and the fourth quadrant Q4. Thus, even when one of the rotors in each of the third quadrant Q3 and the fourth quadrant Q4 is failed to operate properly, the lift can be recovered by the other rotor.

Comparative Example

Figure 17:
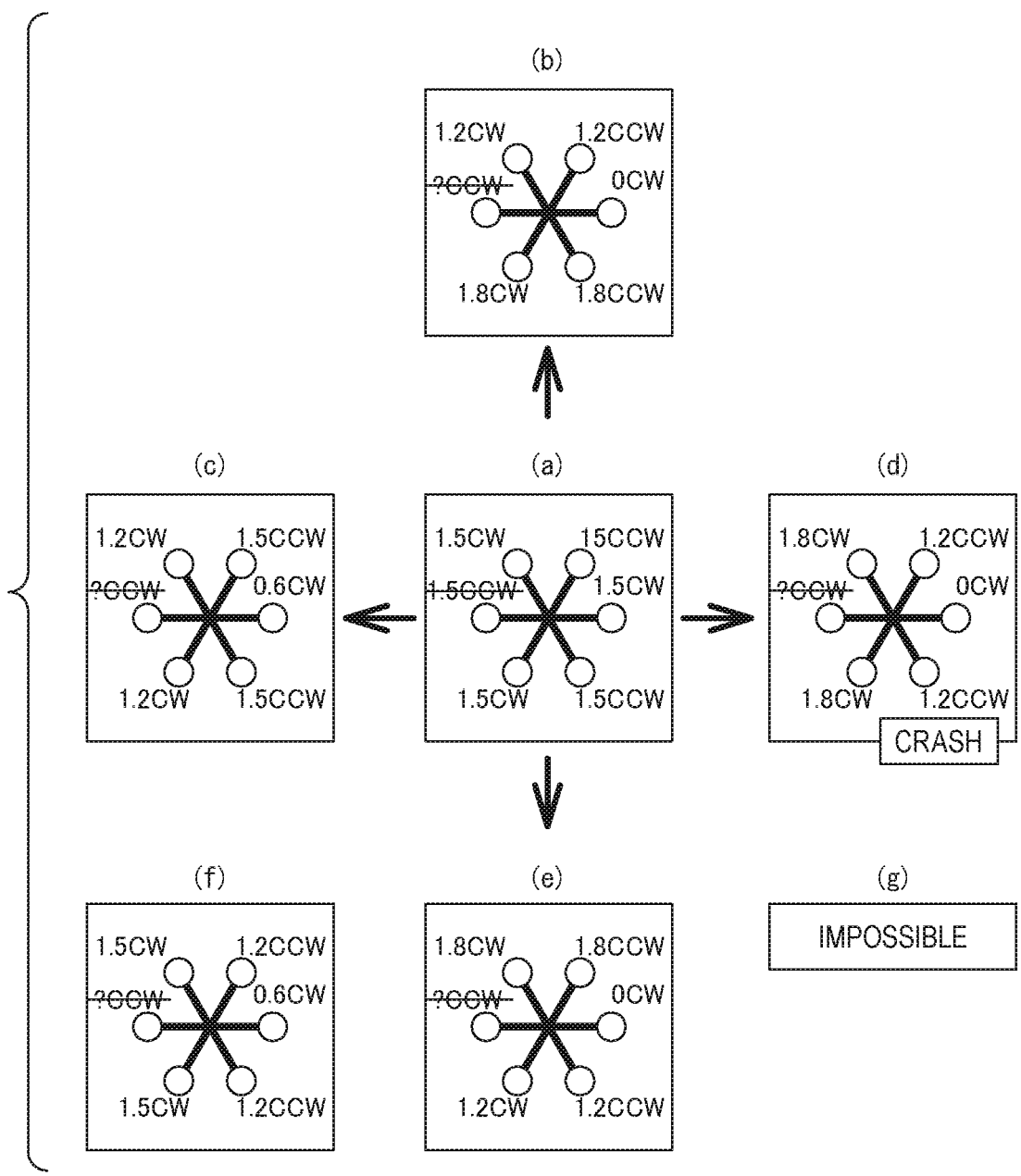
FIG. 17 is a set of flight-state charts illustrating flight operations of a general hexacopter at the time of a rotor failure.

Now, with reference to a set of flight-state charts illustrated in FIG. 17, description is made of respective flight operations in an abnormal state in which one rotor of a general hexacopter is failed to operate properly. The flight-state charts (a) to (g) in FIG. 17 correspond to the flight-state charts (a) to (g) in FIG. 5 and FIG. 7.

Rotors of the general hexacopter are assigned to apexes of a regular hexagon, and are arranged alternately in a circumferential direction so that the rotation directions of the rotors are counter to those of the adjacent rotors. In this manner, the general hexacopter is configured to perform the respective flight operations by arranging the rotors rotated in the CW direction and the directions CCW at an equal interval in trisected equal areas, which are obtained by dividing the airframe about the center in a planar pattern. In the following, description is made of an example in which one of the rotors rotated in the CCW direction is failed to operate properly.

In the flight-state chart (a), the value of the lift at the right rotor facing the failed left rotor is adjusted to 0, and the values of the lifts at the remaining rotors are adjusted to be even. With the adjustments of lift of the rotors, the orientation of the airframe can be stable about the roll axis, the pitch axis, and the yaw axis. The number of rotors rotated in the CW direction and the number of rotors rotated in the CCW direction are balanced in the front-and-rear direction. Hence, by adjusting the ratio of the lift in the front-and-rear direction under a state in which the lift in the direction CW and the lift in the direction CCW are equal to each other in the front-and-rear direction, the advancing flight-state chart (b) and the retreating flight-state chart (e) are achieved.

In the flight-state chart (c), the lift of the right rotor rotated in the CW direction is 0.6, the lift of the left front rotor and the left rear rotor, which are rotated in the CW direction, is 1.2, and the lift of the right front rotor and the fight rear rotor, which are rotated in the CCW direction, is 1.5. In this case, the airframe-orientation is balanced about the pitch axis and the yaw axis and rolls leftward to move leftward.

The flight-state chart (d) is the right moving state. However, as the left rotor is failed to operate properly, the lift of the right rotor rotated in the CW direction is 0. When the lift of the left front rotor and the left rear rotor, which are rotated in the CW direction, is 1.8, the lift of the right front rotor and the right rear rotor, which are rotated in the CCW direction, is 2.2 in order to roll rightward, orientation of the airframe cannot stop yawing in the direction CW. As a result, the airframe crashes.

In the flight-state chart (f), the lift of the right rotor rotated in the CW direction is 06, the left front rotor and the left rear rotor, which are rotated in the CW direction, is 1.5, and the lift of the right front rotor and the right rear rotor, which are rotated in the CCW direction, is 1.2. In this case, the airframe-orientation is balanced about the roll axis and the pitch axis yaws in the direction CCW to turn leftward.

The flight-state chart (g) shall be the right turning state of yaw in the direction CW. However, as the left rotor rotated in the CCW direction is failed to operate properly, the lift in the CCW cannot be larger than the lift in the direction CW under a balanced state about the roll axis and the pitch axis. Thus, the right turning yaw in the direction CW cannot be achieved.

As illustrated by flight-state charts (a) to (g) in FIG. 17, in the general hexacopter, because an operation in which the lift generated by the rotor facing to the faulty rotor becomes 0, when one of the rotors has been failed, is frequent, when the airframe is intended to move in the direction to the facing rotor side, the airframe crashes. Further, the yaw direction is limited to one direction. When the right rotor loses thrust, because the rotor arrangement is the same as the inappropriate rotor arrangement described with reference to FIG. 9, a risk of a crash is further higher.

In contrast, in the aircraft according to the second embodiment, the main rotors 31 to 34 rotated in the directions counter to those in the adjacent divided regions are arranged in the first quadrant Q1, the second quadrant Q2, the third quadrant Q3, and the fourth quadrant Q4. The auxiliary rotors 35 and 36 rotated in the same directions as the main rotors 33 and 34 are arranged in the third quadrant Q3 and the fourth quadrant Q4. Thus, redundancy for a rotor failure in the third quadrant Q3 and the fourth quadrant Q4 can be improved, and a risk of a crash can be suppressed.

Figure 18:
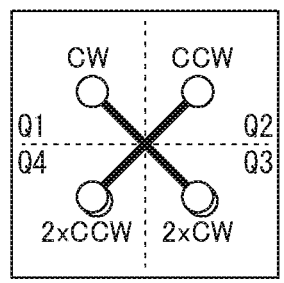
FIG. 18 is a flight-state chart illustrating another example of rotor arrangement of the aircraft according to the second embodiment.

In the example illustrated in FIG. 16, the rotors 33 to 36 are arranged in the third quadrant Q3 and the fourth quadrant Q4 so that each of the areas of the rotation planes do not coincident in a planar pattern. However, the rotors 33 to 36 may be arranged so that the rotation planes overlap with each other. For example, as illustrated in FIG. 18, the rotors in the third quadrant Q3 and the fourth quadrant Q4 may be rotors that are coaxial and are rotated in the same directions.

Figure 19:
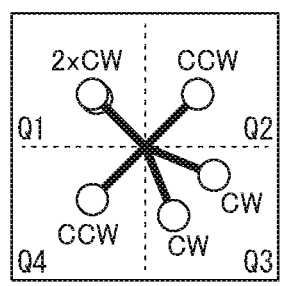
FIG. 19 is a flight-state chart illustrating another example of rotor arrangement of the aircraft according to the second embodiment.

Further, the divided region in which the plurality of rotors rotated in the same directions is not limited to the third quadrant Q3 and the fourth quadrant Q4, which are adjacent to each other. As illustrated in FIG. 19, the plurality of rotors rotated in the same directions may be arranged in the first quadrant Q1 and the third quadrant Q3, which face with each other. Further, a mix of the divided regions in which the rotors having the overlapping rotation planes are arranged and the divided regions in which the rotors having the non-overlapping rotation planes are arranged may exist.

Third Embodiment

Figure 20:
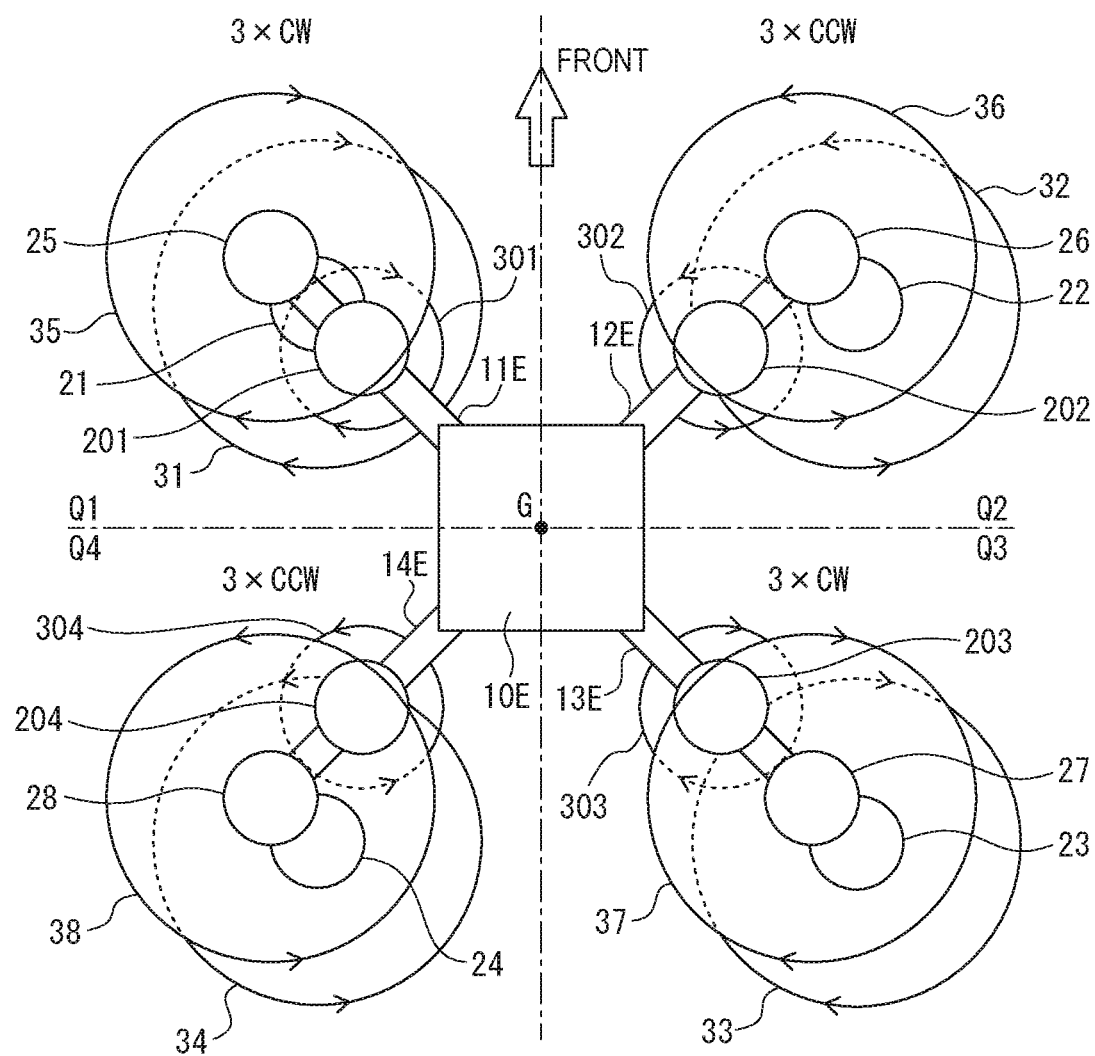
FIG. 20 is a schematic top view illustrating a basic configuration of a VTOL aircraft according to a third embodiment of the present invention.

As illustrated in FIG. 20, an aircraft, or a VTOL aircraft according to a third embodiment of the present invention is different from the first embodiment in that third rotors 301 to 304, which are rotated in the same directions as the main rotors (first rotors) 31 to 34 and the auxiliary rotors (second rotors) 35 to 38, are included. That is, the aircraft according to the third embodiment is a dodecacopter including duodecuple rotors 31 to 38 and 301 to 304 in total, which are the main rotors 31 to 34, the auxiliary rotors 35 to 38, and the third rotors 301 to 304. The configuration, operations, and technical effects that are not described in the third embodiment are the same as those disclosed in the first and second embodiments described above, and overlapping description is omitted.

For example, the third rotors 301 to 304 are arranged with rotation shafts provided to a frame-structure (11E to 14E) between the main rotors 31 to 34 positioned in the lower level and the auxiliary rotors 35 to 38 positioned in the upper level, respectively. For example, the third rotors 301 to 304 are arranged so that the rotation planes partially overlap with the main rotors 31 to 34 and the auxiliary rotors 35 to 38 in a planar pattern, respectively.

Figure 21:
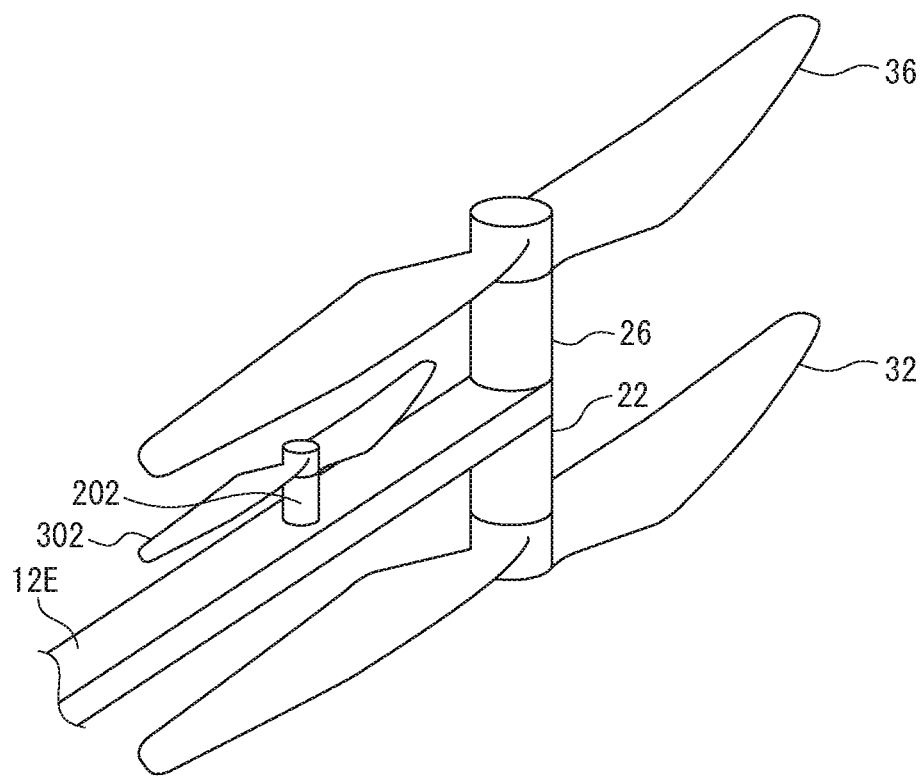
FIG. 21 is an enlarged perspective view illustrating an example of rotors included in the aircraft according to the third embodiment.

For example, as illustrated in FIG. 21 with regard to the second quadrant Q2, when the third rotor 302 is rotated in the CCW direction as seen from above the frame-structure (11E to 14E), a blade of the third rotor 302 is adjusted in pitch angle so as to generate upward lift of the frame-structure (11E to 14E). When the third rotor 304 is rotated in the CCW direction, a blade of the third rotor 304 in the fourth quadrant Q4 is adjusted in pitch angle, thereby generating upward lift of the frame-structure (11E to 14E). Meanwhile, when the third rotors 301 and 303 are rotated in the CW direction, a blade of the third rotor 301 in the first quadrant Q1 and a blade of the third rotor 303 in the third quadrant Q3 are adjusted in pitch angle so as to generate upward lift of the frame-structure (11E to 14E).

The aircraft according to the third embodiment further includes third motors 201 to 204 configured to rotate the third rotors 301 to 304, respectively. As illustrated in FIG. 20, the third motor 201 and the third rotor 301 are mounted to, for example, an upper side of the beam 12E. Similarly, the third motor 201 and the third rotor 301 in the first quadrant Q1 are mounted to an upper side of the beam 11E. The third motor 203 and the third rotor 303 in the third quadrant Q3 are mounted to an upper side of the beam 13E. The third motor 204 and the third rotor 304 in the fourth quadrant Q4 are mounted on an upper side of the beam 14E.

It is preferred that the third rotors 301 to 304 be positioned on distal end sides of the beams 11E to 14E as much as possible for achieving the stability of the orientation of the frame-structure (11E to 14E). The third rotors 301 to 304 are arranged so that the respective blades do not interfere with the main rotors 31 to 34 and the first motors 21 to 24, each of which being assigned in the corresponding power-drive systems. Further, the third rotors 301 to 304 may be mounted on the bottom side of the beams 11E to 14E, respectively.

Figure 22:
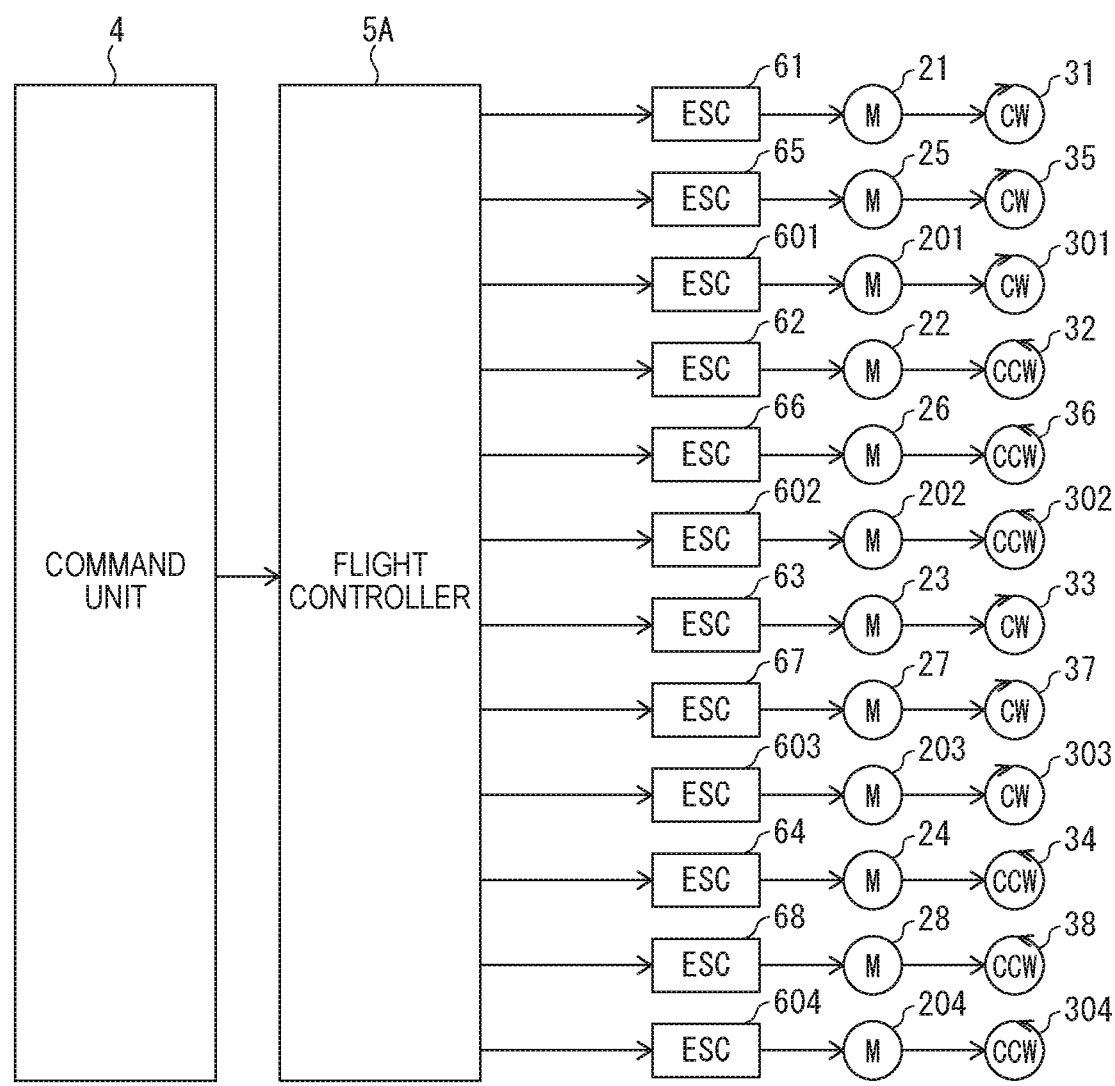
FIG. 22 is a block diagram illustrating a control system of the aircraft according to the third embodiment.

As illustrated in FIG. 22, an FC 5A included in the aircraft according to the third embodiment can generate a plurality of control signals for the ESCs 61 to 68 and 601 to 604 for the independent power-drive systems so that the duodecuple motors 21 to 28 and 201 to 204 can be driven independently.

Thus, the FC 5A and the ESCs 61 to 68 and 601 to 604 are connected to each other by independent interconnections.

The FC 5A may operate with first and second modes. In the first mode, the same control signals are provided to the triple ESCs in each of the quadruple divided regions or in each of the quadrants. In the second mode, a control signal is delivered to at least any one of the triple ESCs in each of the quadruple divided regions.

For example, in the second mode, as an initial setting, the FC 5A sets the first ESCs 61 to 64 as output destinations of control signals, thereby selectively using the main rotors 31 to 34 to perform a flight. The FC 5B transfers a plurality of control signals to the first ESCs 61 to 64 and controls the lift of each of the main rotors 31 to 34, thereby achieving the objective flight attitude of the frame-structure (11E to 14E) in response to an instruction signal from the command unit 4.

Subsequently, similarly to Step S11 in the flowchart illustrated in FIG. 11, the FC 5A determines whether a divided region having insufficient value of lift exists based on a difference between the objective flight attitude and a measured flight attitude detected by the sensor unit 51. When the value of the lift is insufficient in a specific divided region, the FC 5A switches one of the output lines of control signals by changing the corresponding output destination of a specific control signal to, for example, the second ESCs 65 to 68 which may be assigned tentatively as the specific divided region having the insufficient value of lift. By changing the output destination of the specific control signal to the specific divided region, in the specific divided region having the insufficient value of lift, the driving of the first motors 21 to 24 is turned off, and the driving of the second motors 25 to 28 is turned on, because the corresponding power-drive systems are mutually independent. As a result, the lift is recovered by the auxiliary rotors 35 to 38.

When the insufficient value of lift is detected in the specific divided region in which the second ESCs 65 to 68 are assigned as the input destinations of control signals, the FC 5A is only required to change the output destinations of control signals to the third ESCs 601 to 604, which corresponds to the specific divided region having the insufficient value of lift. By changing the output destinations of control signals to the third ESCs 601 to 604, in the specific divided region having the insufficient value of lift, the driving of the second motors 25 to 28 is turned off, and the driving of the third motors 201 to 204 is turned on. As a result, the lift is recovered by the third rotors 301 to 304.

The aircraft according to the third embodiment performs a flight by rotating one of the rotors in each of the first quadrant Q1, the second quadrant Q2, the third quadrant Q3, and the fourth quadrant Q4. When any specific lift is measured to be insufficient, the other rotor that has not been rotated initially is drive to be rotated. Further, in the aircraft according to the third embodiment, because a desired combination of the overlapping double-level rotors can be selectively rotated in each of the divided regions, when a specific lift is measured to be insufficient, the specific lift can be made to be efficient, and therefore, power consumption by driving a plurality of motors can be reduced.

Figure 23:
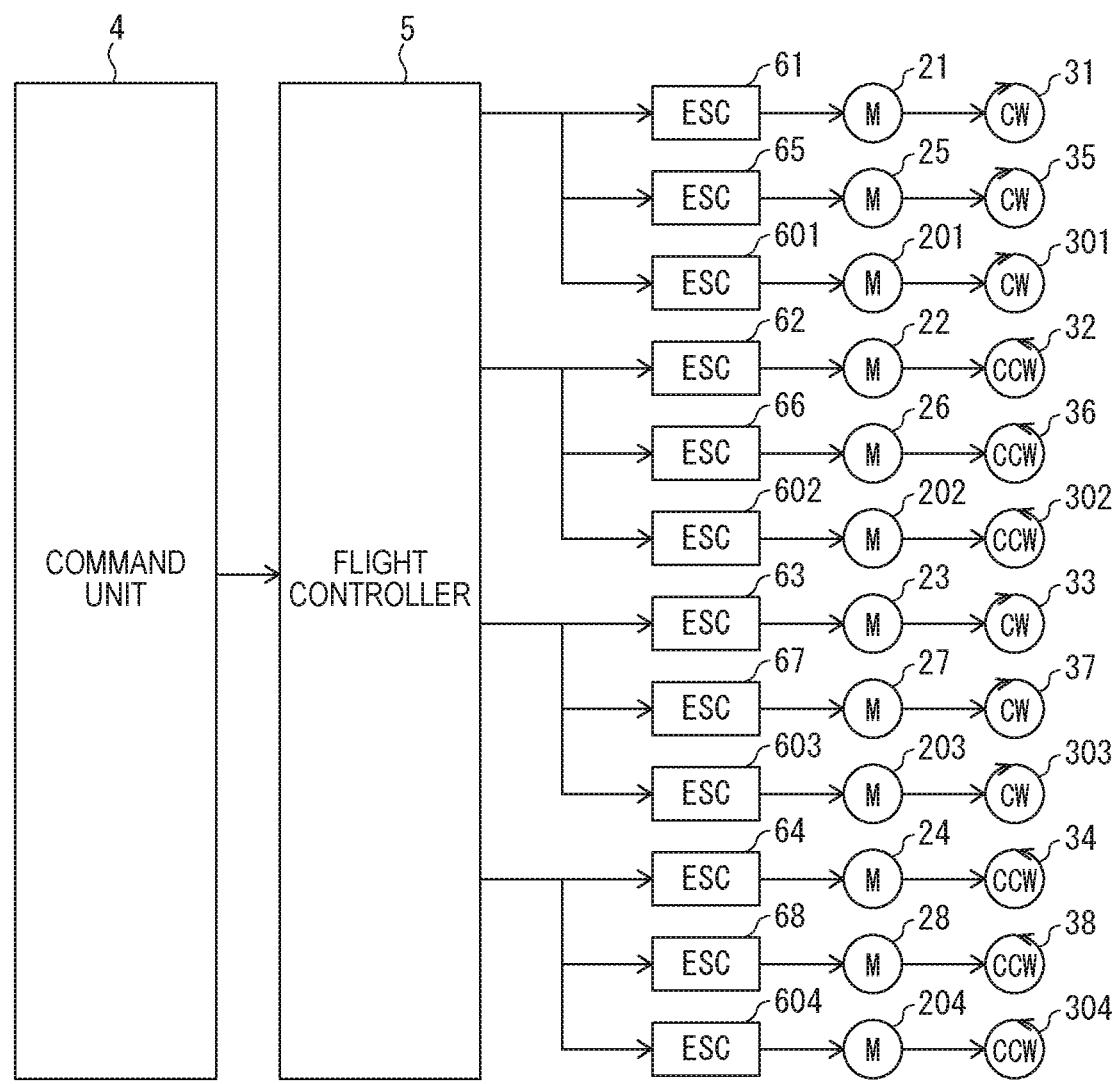
FIG. 23 is a block diagram illustrating another example of a control system of the aircraft according to the third embodiment.

Note that, as illustrated in FIG. 23, in an optional case that the control scheme in accordance with the first mode is only used, the ESCs 61 to 68 and 601 to 604 may be connected to the FC 5 so that the same control signals can be fed to the respective divided regions. Therefore, in the optional case when the second mode is not required, the FC 5 of the aircraft according to the third embodiment is only required to generate control signals, which are scheduled to be transmitted through the quadruple signal lines for controlling the first quadrant Q1, the second quadrant Q2, the third quadrant Q3, and the fourth quadrant Q4. Thus, a general-purpose FC for a known quadcopter including quadruple rotors of the earlier technology can be used in the optional case.

Further, description is made of the example in which the main rotors (first rotors) 31 to 34 are used in the initial setting. However, the rotors scheduled to be rotate initially may be the auxiliary rotors (second rotors) 35 to 38 or the third rotors 301 to 304. Further, any mix of the divided regions using the main rotors 31 to 34 in the initial setting, the divided regions using the auxiliary rotors 35 to 38 in the initial setting, and the divided regions using the third rotors 301 to 304 in the initial setting can be assigned.

Fourth Embodiment

Figure 24:
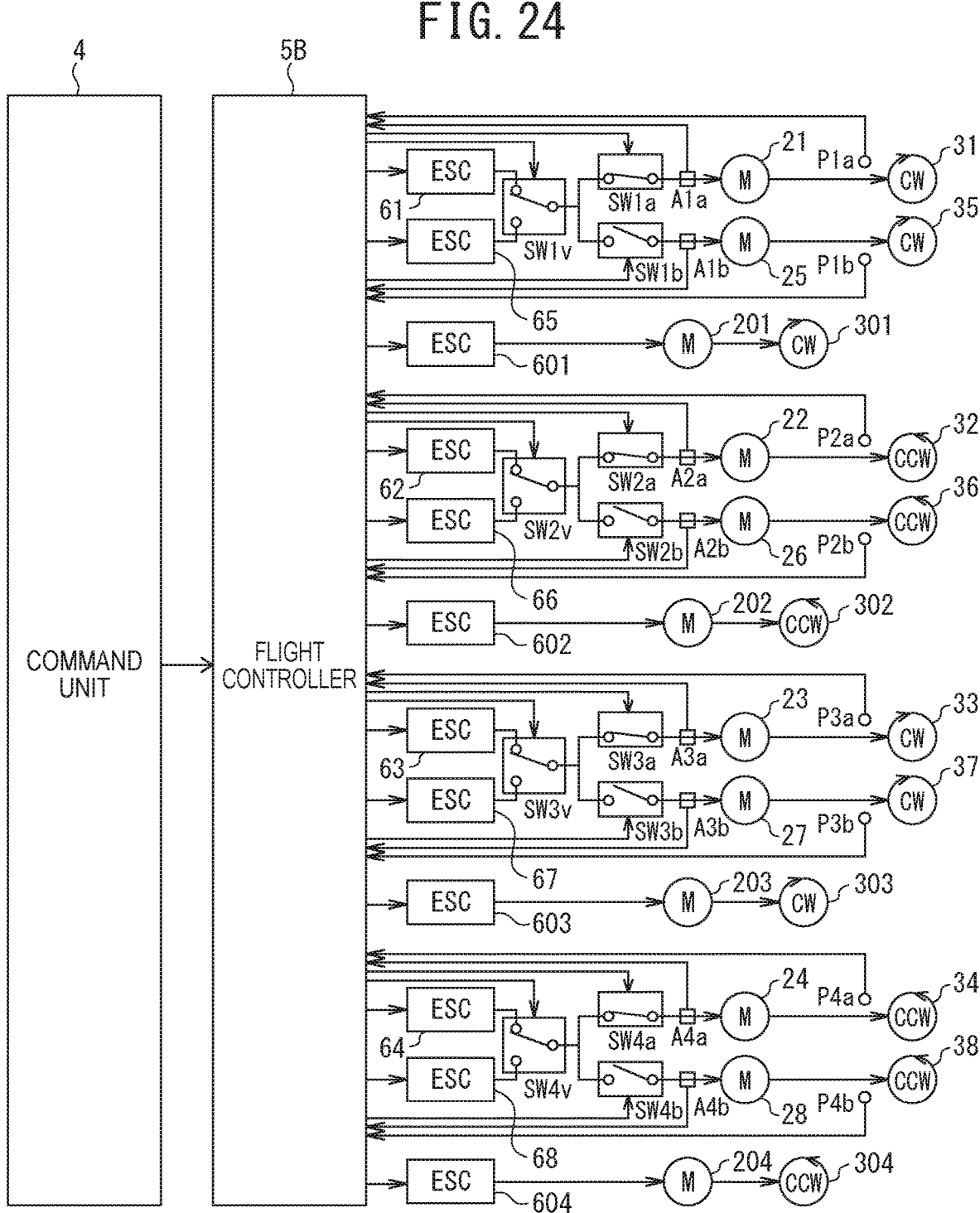
FIG. 24 is a block diagram illustrating the control system of the aircraft according to the third embodiment.

As illustrated in FIG. 24, an aircraft, or a VTOL aircraft according to a fourth embodiment of the present invention is different from the third embodiment in that redundancy is improved by including a switching mechanism for electing the ESCs 61 to 68 and 601 to 604, each of which implementing a part of the corresponding independent power-drive systems, and furthermore, for electing the motors 21 to 28 and 201 to 204, which are scheduled to be used. In the fourth embodiment, the FC 5B and the ESCs 61 to 68 and 601 to 604 are connected to each other by the independent interconnections. The configuration, operations, and technical effects that are not described in the fourth embodiment are the same as those in the third embodiment, and hence description is omitted.

The aircraft according to the fourth embodiment includes a plurality of first current sensors A1a to A4a configured to detect a plurality of first currents (drive signals) to be applied to the first motors 21 to 24, each of which being assigned in the independent power-drive systems, respectively, and a plurality of first switches SW1a to SW4a configured to open and close the interconnections of the first motors 21 to 24 through which the corresponding first currents flow, respectively. Furthermore, the aircraft according to the fourth embodiment includes a plurality of second current sensors A1b to A4b configured to detect a plurality of second currents (drive signals) to be applied to the second motors 25 to 28, and a plurality of second switches SW1b to SW4b configured to open and close the interconnections of the second motors 25 to 28 through which the corresponding second currents flow, respectively.

The first current sensors A1a to A4a and the second current sensors A1b to A4b may detect the plurality of currents with a plurality of current-detectors using a plurality of clamp sensors or a plurality of shunt resistances. When each of the first motors 21 to 24 and the second motors 25 to 28 is a brush motor, dual input wires are connected to one motor. In a case of a brushless motor, triple input wires are connected to one motor. Each of the first current sensors A1a to A4a and the second current sensors A1b to A4b is a double-strand or a triple-strand ammeter in accordance with categories of the first motors 21 to 24 and the second motors 25 to 28.

An ESC switch SW1v is connected between inputs of the first switch SW1a and the second switch SW1b and between outputs of the first ESC 61 and the second ESC 65. The ESC switch SW1v is a switch configured to switch between the first ESC 61 and the second ESC 65, which delivers drive signals to the first motor 21 and the second motor 25. The same drive signal is entered to the first switch SW1a and the second switch SW1b from one of the first ESC 61 and the second ESC 65, which is selected by the position of the ESC switch SW1v.

An ESC switch SW2v is connected between inputs of the first switch SW2a and the second switch SW2b and between outputs of the first ESC 62 and the second ESC 66. The ESC switch SW2v is a switch configured to switch between the first ESC 62 and the second ESC 66, which delivers drive signals to the first motor 22 and the second motor 26. The same drive signal is entered to the first switch SW2a and the second switch SW2b from one of the first ESC 62 and the second ESC 66, which is selected by the position of the ESC switch SW2v.

An ESC switch SW3v is connected between inputs of the first switch SW3a and the second switch SW3b and between outputs of the first ESC 63 and the second ESC 67. The ESC switch SW3v is a switch configured to switch between the first ESC 63 and the second ESC 67, which delivers drive signals to the first motor 23 and the second motor 27. The same drive signal is entered to the first switch SW3a and the second switch SW3b from one of the first ESC 63 and the second ESC 67, which is selected by the position of the ESC switch SW3v.

An ESC switch SW4v is connected between inputs of the first switch SW4a and the second switch SW4b and between outputs of the first ESC 64 and the second ESC 68. The ESC switch SW4v is a switch configured to switch between the first ESC 64 and the second ESC 68, which delivers drive signals to the first motor 24 and the second motor 28. The same drive signal is entered to the first switch SW4a and the second switch SW4b from one of the first ESC 64 and the second ESC 68, which is selected by the position of the ESC switch SW4v.

Further, the aircraft according to the fourth embodiment includes first rotation sensors P1a to P4a configured to detect rotation states of the main rotors 31 to 34, respectively, and second rotation sensors P1b to P4b configured to detect rotation states of the auxiliary rotors 35 to 38, respectively. The first rotation sensors P1a to P4a and the second rotation sensors P1b to P4b are, for example, optical sensors configured to optically read rotation states of blades of the main rotors 31 to 34 and the auxiliary rotors 35 to 38, respectively.

Figure 25:
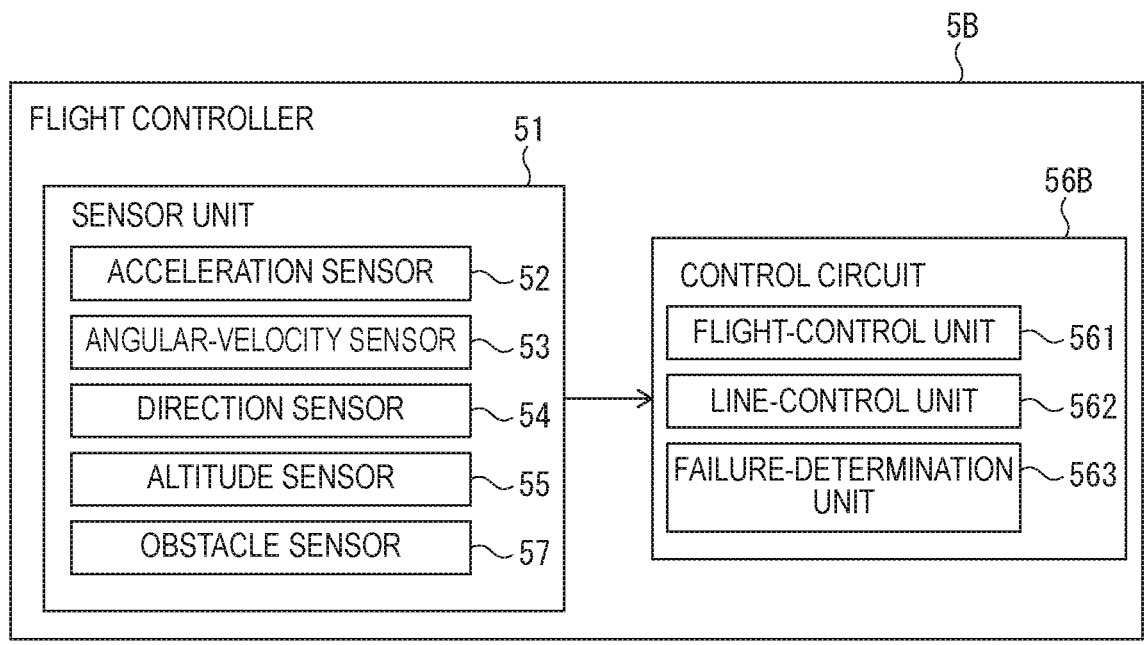
FIG. 25 is a block diagram illustrating a flight controller of an aircraft, or a VTOL aircraft according to a fourth embodiment of the present invention.

As illustrated in FIG. 25, a control circuit 56B of the FC 5B includes a failure-determination unit 563 as a functional or a physical hardware resource in addition to a flight-control unit 561 and a line-control unit 562. The line-control unit 562 switches lines of control signals for the rotors 31 to 38 and 301 to 304 by controlling the first switches SW1a to SW4a, the second switches SW1b to SW4b, and the ESC switches SW1v to SW4v. The failure-determination unit 563 is a logical circuit configured to determine a failure of the ESCs 61 to 68 and the motors 21 to 28, each of which being assigned in the independent power-drive systems, respectively, based on currents detected by the first current sensors A1a to A4a and the second current sensors A1b to A4b. Further, the failure-determination unit 563 determines a failure of the rotors 31 to 38 based on rotation states detected by the first rotation sensors P1a to P4a and the second rotation sensors P1b to P4b and currents detected by the first current sensors A1a to A4a and the second current sensors A1b to A4b.

Scheme by First Mode

Figure 26:
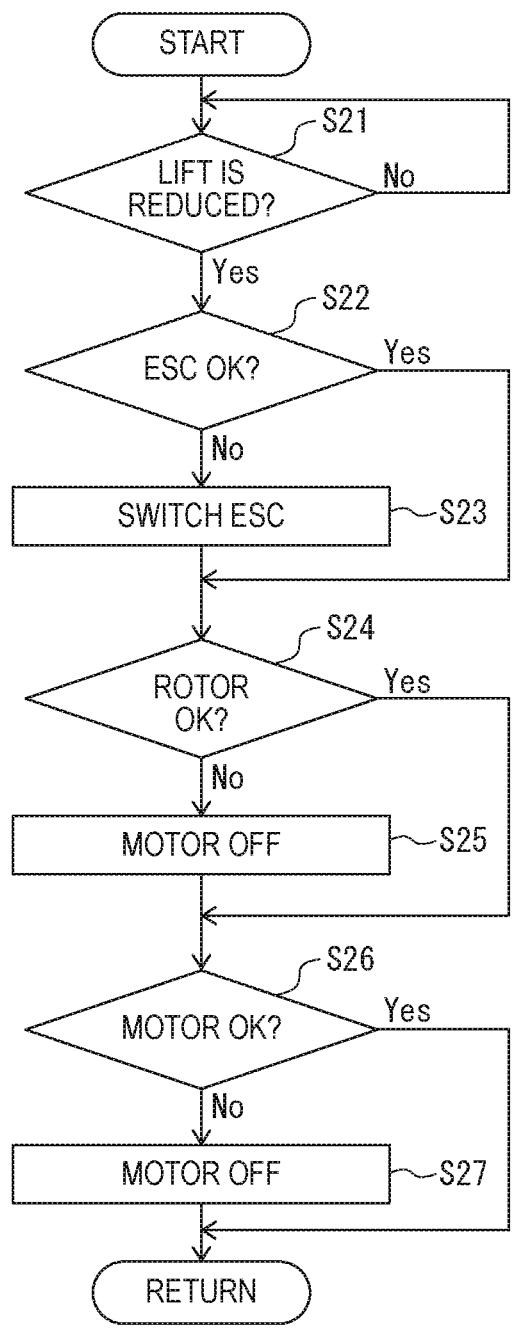
FIG. 26 is a flowchart illustrating an example of a control scheme by a first mode of the aircraft pertaining to the fourth embodiment.

Now, with reference to the flowchart illustrated in FIG. 26, description is made of an example of a control scheme in accordance with the first mode of the aircraft pertaining to the fourth embodiment. In the following description, the first quadrant Q1 is mainly exemplified. The same processing is performed in the second quadrant Q2, the third quadrant Q3, and the fourth quadrant Q4, and hence description is omitted.

First, as an initial setting, for example, the line-control unit 562 sets all the ESC switches SW1v to SW4v to the first ESCs 61 to 64 sides. By turning the first switches SW1a to SW4a and the second switches SW1b to SW4b to on-state (closed state), the first motors 21 to 24 and the second motors 25 to 28, each of which being assigned in the independent power-drive systems, respectively, are turned on. Then, control signals of quadruple systems for the first ESC 61 and the third ESC 601, the first ESC 62 and the third ESC 602, the first ESC 63 and the third ESC 603, and the first ESC 64 and the third ESC 604 are generated. With the control signals, all the rotors 31 to 38 and 301 to 304 are rotated.

In Step S21, similarly to Step S11 in the flowchart illustrated in FIG. 11 described in the second embodiment, the flight-control unit 561 determines whether the first quadrant Q1 has insufficient value of lift based on a difference between the objective flight attitude of the frame-structure (11E to 14E) and a flight attitude detected by the sensor unit 51. When the value of the lift is determined to be insufficient, the processing proceeds to Step S22. When the value of the lift is determined to be sufficient, Step S21 is repeated.

In Step S22, the failure-determination unit 563 determines whether the first ESC 61 is broken based on the first current detected by the first current sensor A1a and the second current detected by the second current sensor A1b. Specifically, the failure-determination unit 563 determines that the first ESC 61 is broken when both the first current to be applied to the first motor 21 and the second current to be applied to the second motor 25 cannot be detected as an appropriate normal state. Determination on whether the current is appropriate is performed by comparison between the detected current waveform and a predetermined current waveform. When the detected current waveform is determined that the first ESC 61 is broken, the processing proceeds to Step S23. When the detected current waveform is determined the first ESC 61 is not broken, the processing proceeds to Step S24.

In Step S23, the line-control unit 562 switches the ESC switch SW1v to the second ESC 65 side so that the same control signal is entered from the second ESC 65 to the first motor 21 and the second motor 25.

In Step S24, the failure-determination unit 563 determines whether the main rotor 31 and the auxiliary rotor 35 are failed based on the first current detected by the first current sensor A1a, the second current detected by the second current sensor A1b, and rotation states detected by the first rotation sensor P1a and the second rotation sensor P1b. Specifically, in a case where the rotation of the main rotor 31 is not detected even when the first current is detected as an appropriate normal state, the failure-determination unit 563 determines that the main rotor 31 is failed to operate properly due to any defect in the main rotor 31 based on the fact that one of the first ESC 61 and the second ESC 65, and the first motor 21 are not broken. Similarly, in the case where the rotation of the auxiliary rotor 35 is not detected even when the second current is detected as an appropriate normal state, the failure-determination unit 563 determines that the auxiliary rotor 35 is failed to operate properly due to any defect in the auxiliary rotor 35 based on the fact that one of the first ESC 61 and the second ESC 65, and the second motor 25 are not failed. When the failure-determination unit 563 determines that one of the main rotor 31 and the auxiliary rotor 35 is failed to operate properly, the processing proceeds to Step S25. When the failure-determination unit 563 determines that one of the main rotor 31 and the auxiliary rotor 35 is not failed, the processing proceeds to Step S26.

In Step S25, the line-control unit 562 switches one of the first switch SW1a on the main rotor 31 side and the second switch SW1b on the auxiliary rotor 35 side, which is determined to be failed or broken in Step S24, to off-state (open state). When one of the first switch SW1a and the second switch SW1b is turned off, power supply to a circuit of a faulty rotor, which is the first motor 21 or the second motor 25, is stopped.

In Step S26, the failure-determination unit 563 determines whether the first motor 21 and the second motor 25 are broken based on the first current detected by the first current sensor A1a and the second current detected by the second current sensor A1b. Specifically, the failure-determination unit 563 determines that the first motor 21 is broken when the first current is not detected as an appropriate normal state and the second current is detected as an appropriate normal state. Alternatively, the failure-determination unit 563 determines that the second motor 25 is broken when the first current is detected as an appropriate normal state and the second current is not detected as an appropriate normal state. When the failure-determination unit 563 determines that one of the first motor 21 and the second motor 25 is broken, the processing proceeds to Step S27. When the failure-determination unit 563 determines that one of the first motor 21 and the second motor 25 is not broken, the processing is terminated.

In Step S27, the line-control unit 562 switches one of the first switch SW1a on the first motor 21 side and the second switch SW1b on the second motor 25, which is determined to be failed or broken in Step S26, to an open state, and completes the processing. When the line-control unit 562 switches one of the first switch SW1a and the second switch SW1b to an open state, power supply to one of the first motor 21 and the second motor 25, which is determined to be failed or broken, is stopped.

The series of the control method for the aircraft, which is illustrated in FIG. 26, can be performed by controlling the control circuit 56B illustrated in FIG. 25 with a computer software program having algorithm equivalent to that in FIG. 26. The computer software program may be stored in a storage unit (not shown) of a computer system implementing the control circuit 56B of the present invention. Further, the computer software program is stored in a computer-readable recording medium, and the recording medium is read out by a storage unit of an information processing apparatus. With the computer software program, the series of the control method for the aircraft according to the present invention can be performed.

As described above, with the control scheme in accordance with the first mode of the aircraft pertaining to the fourth embodiment, the ESCs to be used can be switched, and power supply to a motor that is not used can be shut by detecting the current flowing through the motors 21 to 28 and the rotation states of the rotors 31 to 38. According to the control scheme with the first mode of the aircraft pertaining to the fourth embodiment, reliability of the aircraft is improved, and a risk of increasing power consumption at the time of a failure can be suppressed.

Scheme by Second Mode

Figure 27:
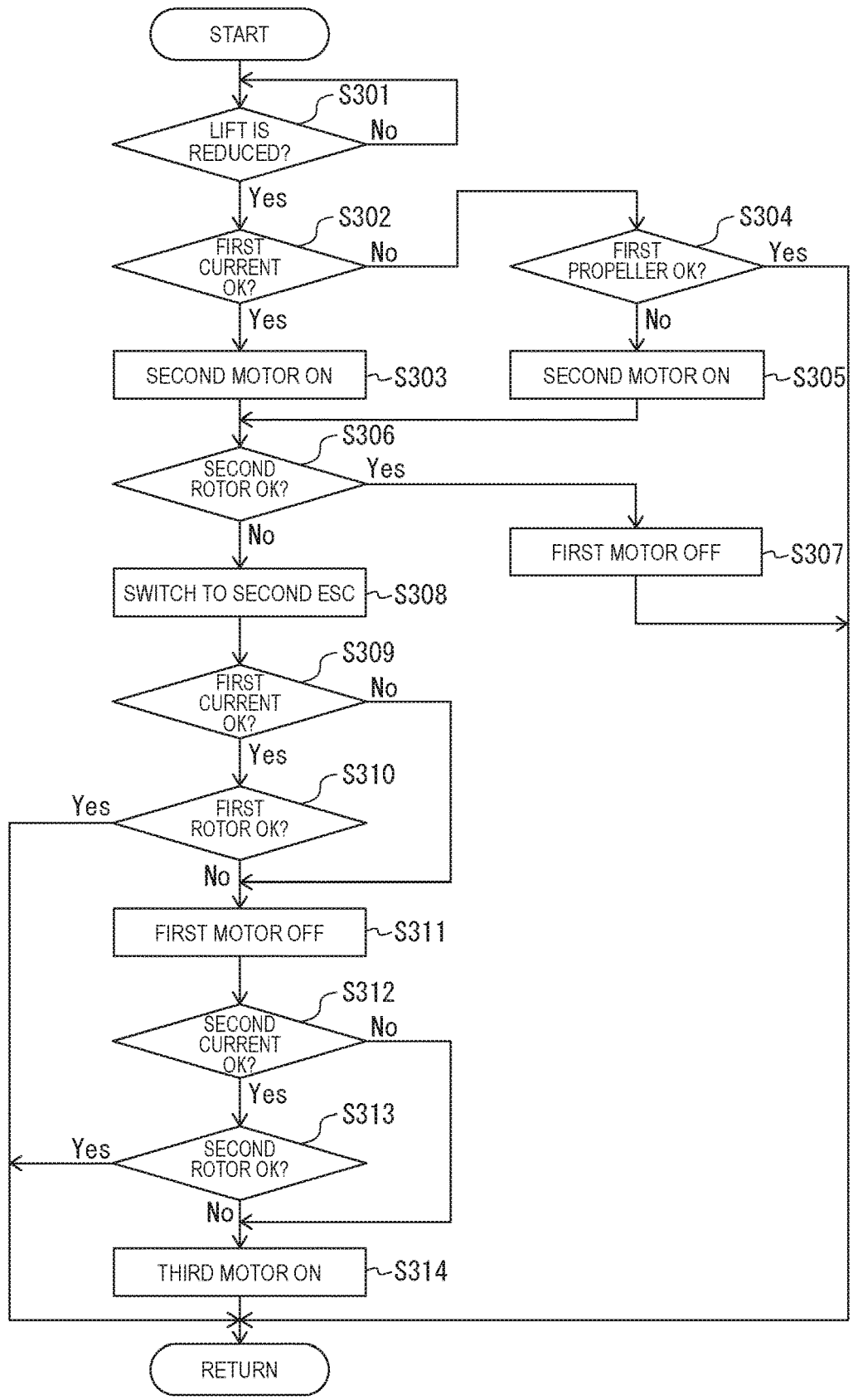
FIG. 27 is a flowchart illustrating an example of a control scheme by a second mode of the aircraft pertaining to the fourth embodiment.

Now, with reference to the flowchart illustrated in FIG. 27, description is made of an example of a control scheme in accordance with the second mode of the aircraft pertaining to the fourth embodiment. In the following description, the first quadrant Q1 is mainly exemplified. The same processing is performed in the second quadrant Q2, the third quadrant Q3, and the fourth quadrant Q4, and hence description is omitted.

First, as an initial setting, for example, the line-control unit 562 sets all the ESC switches SW1v to SW4v to the first ESCs 61 to 64 sides, and turns the first switches SW1a to SW4a to on-state and the second switches SW1b to SW4b to off-state so as to perform a flight by selectively using the main rotors 31 to 34 in the lowermost level. Subsequently, the line-control unit 562 transfers a plurality of control signals to the respective first ESCs 61 to 64, each of which implementing a part of the corresponding independent power-drive systems. Accordingly, the main rotors 31 to 34 are selectively rotated.

In Step S301, similarly to Step S11 in the flowchart illustrated in FIG. 11, the flight-control unit 561 determines whether the first quadrant Q1 has insufficient value of lift based on a difference between the objective flight attitude of the frame-structure (11E to 14E) and a flight attitude detected by the sensor unit 51. When the flight-control unit 561 determines that the value of the lift is insufficient, the processing proceeds to Step S302. When the value of the lift is determined to be sufficient, Step S301 is repeated.

In Step S302, the failure-determination unit 563 determines whether the first current detected by the first current sensor A1a is appropriate. When the current is appropriate, the processing proceeds to Step S303. When the current is not appropriate, the processing proceeds to Step S304.

In Step S303, the line-control unit 562 turns the second switch SW1b to on-state, and connects the first ESC 61 and the second motor 25 to each other. The processing proceeds to Step S306.

In Step S304, the failure-determination unit 563 determines whether the main rotor 31 is failed to operate properly based on the rotation state detected by the first rotation sensor P1a. When the rotation state of the main rotor 31 is appropriate, the failure-determination unit 563 completes the processing due to the normal main rotor 31. When the rotation state of the main rotor 31 is not appropriate, the failure-determination unit 563 determines that the main rotor 31 is failed to operate properly due to any defect in the main rotor 31, and the processing proceeds to Step S305.

In Step S305, because the main rotor 31 is failed to operate properly, the line-control unit 562 turns the second switch SW1b to on-state and the first switch SW1a to off-state, thereby connecting the first ESC 61 and the second motor 25 to each other.

In Step S306, the failure-determination unit 563 determines whether there is a problem in the auxiliary rotor 35 based on the second current detected by the second current sensor A1b and the rotation state of the auxiliary rotor 35 detected by the second rotation sensor P1b. When both the second current and the rotation state of the auxiliary rotor 35 are appropriate, the failure-determination unit 563 determines that there is no problem in the auxiliary rotor 35, and the processing proceeds to Step S307. When any of the second current and the rotation state of the auxiliary rotor 35 is not appropriate, the auxiliary rotor 35 is determined to be failed, and the processing proceeds to Step S308.

In Step S307, when there is no problem in the first ESC 61 and the first motor 21 is broken, the line-control unit 562 turns the first switch SW1a to off-state, shuts the connection between the first ESC 61 and the first motor 21, and completes the processing.

In Step S308, the line-control unit 562 switches the ESC switch SW1v to the second ESC 65 side, and changes the output destination of the control signal from the first ESC 61 to the second ESC 65.

In Step S309, the failure-determination unit 563 determines whether the first current detected by the first current sensor A1a is appropriate. When the first current is appropriate, the failure-determination unit 563 determines there is no problem in the second ESC 65, and the processing proceeds to Step S310. When the first current is not appropriate, the failure-determination unit 563 determines that the first motor 21 is broken, and the processing proceeds to Step S311.

In Step S310, the failure-determination unit 563 determines whether the rotation state of the main rotor 31 detected by the first rotation sensor P1a is appropriate. When the rotation state of the main rotor 31 is appropriate, the failure-determination unit 563 completes the processing. When the rotation state of the main rotor 31 is not appropriate, the main rotor 31 is determined to be failed due to any defect in the main rotor 31, and the processing proceeds to Step S311.

In Step S311, the line-control unit 562 turns the first switch SW1a to off-state, and shuts the connection between the second ESC 65 and the first motor 21.

In Step S312, the failure-determination unit 563 determines whether the second current detected by the second current sensor A1b is appropriate. When the second current is appropriate, the failure-determination unit 563 promotes the processing to Step S313. When the second current is not appropriate, the second ESC 65 is determined to be failed or broken, and the processing proceeds to Step S314.

In Step S313, the failure-determination unit 563 determines whether the rotation state of the auxiliary rotor 35 detected by the second rotation sensor P1b is appropriate. When the rotation state of the auxiliary rotor 35 is appropriate, the failure-determination unit 563 completes the processing. When the rotation state of the auxiliary rotor 35 is not appropriate, the auxiliary rotor 35 is determined to be failed, and the processing proceeds to Step S314.

In Step S314, the line-control unit 562 changes the output destination of the control signal from the second ESC 65 to the third ESC 601. When the output destination is changed to the third ESC 601, the third rotor 301 is rotated, and the processing is terminated.

The series of the control method for the aircraft, which is illustrated in FIG. 27, can be performed by controlling the control circuit 56B illustrated in FIG. 25 with a computer software program having algorithm equivalent to that in FIG. 27. The computer software program may be stored in a storage unit (not shown) of a computer system implementing the control circuit 56B of the present invention. Further, the computer software program is stored in a computer-readable recording medium, and the recording medium is read out by a storage unit of an information processing apparatus. With the computer software program, the series of the control method for the aircraft according to the present invention can be performed.

As described above, with the control scheme in accordance with the second mode of the aircraft pertaining to the fourth embodiment, a flight is performed by rotating one of the rotors in each of the first quadrant Q1, the second quadrant Q2, the third quadrant Q3, and the fourth quadrant Q4. Further, when the value of the lift is insufficient, the other rotor that has not been rotated is rotated. In this manner, the lift can be generated efficiently, and power consumption by driving a plurality of motors can be reduced.

Further, the aircraft according to the fourth embodiment includes the first current sensors A1a to A4a and the second current sensors A1b to A4b, which detect currents flowing through the first motors 21 to 24 and the second motors 25 to 28. According to the control scheme with the second mode of the aircraft pertaining to the fourth embodiment, the flight-control unit 561 can synchronize the first motors 21 to 24 and the second motors 25 to 28 with each other in accordance with the first current and the second current. Accordingly, switching between the first ESCs 61 to 64 and the second ESCs 65 to 68 can be performed.

Fifth Embodiment

Figure 28:
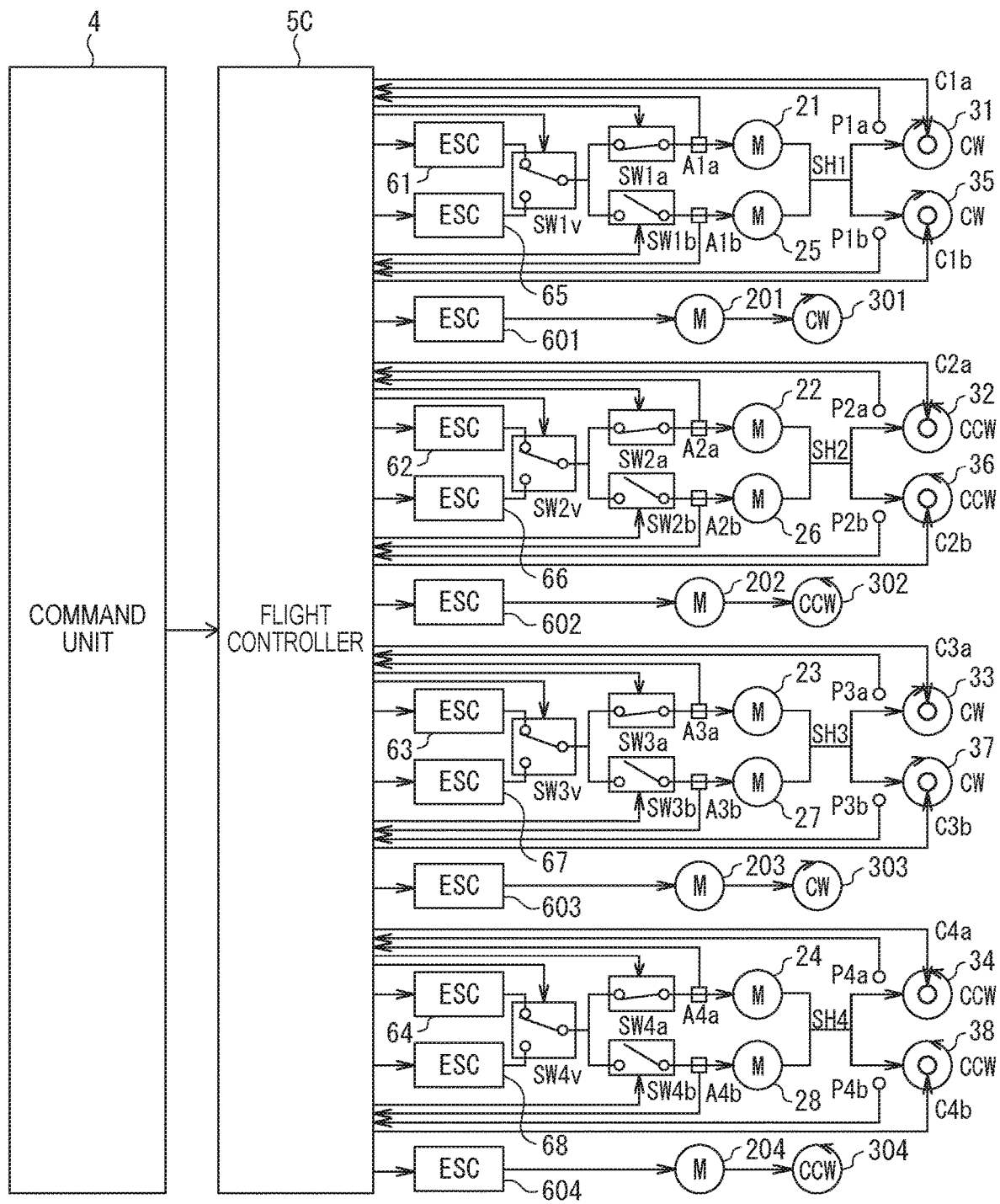
FIG. 28 is a block diagram illustrating a control system of an aircraft, or a VTOL aircraft according to a fifth embodiment of the present invention.

As illustrated in FIG. 28, an aircraft, or a VTOL aircraft according to a fifth embodiment of the present invention is different from the third and fourth embodiments in the following features. That is, the VTOL aircraft includes the rotation shafts SH1, SH2, SH3, and SH4, which are shared by the first motor 21 and the second motor 25, the first motor 22 and the second motor 26, the first motor 23 and the second motor 27, and the first motor 24 and the second motor 28, respectively, first clutches C1a to C4a, which transmit rotations of the rotation shafts SH1 to SH4 to the main rotors 31 to 34, respectively, and second clutches C1b to C4b, which transmit the rotations of the rotation shafts SH1 to SH4 to the auxiliary rotors 35 to 38, respectively. The configuration, operations, and technical effects that are not described in the fifth embodiment are the same as those in the third and fourth embodiments, and hence description is omitted.

Figure 29:
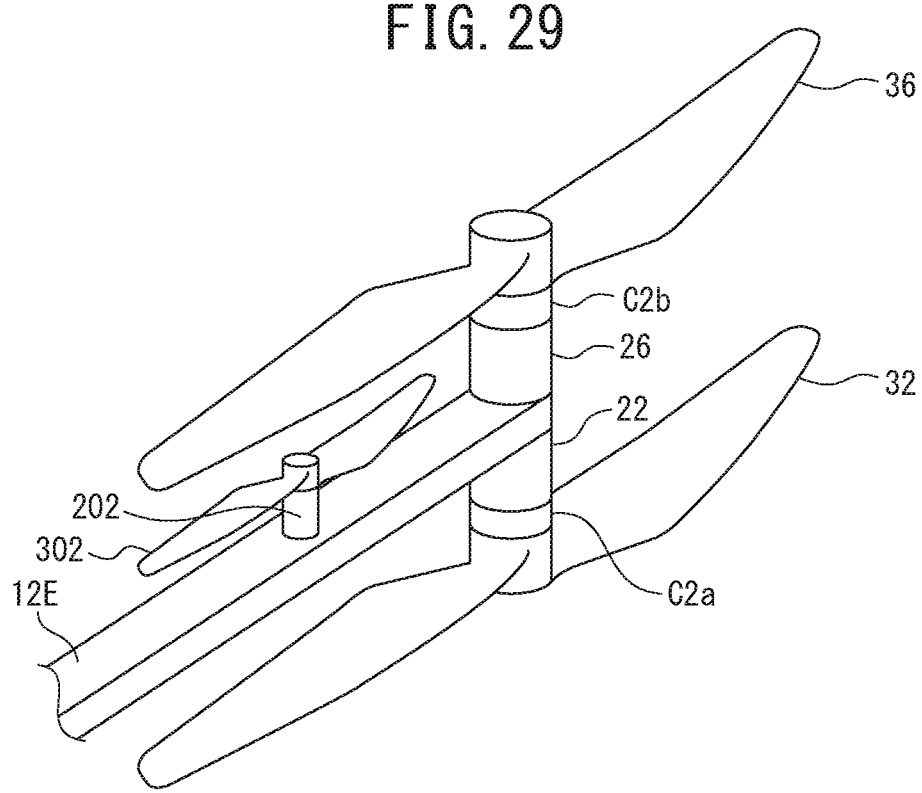
FIG. 29 is an enlarged perspective view illustrating an example of rotors included in the aircraft according to the fifth embodiment.

For example, regarding the second quadrant Q2 as illustrated in FIG. 29, the first motor 22 and the second motor 26 share a rotation shaft (not shown in FIG. 29). That is, on the distal end of the beam 12E, the rotation shaft penetrates the beam 12E from the first motor 22 arranged on the lower side to the second motor 26 arranged on the upper side.

Note that, in the example illustrated in FIG. 29, the third motor 202 arranged at the center of the beam 12E may share the rotation shaft with the first motor 22 and the second motor 26, and may switch transmission of the rotation with respect to the third rotor 302 with a third clutch (not shown). That is, the main rotor 32, the auxiliary rotor 36, and the third rotor 302 may be coaxial.

The rotation of the rotation shaft is transmitted to the main rotor 32 by the first clutch C2a. By the transmission of the rotation to the main rotor 32 via the first clutch C2a, the auxiliary rotor 36 is rotated. The rotation of the rotation shaft is transmitted to the auxiliary rotor 36 by the second clutch C2b. By the transmission of the rotation to the auxiliary rotor 36 via the second clutch C2b, the auxiliary rotor 36 is rotated. Thus, any of the first motor 22 and the second motor 26 is driven, at least any of the main rotor 32 and the auxiliary rotor 36 can be rotated in response to control of the first clutch C2a and the second clutch C2b.

Figure 30:
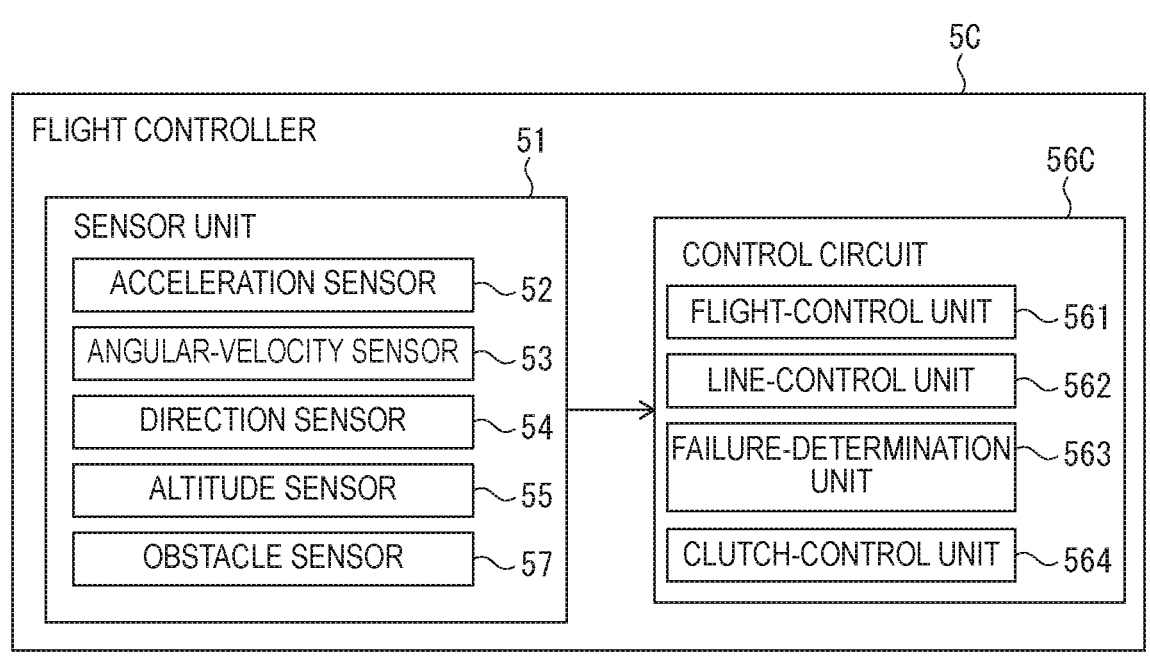
FIG. 30 is a block diagram illustrating a flight controller of the aircraft according to the fifth embodiment.

As illustrated in FIG. 30, a control circuit 56C of an FC 5C includes a clutch-control unit 564 as a function or a physical hardware resource in addition to the flight-control unit 561, the line-control unit 562, and the failure-determination unit 563. The clutch-control unit 564 is a logical circuit, which is configured to connect the rotation shafts SH1 to SH4 and the main rotors 31 to 34 and the auxiliary rotors 35 to 38 to each other and shut the connection by controlling the first clutches C1a to C4a and the second clutches C1b to C4b and selectively rotating the main rotors 31 to 34 and the auxiliary rotors 35 to 38.

Scheme by First Mode

Figure 31:
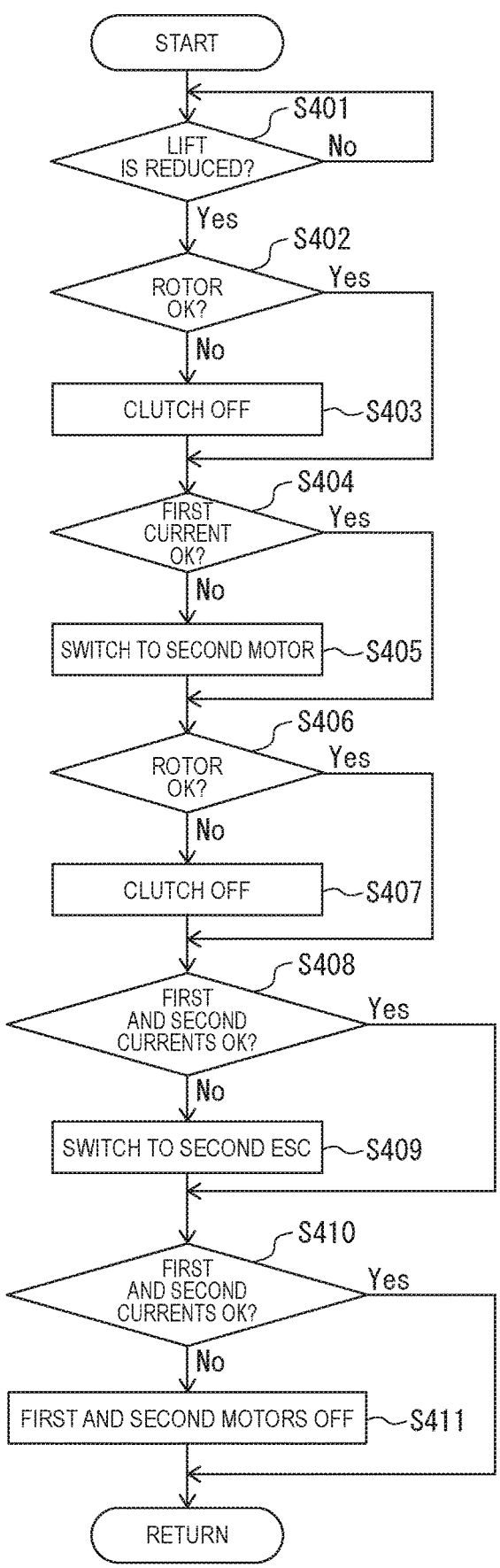
FIG. 31 is a flowchart illustrating an example of a control scheme by a first mode of the aircraft pertaining to the fifth embodiment.

Now, with reference to the flowchart illustrated in FIG. 31, description is made of an example of a control scheme in accordance with the first mode of the aircraft pertaining to the fifth embodiment. In the following description, the first quadrant Q1 is mainly exemplified. The same processing is performed in the second quadrant Q2, the third quadrant Q3, and the fourth quadrant Q4, and hence description is omitted.

First, as an initial setting, for example, the line-control unit 562 switches all the ESC SW1v to SW4v to the first ESCs 61 to 64 sides. By turning the first switches SW1a to SW4a to on-state and the second switches SW1b to SW4b to off-state, the first motors 21 to 24, each of which being assigned in the independent power-drive systems, respectively, are selectively turned on. Further, the clutch-control unit 564 illustrated on FIG. 30 turns all the first clutches C1a to C4a and the second clutches C1b to C4b to a connected state. Further, the flight-control unit 561 generates a plurality of control signals, which are scheduled to be transmitted to a first control family including the first ESC 61 and the third ESC 601, a second control family including the first ESC 62 and the third ESC 602, a third control family including the first ESC 63 and the third ESC 603, and a fourth control family including the first ESC 64 and the third ESC 604, respectively. With the control signals transmitted through the quadruple control families, all the rotors 31 to 38 and 301 to 304 are rotated.

In Step S401, similarly to Step S11 in the flowchart illustrated in FIG. 11, the flight-control unit 561 determines whether the first quadrant Q1 has insufficient value of lift based on a difference between the objective flight attitude of the frame-structure (11E to 14E) and a measured flight attitude detected by the sensor unit 51. When the value of the lift is determined to be insufficient, the processing proceeds to Step S402. When the value of the lift is determined to be sufficient, Step S401 is repeated.

In Step S402, the failure-determination unit 563 determines whether the main rotor 31 and the auxiliary rotor 35 are failed based on the first current detected by the first current sensor A1a, the rotation state of the main rotor 31 detected by the first rotation sensor P1a, and the rotation state of the auxiliary rotor 35 detected by the second rotation sensor P1b. Specifically, in a case when the normal rotation state of the auxiliary rotor 35 is not detected, while the first current and the rotations of the main rotor 31 are detected as an appropriate normal state, the failure-determination unit 563 determines that the auxiliary rotor 35 is failed to operate properly due to any defect in the second clutch C1b or the auxiliary rotor 35. Similarly, in a case when the normal rotation of the main rotor 31 is not detected, while the first current and the rotation of the auxiliary rotor 35 are detected as an appropriate normal state, the failure-determination unit 563 determines that the main rotor 31 is failed to operate properly due to any defect in the first clutch C1a or the main rotor 31. When the failure-determination unit 563 determines that one of the main rotor 31 and the auxiliary rotor 35 is failed to operate properly, the processing proceeds to Step S403. When the failure-determination unit 563 determines that one of the main rotor 31 and the auxiliary rotor 35 is not failed, the processing proceeds to Step S404.

When one of the main rotor 31 and the auxiliary rotor 35 are determined to be failed in Step S402, the clutch-control unit 564 turns corresponding one of the first clutch C1a on the main rotor 31 and the second clutch C1b on the auxiliary rotor 35, to off state (shut-off state) in Step S403.

In Step S404, the failure-determination unit 563 determines whether the first current detected by the first current sensor A1a is appropriate. When the first current is not appropriate, the processing proceeds to Step S405. When the first current is determined to be appropriate, the processing proceeds to Step S406.

In Step S405, the line-control unit 562 turns the first switch SW1a to off-state and the second switch SW1b to on-state. When the first switch SW1a becomes off-state and the second switch SW1b becomes on-state, the first ESC 61 and the second motor 25 are connected to each other, and the motor to be used is changed to the second motor 25.

Based upon the second current, which is detected by the second current sensor A1b, the rotation state of the main rotor 31, which is detected by the first rotation sensor P1a, and the rotation state of the auxiliary rotor 35, which is detected by the second rotation sensor P1b, the failure-determination unit 563 determines whether the main rotor 31 and the auxiliary rotor 35 are failed in Step S406. In a case when a normal rotation of the auxiliary rotor 35 is not detected, while the second current and the normal rotation of the main rotor 31 are detected properly, the failure-determination unit 563 determines that the auxiliary rotor 35 is failed to operate properly due to some defect in the second clutch C1b or the auxiliary rotor 35. Similarly, in a case when a normal rotation of the main rotor 31 is not detected, while the second current and the normal rotation of the auxiliary rotor 35 are detected properly, the failure-determination unit 563 determines that the auxiliary rotor 35 is failed to operate properly due to some defect in the second clutch C1b or the auxiliary rotor 35. When the failure-determination unit 563 determines that one of the main rotor 31 and the auxiliary rotor 35 is failed to operate properly, the processing proceeds to Step S407. When the failure-determination unit 563 determines that one of the main rotor 31 and the auxiliary rotor 35 is not failed, the processing proceeds to Step S408.

When one of the first clutch C1a on the main rotor 31 and the second clutch C1b on the auxiliary rotor 35 is determined to be failed in Step S406, the clutch-control unit 564 turns the corresponding one of the first clutch C1a and the second clutch C1b to off-state in Step S407.

In Step S408, the failure-determination unit 563 determines whether the first current detected by the first current sensor A1a and the second current detected by the second current sensor A1b are appropriate. That is, in a case when the second current is determined to be inappropriate in Step S408 after the first current is determined to be inappropriate in Step S404, the failure-determination unit 563 determines that the first ESC 61 is broken, and the processing proceeds to Step S409. When the second current is appropriate, the processing proceeds to Step S410.

In Step S409, the line-control unit 562 changes the input connection of the ESC switch SW1v toward the second ESC 65 side, and furthermore, changes the output destination of the control signal from the first ESC 61 to the second ESC 65.

In Step S410, the failure-determination unit 563 determines whether the first current detected by the first current sensor A1a and the second current detected by the second current sensor A1b are appropriate. That is, when the failure-determination unit 563 determines that the first current is not appropriate in Step S404, the line-control unit 562 changes the input connection of the ESC switch SW1v to the second ESC 65 side in Step S409. After the input connection of the ESC switch SW1v is changed to the second ESC 65 side, when the second current is still determined to be inappropriate, both the first ESC 61 and the second ESC 65 are determined to be failed or broken, and the processing proceeds to Step S411. When the second current is determined to be appropriate, the processing is terminated.

In Step S411, the line-control unit 562 turns off both the first switch SW1a and the second switch SW1b, and stops delivering of the control signal to the second ESC 65. Thus, the lift in the first quadrant Q1 is recovered by the third rotor 601.

As described above, with the control scheme in accordance with the first mode of the aircraft pertaining to the fifth embodiment, the ESCs to be used for the corresponding independent power-drive systems can be switched, and power supply to a motor that is not used can be shut by detecting the current flowing through the motors 21 to 28 and the rotation states of the rotors 31 to 38. With the control scheme in accordance with the first mode of the aircraft pertaining to the fifth embodiment, reliability of the aircraft is improved, and a risk of increasing power consumption at the time of a failure can be suppressed.

The series of the control method for the aircraft, which is illustrated in FIG. 31, can be performed by controlling the control circuit 56C illustrated in FIG. 30 with a computer software program having algorithm equivalent to that in FIG. 31. The computer software program may be stored in a storage unit (not shown) of a computer system implementing the control circuit 56C of the present invention. Further, the computer software program is stored in a computer-readable recording medium, and the recording medium is read out by a storage unit of an information processing apparatus. With the computer software program, the series of the control method for the aircraft according to the present invention can be performed.

Scheme by Second Mode

Figure 32:
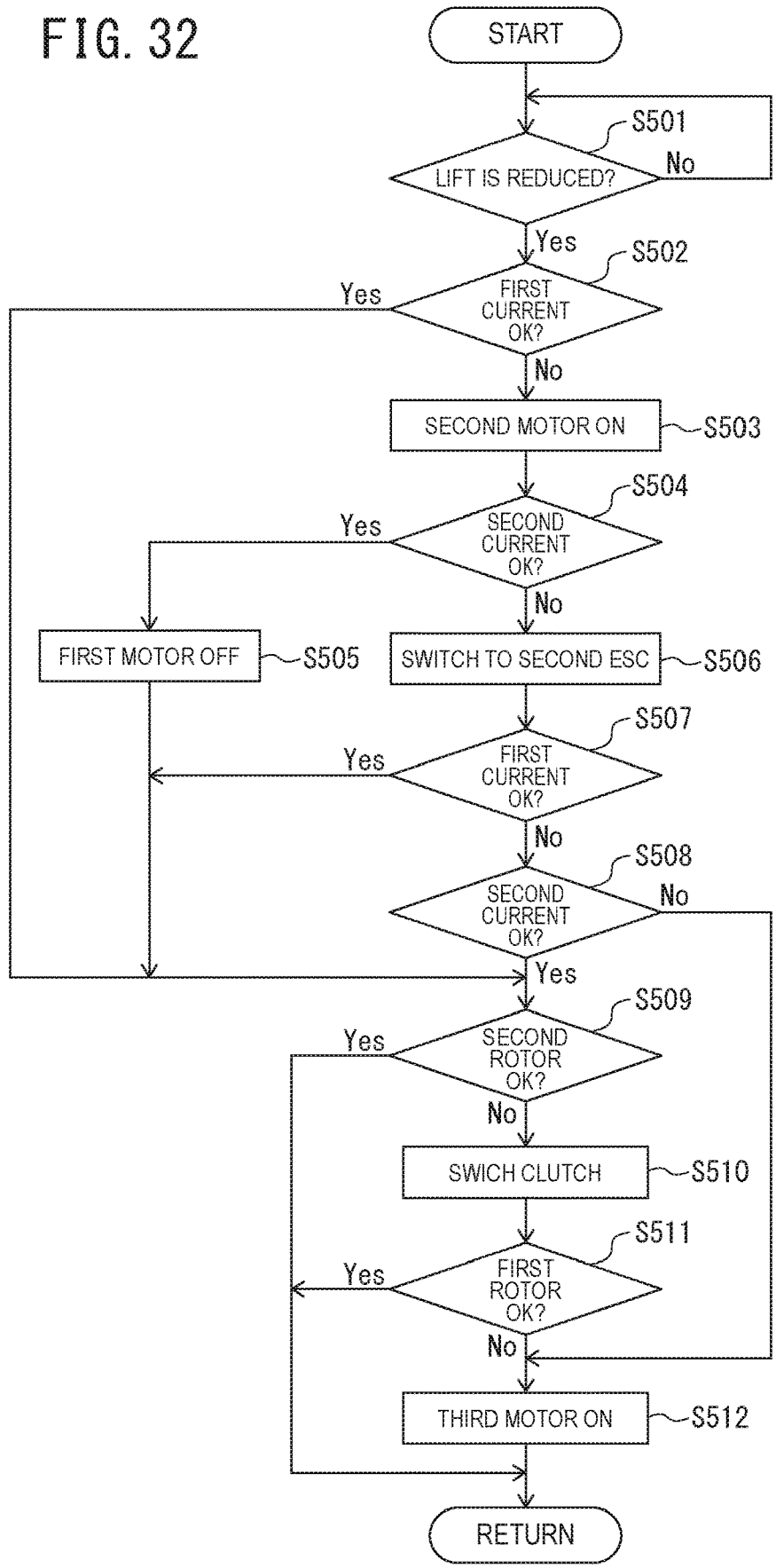
FIG. 32 is a flowchart illustrating an example of a control scheme by a second mode of the aircraft pertaining to the fifth embodiment.

Now, with reference to the flowchart illustrated in FIG. 32, description is made of an example of a control scheme in accordance with the second mode of the aircraft pertaining to the fifth embodiment. In the following description, the first quadrant Q1 is mainly exemplified. The same processing is performed in the second quadrant Q2, the third quadrant Q3, and the fourth quadrant Q4, and hence description is omitted.

First, as an initial setting, for example, the line-control unit 562 switches all the ESC SW1v to SW4v to the first ESCs 61 to 64 sides so as to perform a flight by selectively using the main rotors 31 to 34 in the lowermost level, and turns the first switches SW1a to SW4a to on-state and the second switches SW1b to SW4b to off-state. Further, the first clutches C1a to C4a are turned off, and the second clutches C1b to C4b are turned on. Further, the line-control unit 562 transfers the control signals to the first ESCs 61 to 64. When the control signals are transfers to the first ESCs 61 to 64, the main rotors 31 to 34 are selectively rotated.

In Step S501, similarly to Step S11 in the flowchart illustrated in FIG. 11, the flight-control unit 561 determines whether the first quadrant Q1 has insufficient value of lift based on a difference between the objective flight attitude of the frame-structure (11E to 14E) and a measured flight attitude detected by the sensor unit 51. When the value of the lift is determined to be insufficient, the processing proceeds to Step S502. When the value of the lift is determined to be sufficient, Step S501 is repeated.

In Step S502, the failure-determination unit 563 determines whether the first current detected by the first current sensor A1a is appropriate. When the first current is determined to be appropriate, the processing proceeds to Step S509. When the first current is not appropriate, the processing proceeds to Step S503.

In Step S503, the line-control unit 562 turns on the second switch SW1b, and connects the first ESC 61, and the first motor 21 and the second motor 25 to each other.

In Step S504, the failure-determination unit 563 determines whether the second current detected by the second current sensor A1b is appropriate. When the second current is determined to be appropriate, it is determined that the first ESC 61 is not broken and that the first motor 21 is broken. Then, the processing proceeds to Step S505. When the second current is not appropriate, the failure-determination unit 563 determines that the first ESC 61 is broken, and the processing proceeds to Step S506.

In Step S505, the line-control unit 562 turns the first switch SW1a to off-state and the second switch SW1b to on-state, and connects the first ESC 61 and the second motor 25 to each other. When the first ESC 61 is connected to the second motor 25, the line-control unit 562 switches the motor to be used from the first motor 21 to the second motor 25, and the processing proceeds to Step S509.

In Step S506, the line-control unit 562 switches the ESC switch SW1v to the second ESC 65 side, and changes the ESC to be used from the first ESC 61 to the second ESC 65.

In Step S507, the failure-determination unit 563 determines whether the first current detected by the first current sensor A1a is appropriate. When the first current is determined to be appropriate, the failure-determination unit 563 promotes the processing to Step S509. When the first current is not appropriate, the processing proceeds to Step S508.

In Step S508, the failure-determination unit 563 determines whether the second current detected by the second current sensor A1b is appropriate.

When the second current is determined to be appropriate, the failure-determination unit 563 promotes the processing to Step S509. When the second current is not appropriate, it is determined that both the main rotor 31 and the auxiliary rotor 35 are failed. Then, the processing proceeds to Step S512.

In Step S509, the failure-determination unit 563 determines whether the rotation state of the auxiliary rotor 35 detected by the second rotation sensor P1b is appropriate. When the rotation state of the auxiliary rotor 35 is appropriate, the failure-determination unit 563 determines that there is no problem in the auxiliary rotor 35, and completes the processing. When the rotation state of the auxiliary rotor 35 is not appropriate, the failure-determination unit 563 determines that the auxiliary rotor 35 is failed to operate properly. Then, the processing proceeds to Step S510.

In Step S510, the clutch-control unit 564 turns off the second clutch C1b on the auxiliary rotor 35, which is determined to be failed or broken in Step S509, and turns on the first clutch C1a on the main rotor 31.

In Step S511, the failure-determination unit 563 determines whether the rotation state of the main rotor 31 detected by the first rotation sensor P1a is appropriate. When the rotation state of the main rotor 31 is appropriate, the failure-determination unit 563 determines that there is no problem in the main rotor 31, and completes the processing. When the rotation state of the main rotor 31 is not appropriate, the failure-determination unit 563 determines that the main rotor 31 is failed to operate properly. Then, the processing proceeds to Step S512.

In Step S512, the line-control unit 562 stops the delivering of the control signals to the first ESC 61 and the second ESC 65, and sets the output destination of the control signal to the third ESC 601. When the output destination of the control signal is assigned to the third ESC 601, the third rotor 601 is rotated, and the processing is terminated.

As described above, with the control scheme in accordance with the second mode of the aircraft pertaining to the fifth embodiment, a flight is performed by rotating one of the rotors in each of the first quadrant Q1, the second quadrant Q2, the third quadrant Q3, and the fourth quadrant Q4. Further, when the value of the lift is insufficient, the other rotor that has not been rotated is rotated. In this manner, the lift can be generated efficiently, and power consumption by driving a plurality of motors can be reduced.

The series of the control scheme in accordance with the second mode of the aircraft, which is illustrated in FIG. 32, can be performed by controlling the control circuit 56C illustrated in FIG. 30 with a computer software program having algorithm equivalent to that in FIG. 32. The computer software program may be stored in a storage unit (not shown) of a computer system implementing the control circuit 56C of the present invention. Further, the computer software program is stored in a computer-readable recording medium, and the recording medium is read out by a storage unit of an information processing apparatus. With the computer software program, the series of the control scheme in accordance with the second mode of the aircraft pertaining to the present invention can be performed.

Further, the aircraft according to the fifth embodiment includes the rotation shafts shared by the first motors 21 to 24 and the second motors 25 to 28, and the first clutches C1a to C4a and the second clutches C1b to C4b, which are provided to the rotation shafts such that each of which is assigned to the independent power-drive systems, respectively. Thus, the rotations of the faulty rotors 31 to 38 can be stopped easily. When one blade of the two blades included in the rotor is failed to operate properly, the rotor is not rotated smoothly. Also, when one of the three or more blades included in the rotor is failed to operate properly, the rotor is not rotated smoothly. The aircraft according to the fifth embodiment contributes to avoiding an unsmooth rotation due to such rotation abnormality.

Modification

Figure 33:
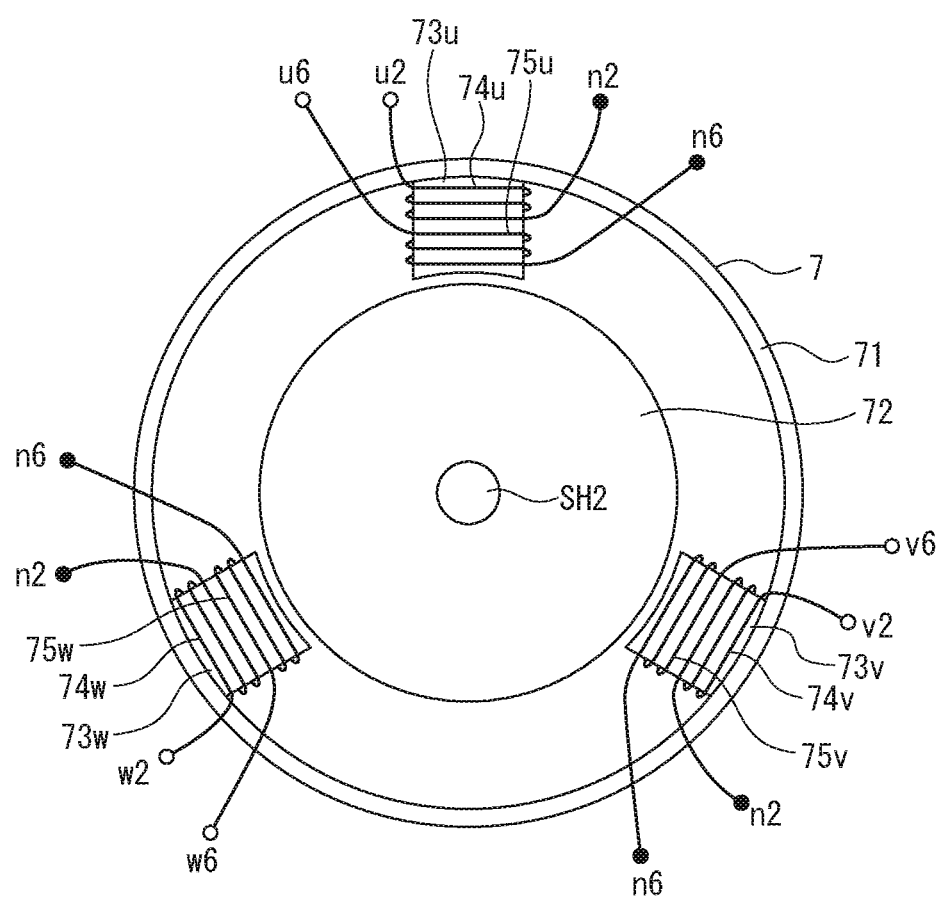
FIG. 33 is a view illustrating a structure of a motor include in an aircraft, or a VTOL aircraft according to a modification of the fifth embodiment.

Referring to the example illustrated in FIG. 29, although a configuration, in which the beam 12E is sandwiched in between the first motor 22 and the second motor 26, has been explained, another configuration in which a motor 7 having coils in double circuit systems may be adopted in place of the first motor 22 and the second motor 26, as illustrated in FIG. 33.

The motor 7 includes a cylindrical stator 71, a rotator 72 arranged in an inner side of the stator 71, and triple magnetic cores 73u, 73v, and 73w provided to an inner surface of the stator 71. The rotator 72 rotates around the rotation shaft SH2. Further, around each of the triple magnetic cores 73u, 73v, and 73w, first triple phase coils 74u, 74v, and 74w corresponding to a first circuit system of the first motor 22 and second triple phase coils 75*u*, 75*v*, and 75*w* corresponding to a second circuit system of the second motor 26 are winding.

One terminal n2 of each of the first triple phase coils 74*u*, 74*v*, and 74*w* corresponds to a neutral point of the first motor 22. The other terminals u2, u2, and w2 of the first triple phase coils 74*u*, 74*v*, and 74*w* correspond to the triple phase terminals u, v, and w, respectively. One terminal n6 of each of the second triple phase coils 75*u*, 75*v*, and 75*w* corresponds to a neutral point of the second motor 26. The other terminals u6, v6, and w6 of the second coils 75*u*, 75*v*, and 75*w* correspond to the triple phase terminals u, v, and w, respectively.

Similarly, a combination of the first motor 21 and the second motor 25, a combination of the first motor 23 and the second motor 27, and a combination of the first motor 24 and the second motor 28 illustrated in FIG. 28 may have the similar configuration of the motor 7, each of the combinations including the dual coil systems.

Sixth Embodiment

Figure 34:
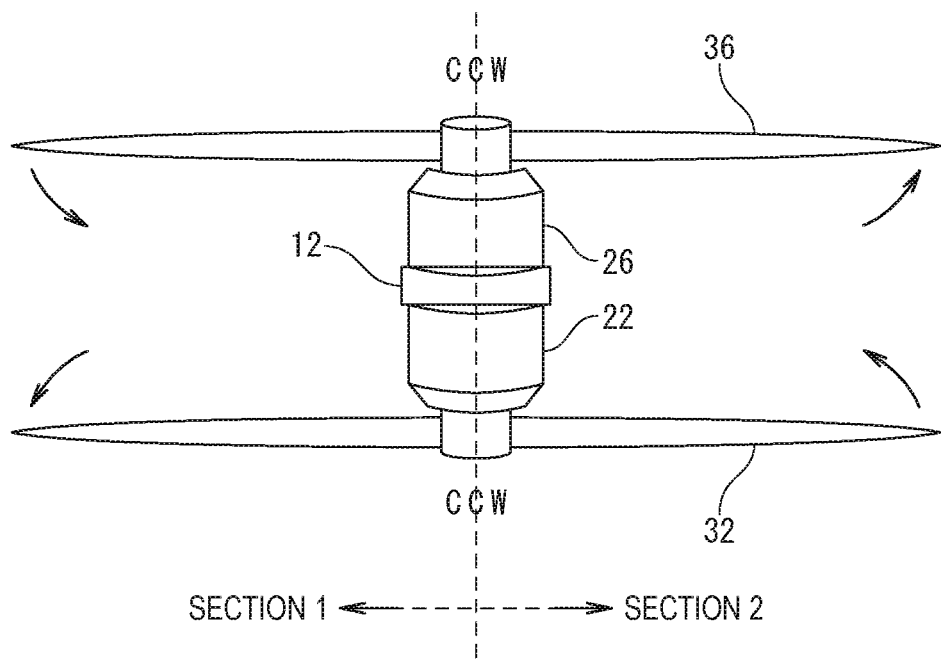
FIG. 34 is a schematic side view of arrangement of coaxial co-rotating double rotors that are used for description in the first to fifth embodiments.

In the description of the aircraft according to the first embodiment, the third embodiment, and the fifth embodiment, the arrangement of the coaxial co-rotating double rotors, in which double rotors are overlapping in the upper-and-lower levels, is used. In the arrangement of the coaxial co-rotating double rotors, even when a rotor failure is caused, a stable flight can be achieved. Further, the rotation planes of the rotors overlap with each other. Thus, the airframe size can be minimized, and the airframe weight can be minimized. For example, in the first divided region, as illustrated in FIG. 34, the rotation planes of the blades of the main rotor 32 and the auxiliary rotor 36 overlap with each other in the arrangement of the coaxial co-rotating double rotors. That is, in a section 1 on the left side of the rotation shaft and a section 2 on the right side of the rotation shaft, both the blades of the main rotor 32 and the auxiliary rotor 36 are rotated in the same directions CW. Thus, it is known that energy efficiency is degraded due to an action of air resistance.

Figure 35:
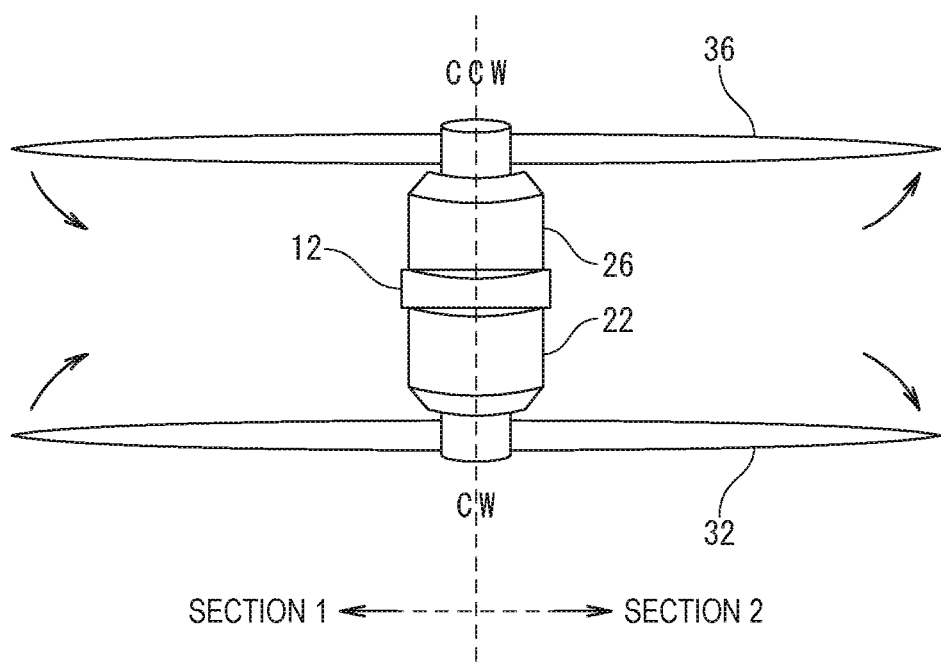
FIG. 35 is a schematic side view of arrangement of general coaxial contra-rotating double rotors.
Figure 36:
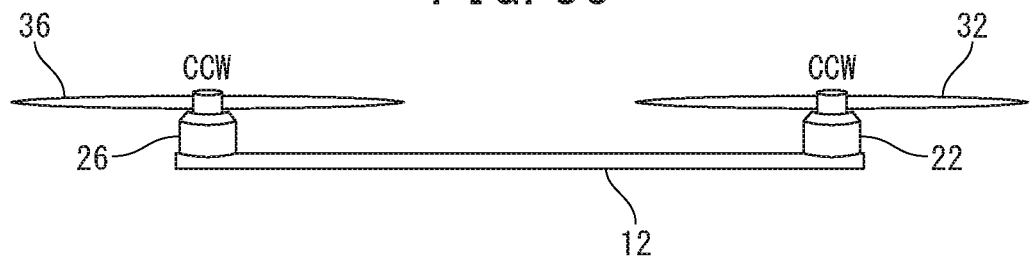
FIG. 36 is a schematic side view of arrangement of general single rotors.

Meanwhile, as illustrated in FIG. 35, in arrangement of general coaxial contra-rotating double rotors, in the section 1 and the section 2, the blades of the main rotor 32 are rotated in the CW direction, and the blades of the auxiliary rotor 36 are rotated in the CCW direction. Thus, energy efficiency is not degraded. However, as described in the comparative example in the first embodiment, an unstable state is caused easily when a rotor failure is caused. Further, as illustrated in FIG. 36, in arrangement of single rotors, when the main rotor 32 and the auxiliary rotor 36, which are rotated in the same direction, are separated from each other so that the rotation planes do not overlap with each other, energy efficiency is maximized. However, in the arrangement of single rotors, the airframe size is increased, and the airframe weight is increased.

Figure 37:
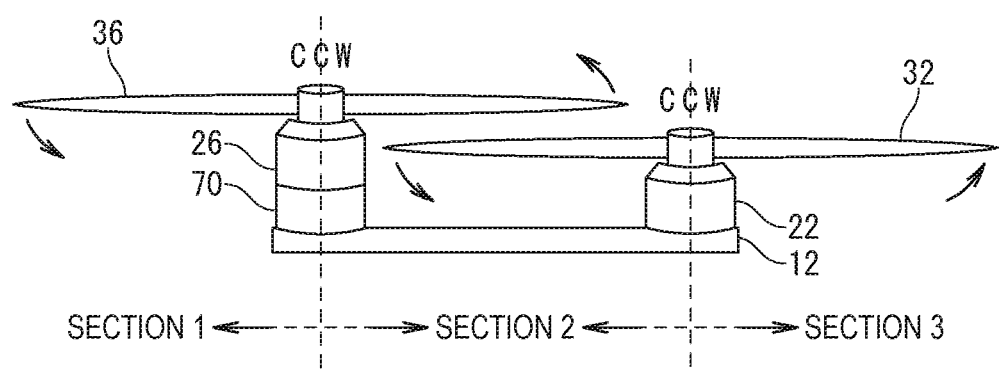
FIG. 37 is a schematic side view illustrating an example of dense-rotor arrangement in a sixth embodiment of the present invention.

As illustrated in FIG. 37, in an aircraft, or a VTOL aircraft according to a sixth embodiment of the present invention, the main rotor 32 and the auxiliary rotor 36 are arranged in the following manner (hereinafter, referred to as "dense-rotor" arrangement). That is, the rotation planes are separated from each other in the vertical direction across a spacer 70 in a cross sectional plane vertical to the rotor rotation planes, and overlap with each other by a length of a substantial radius of the rotation planes, and therefore, the positions of the blades of the main rotor 32 and the auxiliary rotor 36 overlap with each other at a specific timing. In the dense-rotor arrangement, the rotation planes of the main rotor 32 and the auxiliary rotor 36 do not overlap with each other in the section 1 and a section 3 defined in FIG. 37. However, in the section 2 defined in FIG. 37, the rotation planes of the main rotor 32 and the auxiliary rotor 36 overlap with each other. The configuration, operations, and technical effects that are not described in the aircraft according to the sixth embodiment are substantially same as those of the aircraft according to the first to fifth embodiments, and hence description is omitted.

In the dense-rotor arrangement of the aircraft according to the sixth embodiment, the main rotor 32 and the auxiliary rotor 36 are rotated in the CCW direction. However, description is made of a case where a tangential velocity direction of the left blade of the main rotor 32 and a tangential velocity direction of the right blade of the auxiliary rotor 36 are counter to each other in the section 2. Therefore, in the section 2 in which the rotation planes overlap with other, the tangential velocity direction of the rotation circle of the auxiliary rotor 36 in the upper level moves against the wind toward a rearward portion of the paper, and the tangential velocity direction of the rotation circle of the main rotor 32 in the lower level moves against the wind toward a rearward portion of the paper. As described above, in the dense-rotor arrangement, the tangential velocity directions of the rotation circles of the blades are counter to each other in the section 2 in which the rotation planes of the main rotor 32 and the auxiliary rotor 36 overlap with each other. Thus, energy efficiency is not degraded in all the sections 1, 2, and 3. It has been already confirmed that energy efficiency is not degraded by conducting experiments. Further, because the rotation planes overlap with each other in the section 2, the airframe size can be reduced, and the airframe weight can be reduced. As a result, a flight time can be extended.

Figure 38:
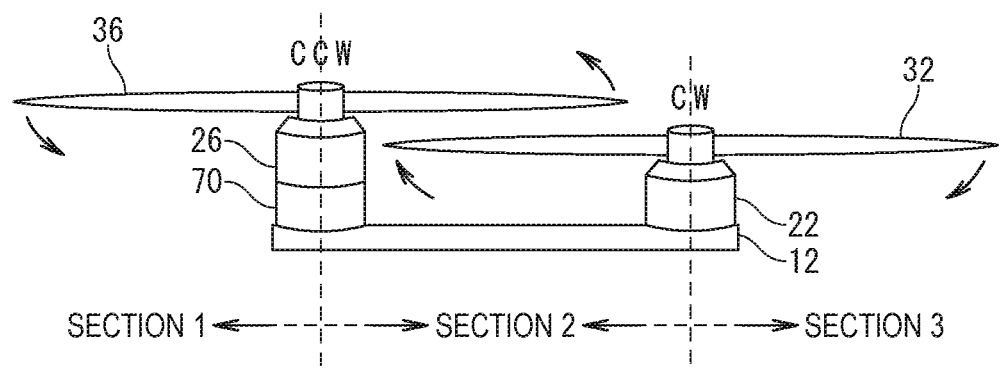
FIG. 38 is a schematic side view of dense-rotor arrangement in a comparative example.

As illustrated in FIG. 38, in the dense-rotor arrangement, when the main rotor 32 and the auxiliary rotor 36 are rotated in the counter directions, that is, in the direction CW and the direction CCW, the tangential velocity direction of the rotation circle of the main rotor 32 and the tangential velocity direction of the rotation circle of the auxiliary rotor 36 are the same in the section 2 in which the blades overlap with each other. Therefore, in this case, energy efficiency is degraded. It has been already confirmed that energy efficiency is degraded by conducting experiments.

Figure 39:
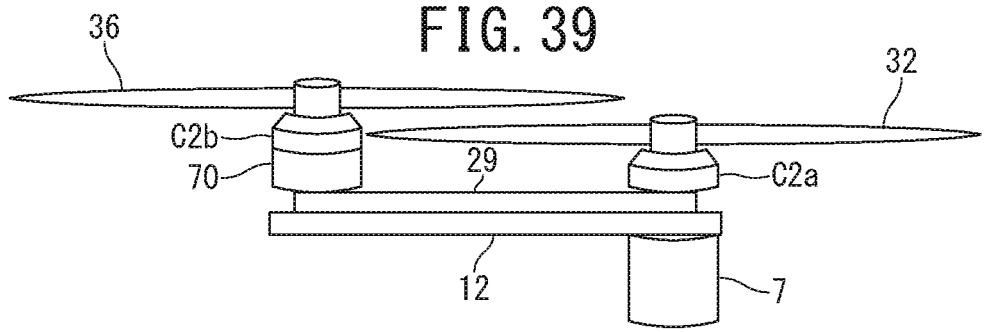
FIG. 39 is a schematic side view illustrating another example of dense-rotor arrangement in the sixth embodiment.

The dense rotors may be driven through use of the motor 7 with dual coil systems, which is illustrated in FIG. 33. For example, as illustrated in FIG. 39, the dual-coil motor 7 is arranged on the lower side of the beam 12. The dual-coil motor 7 is connected to the main rotor 32 on the upper side of the rotation shaft through intermediation with the first clutch C2*a*. The main rotor 32 and the auxiliary rotor 36 are coupled with each other through intermediation of the second clutch C2*b* and a transmission member 29 such as a belt and a shaft gear. The spacer 70 for separating the rotation planes from each other in the upper-and-lower levels is provided between the second clutch C2*b* and the transmission member 29. As described above, with a single dual-coil motor 7, the main rotor 32 and the auxiliary rotor 36 can be driven.

Figure 40:
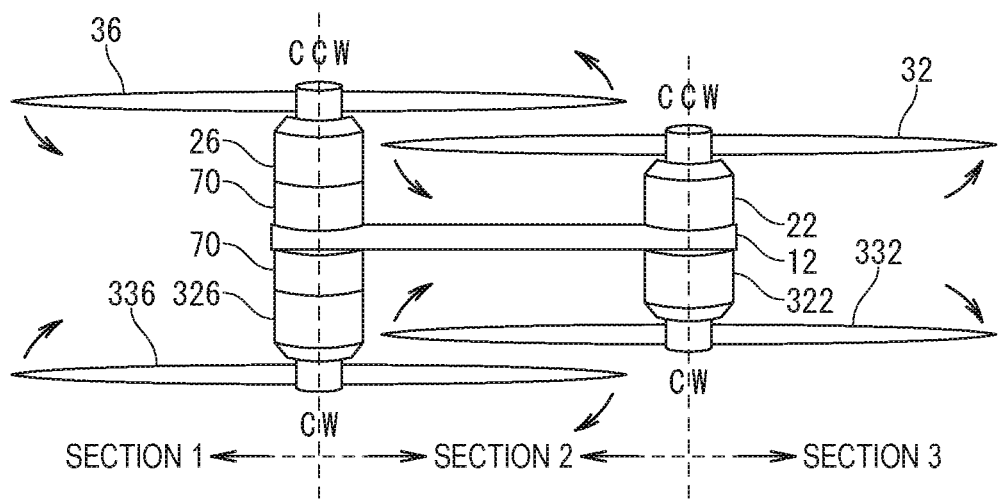
FIG. 40 is a schematic side view illustrating another example of dense-rotor arrangement in the sixth embodiment.

As described above, in the arrangement of coaxial contra-rotating double rotors, energy efficiency is not degraded. However, as described in the comparative example in the first embodiment, in the case of the arrangement of coaxial contra-rotating double rotors, an unstable state is caused easily when a rotor failure is caused. In the comparative example illustrated in FIG. 8, the dense rotors can be adopted. For example, as illustrated in FIG. 40, the main rotor (first rotor) 32 and the auxiliary rotor (second rotor) 36, which are rotated in the CCW direction, are arranged on the upper side of the beam 12, and a third rotor 332 and a fourth rotor 336, which are rotated in the CW direction, are arranged on the lower side of the beam 12. The third rotor 332 and the fourth rotor 336 are driven by motors 322 and 326, respectively. The third rotor 332 is arranged close to the beam 12 side with respect to the fourth rotor 336.

Figure 41:
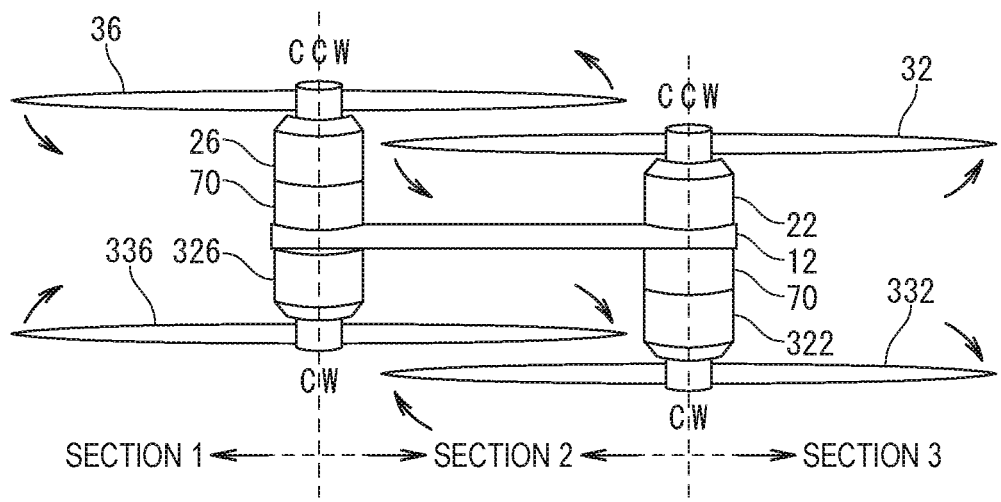
FIG. 41 is a schematic side view illustrating another example of dense-rotor arrangement in the sixth embodiment.

As illustrated in FIG. 40, in the section 1, the second rotor 36 and the fourth rotor 336 are rotated in the directions counter to each other, and the first rotor 32 and the third rotor 332 are rotated in the directions counter to each other. Further, the tangential velocity direction of the first rotor 32 and the tangential velocity direction of the second rotor on the upper side are counter to each other in the section 2. The tangential velocity direction of the third rotor 332 and the tangential velocity direction of the fourth rotor 336 on the lower side are counter to each other. Further, the first rotor 32 and the third rotor 332 are rotated in the directions counter to each other. Thus, in all the sections 1, 2, and 3, the rotation directions of the blades are counter to each other. Accordingly, energy efficiency is not degraded, and a weak point of the comparative example in which is an unstable state is liable to be caused can be overcome. Note that, as illustrated in FIG. 41, when the fourth rotor 332 is arranged on the beam 12, the first rotor 32 and the fourth rotor 336 are rotated in the same directions in the section 2. Therefore, the arrangement illustrated in FIG. 40 is desired. In contrast to "the Octo Coax X" architecture being an existing architecture that easily causes instability due to the coaxial contra-rotating structure in FIG. 35, when the dense rotor structure illustrated in FIG. 40 is adopted, an unstable state is less liable to be caused even when a rotor failure is caused. This is because the rotors being backups, which are rotated in the same directions, are present in the upper-and-lower levels. As a result, failure tolerance can be improved.

Figure 42:
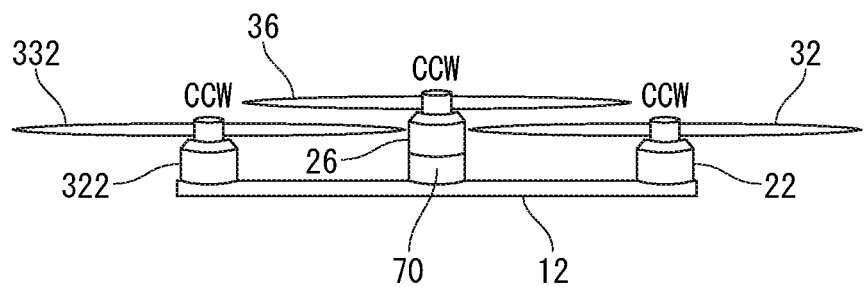
FIG. 42 is a schematic side view illustrating another example of dense-rotor arrangement in the sixth embodiment.

Further, the dense-rotor arrangement in which triple or quadruple rotors are arranged may be adopted. For example, as illustrated in FIG. 42, the first rotor 32, the second rotor 36, and the third rotor 332, which are rotated in the CCW direction, are arranged linearly. The spacer 70 is provided to the center auxiliary rotor (second rotor) 36 so that the rotation plane of the auxiliary rotor 36 is at a level higher than the rotation planes of the first rotor 32 and the third rotor 332. The rotation surfaces of the main rotor (first rotor) 32 and the third rotor 332 on both the sides and the rotation plane of the center auxiliary rotor (second rotor) 36 are arranged to overlap with each other. In the section in which the rotation planes overlap with each other, the tangential velocity directions are counter to each other. Note that, the first rotor 32, the second rotor 36, and the third rotor 332 may be arranged at positions of apexes of a triangular shape. In this case, the levels of the rotation planes of the triple rotors are different from each other, and the portion in which the triple rotation planes overlap with each other is generated. However, even in this portion, degradation of energy efficiency is confirmed.

Figure 43:
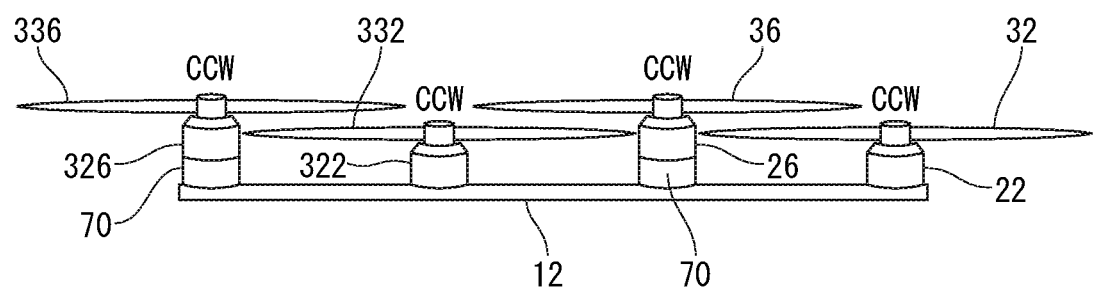
FIG. 43 is a schematic side view illustrating another example of dense-rotor arrangement in the sixth embodiment.

Further, as illustrated in FIG. 43, the first rotor 32, the second rotor 36, the third rotor 332, and the fourth rotor 336, which are rotated in the CCW direction, are arranged linearly. The rotation planes of the second rotor 36 and the fourth rotor 336 are at levels higher than the rotation planes of the first rotor 32 and the third rotor 332. The tangential velocity directions are counter to each other in a section in which the rotation plane of the second rotor 36 overlaps with the rotation planes of the first rotor 32 and the third rotor 332 and in a section in which the rotation plane of the fourth rotor 336 overlaps with the rotation plane of the third rotor 332. Note that, the first rotor 32, the second rotor 36, the third rotor 332, and the fourth rotor 336 may be arranged at positions of apexes of a quadrangular shape.

EXAMPLES

Figure 44:
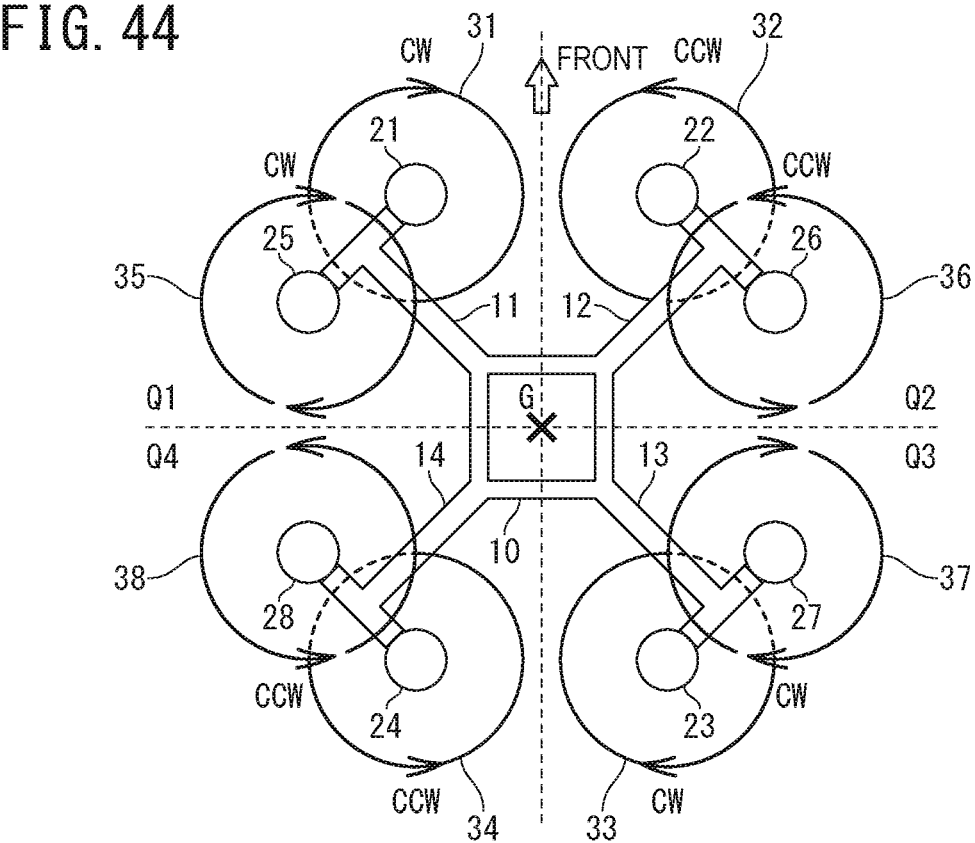
FIG. 44 is a schematic top view illustrating an example of a basic configuration of an aircraft, or a VTOL aircraft according to an example of the sixth embodiment.

FIG. 44 is a view of an example to which the dense rotors are adopted to the aircraft according to the first embodiment illustrated in FIG. 1. As illustrated in FIG. 44, the dense rotors are arranged on the upper levels at the distal ends of the beams 11 to 14 extending in an X-shape in the first to fourth divided regions (quadrants) Q1 to Q4. The main rotor 31 and the auxiliary rotor 35 are arranged at the distal end of the beam 11 to be perpendicular to the extending direction of the beam 11. The main rotor 32 and the auxiliary rotor 36 are arranged at the distal end of the beam 12 to be perpendicular to the extending direction of the beam 12. The main rotor 33 and the auxiliary rotor 37 are arranged at the distal end of the beam 13 to be perpendicular to the extending direction of the beam 13. The main rotor 34 and the auxiliary rotor 36 are arranged at the distal end of the beam 14 to be perpendicular to the extending direction of the beam 14. In this manner, in the aircraft according to the example of the sixth embodiment, the dense rotors are arranged in the respective divided regions (quadrants) Q1 to Q4. Therefore, redundancy for a rotor failure can be improved, and a risk of a crash can be suppressed. Moreover, degradation of energy efficiency can be avoided. Further, the airframe size can be reduced as compared to the existing octocopter because of the dense-rotor arrangement.

Figure 45:
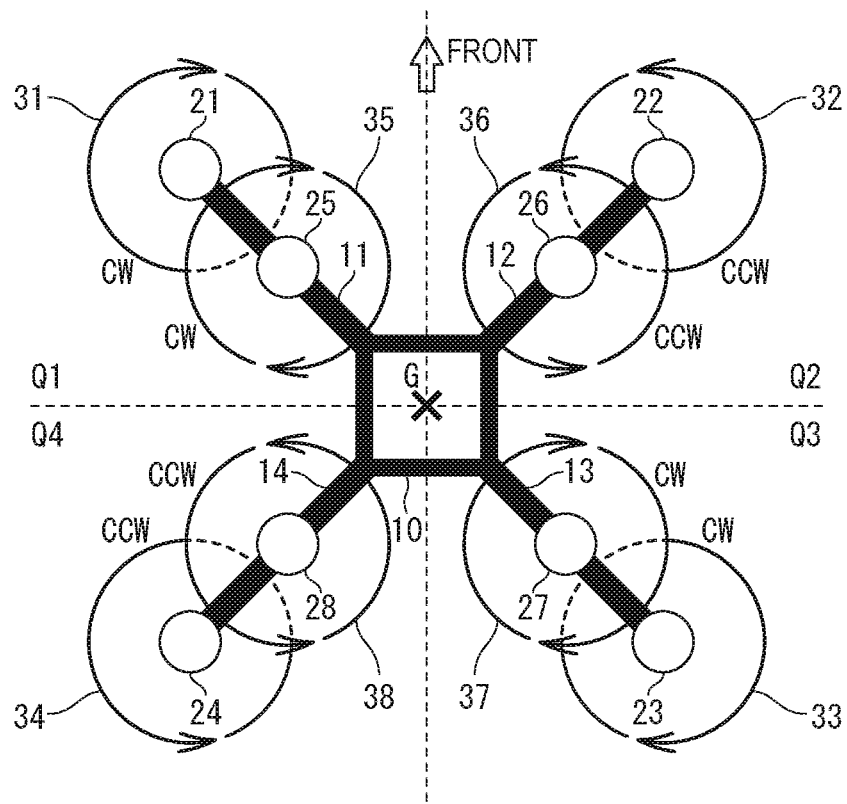
FIG. 45 is a schematic top view illustrating another example of a basic configuration of the aircraft according to the example of the sixth embodiment.

Note that, in FIG. 44, the double rotors are arranged in the direction perpendicular to the beams extending in an X-shape. However, the number of rotors to be arranged and the arrangement shape are not limited. For example, as illustrated in FIG. 45, the double rotors may be arranged in the extending direction of the beams 11 to 14 having an X-shape. This airframe can be achieved easily by adopting long beams.

Figure 46:
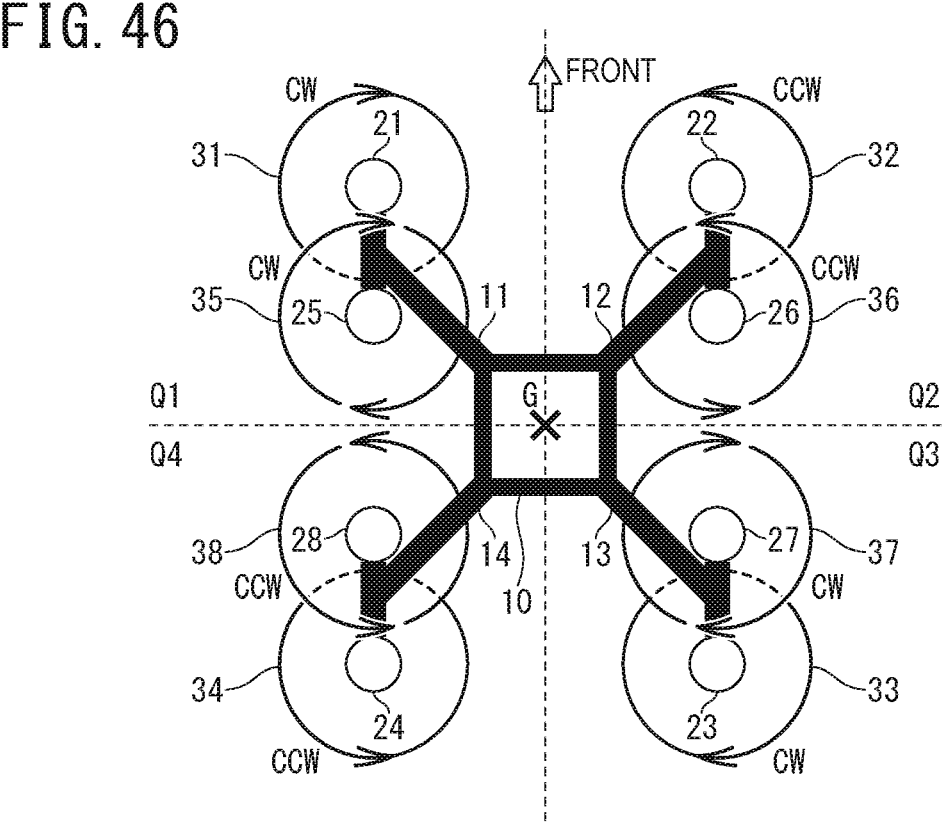
FIG. 46 is a schematic top view illustrating another example of a basic configuration of the aircraft according to the example of the sixth embodiment.

FIG. 46 is a view of an airframe in which the rotors are arranged in an H-shape. As illustrated in FIG. 46, the rotors 31, 35, 38, and 34 in the first and fourth divided regions (quadrants) Q1 and Q4 are arranged linearly. The rotors 32, 36, 37, and 33 in the second and third divided regions (quadrants) Q2 and Q3 are arranged linearly. Note that, the rotors 31, 35, 38, and 34 may be arranged on a beam extending from the distal end of the beam 11 to the distal end of the beam 14, and the rotors 32, 36, 37, and 33 may be arranged after providing a beam extending from the distal end of the beam 12 to the distal end of the beam 13.

Figure 47:
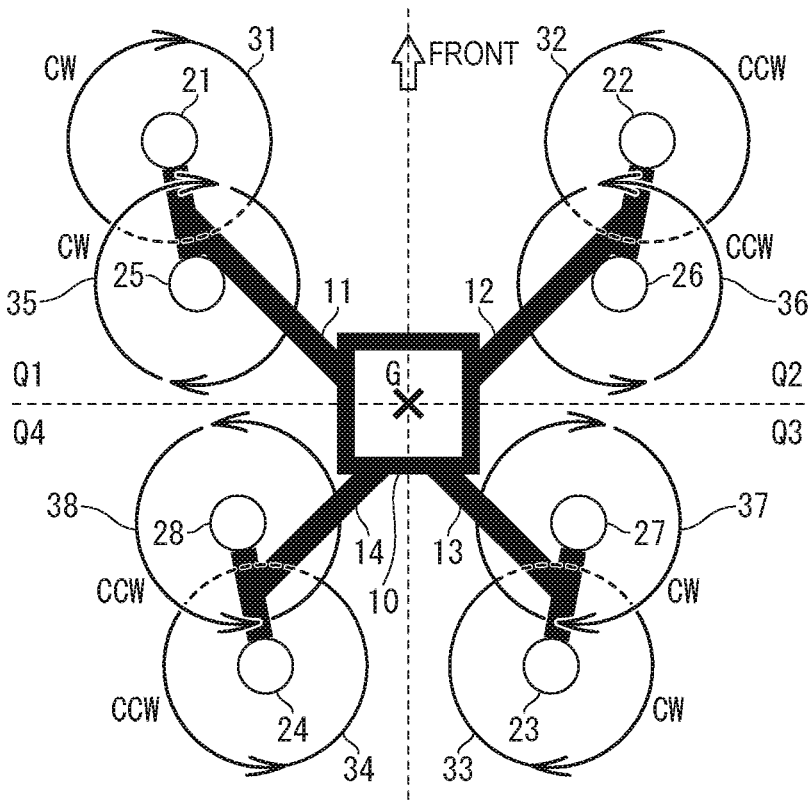
FIG. 47 is a schematic top view illustrating another example of a basic configuration of the aircraft according to the example of the sixth embodiment.

FIG. 47 is a view of an airframe in which the rotors are arranged in a V-shape. As illustrated in FIG. 47, the rotors 31, 35, 38, and 34, which are arranged linearly in the first and fourth divided regions (quadrants) Q1 and Q4, and the rotors 32, 36, 37, and 33, which are arranged linearly in the second and third divided regions (quadrants) Q2 and Q3, form a V-shape.

Note that, the rotors 31, 35, 38, and 34 may be arranged on the beam extending from the distal end of the beam 11 to the distal end of the beam 14, and the rotors 32, 36, 37, and 33 may be arranged after providing the beam extending from the distal end of the beam 12 to the distal end of the beam 13.

Figure 48:
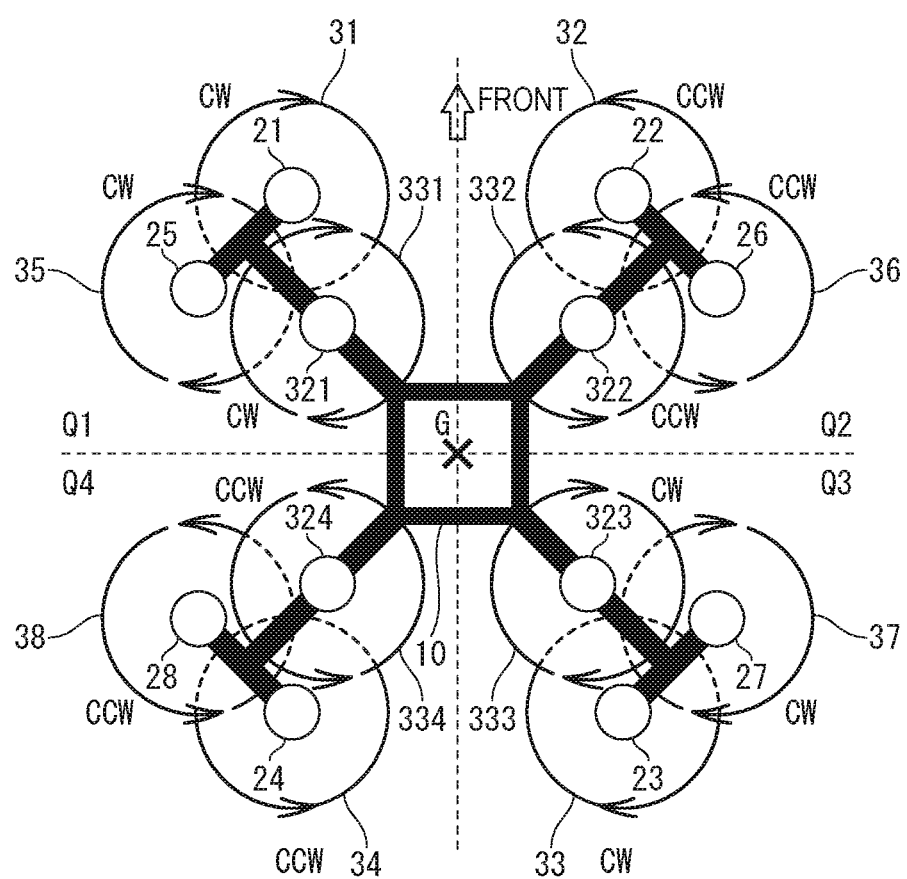
FIG. 48 is a schematic top view illustrating another example of a basic configuration of the aircraft according to the example of the sixth embodiment.

FIG. 48 is a view of a dodecacopter in which third rotors 331, 332, 333, and 334 are further arranged on the main-body 10 side on the beams 11 to 14 extending in an X-shape in addition to the dense-rotor arrangement illustrated in FIG.

44. As illustrated in FIG. 48, the triple rotors are arranged at positions of apexes of a triangular shape on the distal ends of the beams in the first to fourth divided regions (quadrants) Q1 to Q4. As described above, the portions in which the triple rotation planes overlap with each other are present. However, even in the overlapping portions, degradation of energy efficiency can be avoided. Note that, as illustrated in FIG. 42, the triple rotors may be arranged linearly on the beam having an X-shape.

Figure 49:
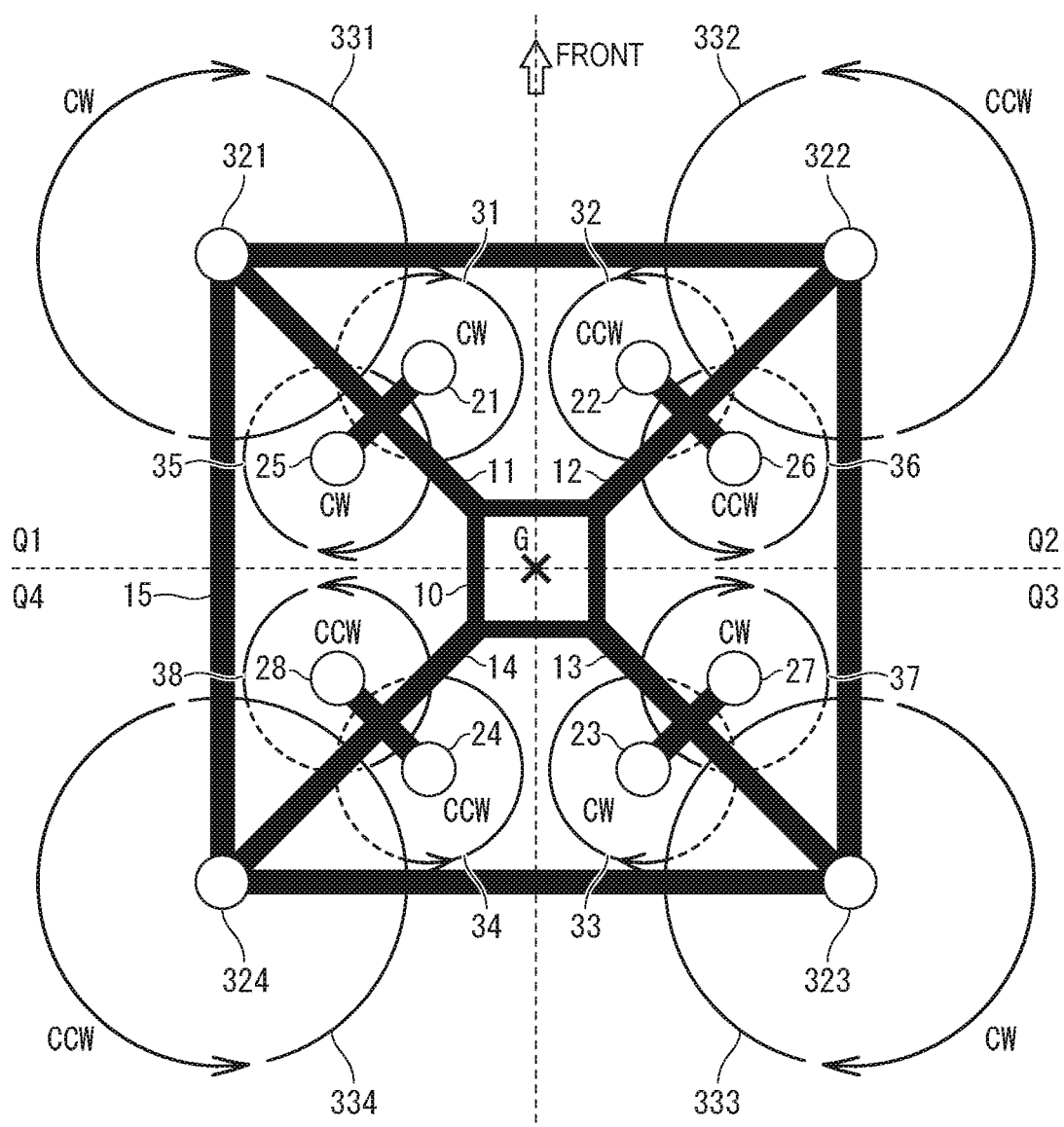
FIG. 49 is a schematic top view illustrating another example of a basic configuration of the aircraft according to the example of the sixth embodiment.

FIG. 49 is a view of a dodecacopter in which the third rotors 331 to 334 are arranged, in contrast to FIG. 48, on a side opposite to the main-body 10 on the beams 11 to 14 extending in an X-shape in addition to the dense-rotor arrangement illustrated in FIG. 44. As illustrated in FIG. 49, bumpers 15 configured to couple the distal ends of the beams in the adjacent divided regions are included. Thrust or lift generated by the rotor is proportional to the fourth power of the diameter and proportional to the third power of the rotation frequency when the pitch is equal. The diameter of the third rotors 331 to 334 is set to twice as large as the diameter of the first and second rotors 31 to 38, and the rotation frequency of the third rotors 331 to 334 is set to a half of the rotation frequency of the first and second rotors 31 to 38. In the respective first to fourth divided regions (quadrants) Q1 to Q4, the sum of thrust generated by the first and second rotors is equal to the thrust generated by the third rotors.

Further, the third rotors 331 to 334 are foldable rotors. Normally, a flight is performed with the first and second rotors 31 to 38, and the third rotors 331 to 334 are folded. For example, when the main rotor (first rotor) 31 and the auxiliary rotor (second rotor) 35 are failed, the third rotor 331 is operated instead. When the main rotor (first rotor) 32 and the auxiliary rotor (second rotor) 36 are failed, the third rotor 332 is operated instead. When the main rotor (first rotor) 33 and the auxiliary rotor (second rotor) 37 are failed, the third rotor 333 is operated instead. When the main rotor (first rotor) 34 and the auxiliary rotor (second rotor) 38 are failed, the third rotor 334 is operated instead. Note that, a flight may be performed in a mode in which the third rotors 331 to 334, which are not folded, are operated together with the first and second rotors 31 to 38. When a flight is performed with the third rotors 331 to 334 that are folded, all the rotors can be protected in the bumpers 15.

Figure 50:
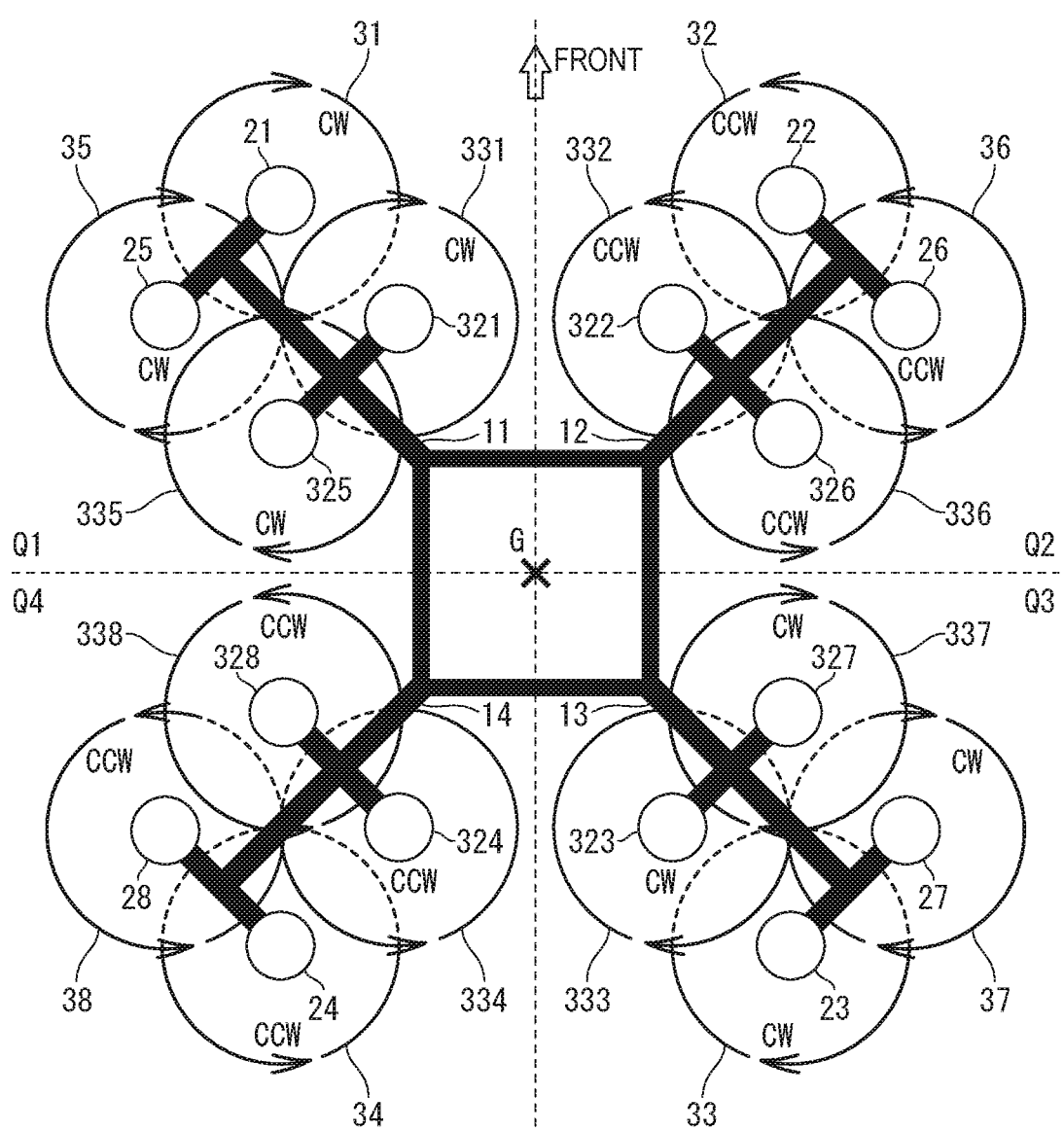
FIG. 50 is a schematic top view illustrating another example of a basic configuration of the aircraft according to the example of the sixth embodiment.

In the dodecacopter illustrated in FIG. 49, in the respective divided regions, the third rotors, which has thrust equal to the sum of the thrust generated by the main and auxiliary rotors, are arranged. In place of the third rotors, a hexadecacopter in which the third rotors and fourth rotors having thrust equal to the main and auxiliary rotors, may be adopted. For example, as illustrated in FIG. 50, in the respective divided regions (quadrants) Q1 to Q4, the first to fourth rotors 31 to 38 and 331 to 338 may be in the dense-rotor arrangement. The third and fourth rotors 331 to 338 are arranged on the main-body 10 side on the extending beams 11 to 14. In the configuration illustrated in FIG. 50, the thrust equal to that of the dodecacopter in FIG. 49 can be obtained. Further, the airframe size can be reduced by shortening the length of the beams.

Figure 51:
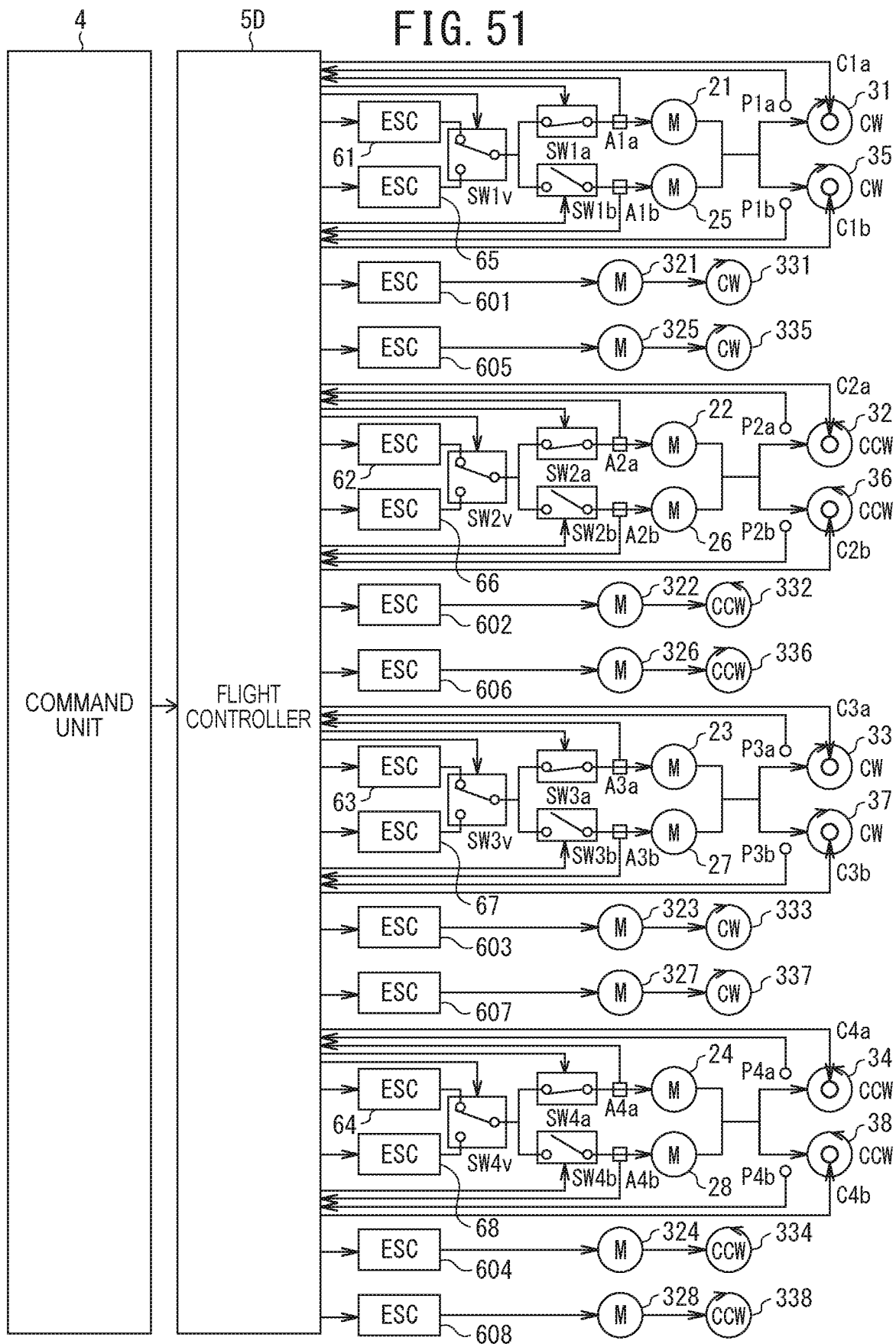
FIG. 51 is a block diagram illustrating an example of a control system of the aircraft according to the sixth embodiment.

The aircraft described in the example of the sixth embodiment can be controlled by any of the FCs illustrated in FIG. 3, FIG. 4, FIG. 10, FIG. 22 to FIG. 25, FIG. 28, and FIG. 30, or a general-purpose FC for a quadcopter. For example, the FC 5D illustrated in FIG. 51 is different from the FC 5C in the fifth embodiment illustrated in FIG. 28 in that the FC 5D also controls fourth ESCs 605 to 608 and fourth motors 325 to 328 configured to drive the fourth rotors 335 to 338. The other configurations, operations, and technical effects are substantially same as those in the fifth embodiment, and hence description is omitted.

Seventh Embodiment

Figure 52:
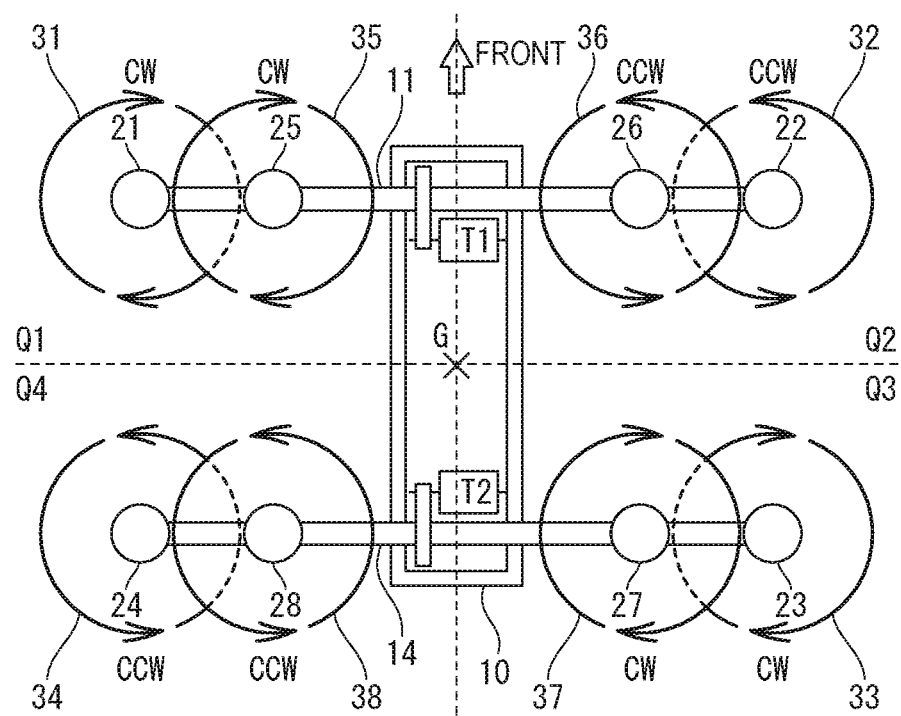
FIG. 52 is a schematic top view illustrating an example of a basic configuration of an aircraft, or a VTOL aircraft according to a seventh embodiment of the present invention.
Figure 56:
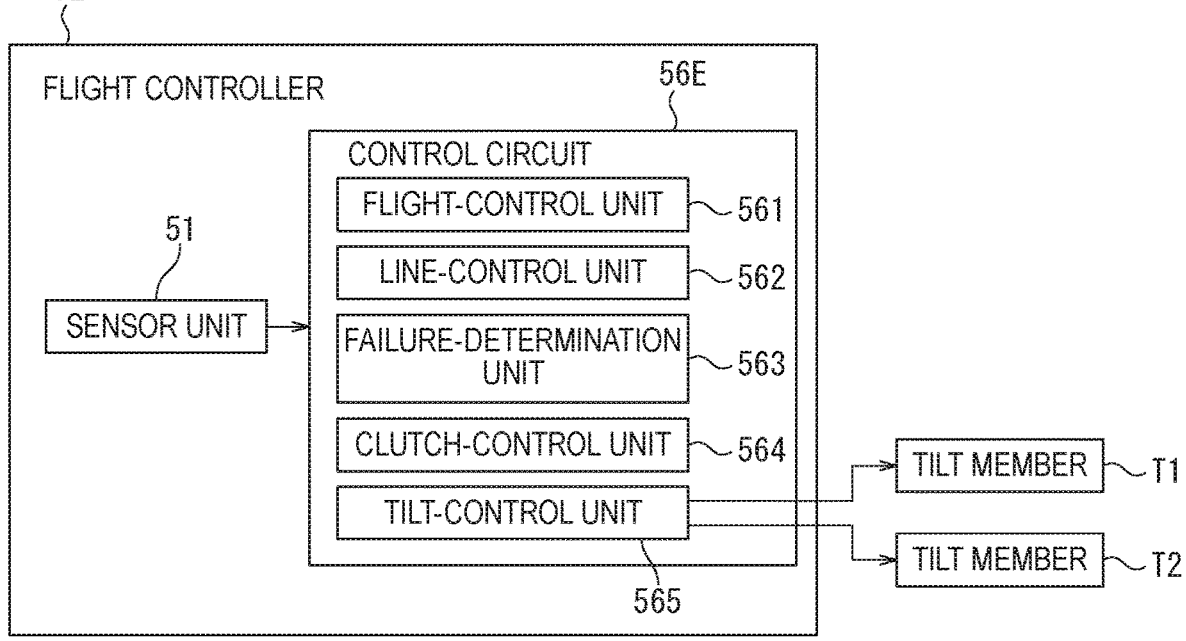
FIG. 56 is a block diagram illustrating a flight controller of the aircraft according to the seventh embodiment.

As illustrated in FIG. 52, an aircraft, or a VTOL aircraft according to a seventh embodiment of the present invention includes tilt members T1 and T2 on the main-body 10 as a tilting mechanism. Further, as illustrated in FIG. 56, a control circuit 56E of an FC 5E includes a tilt-control unit 565. As a tilt shaft, the tilt member T1 rotates the beam 11 illustrated in FIG. 52, under the control of the tilt-control unit 565, and therefore, the rotation planes of the main rotors 31 and 32 and the auxiliary rotors 35 and 36 in the first and second divided regions (quadrants) Q1 and Q2, which are coupled to the beam 11, are tilted. As a tilt shaft, the tilt member T2 rotates the beam 14 illustrated in FIG. 52, under the control of the tilt-control unit 565, and therefore, the rotation planes of the main rotors 33 and 34 and the auxiliary rotors 37 and 38 in the third and fourth divided regions (quadrants) Q3 and Q4, which are coupled to the beam 14, are tilted. The configurations, operations, and technical effects that are not described in the seventh embodiment are substantially same as those disclosed in the first to sixth embodiments, and hence description is omitted.

Figure 53:
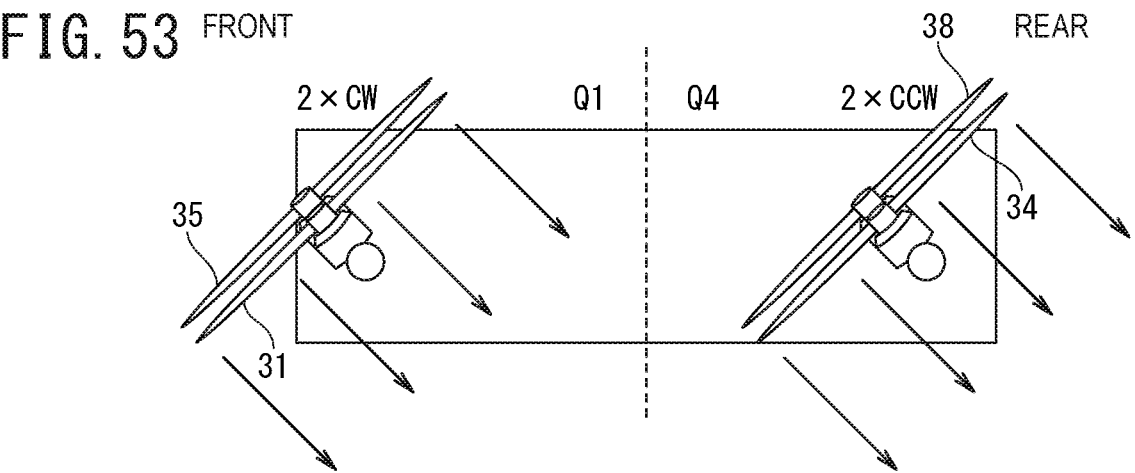
FIG. 53 is a side view illustrating an advancing mode of the aircraft according to the seventh embodiment by being tilted.
Figure 54:
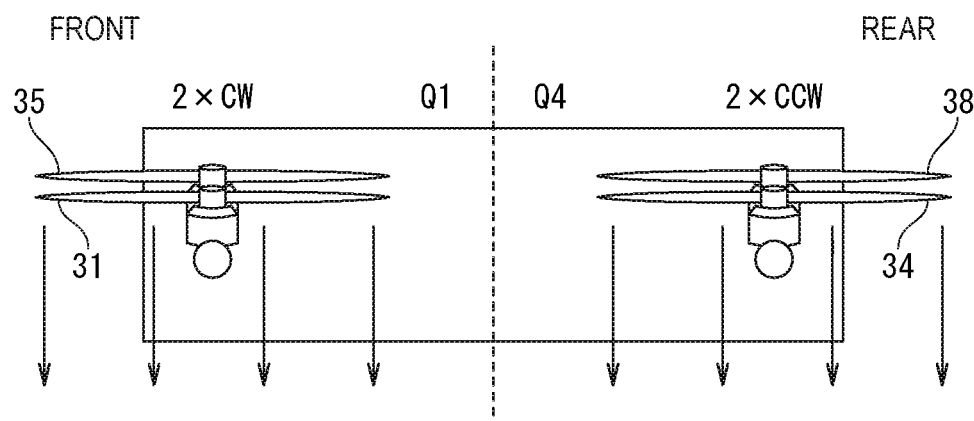
FIG. 54 is a side view illustrating a hovering state of the aircraft according to the seventh embodiment by being tilted.
Figure 55:
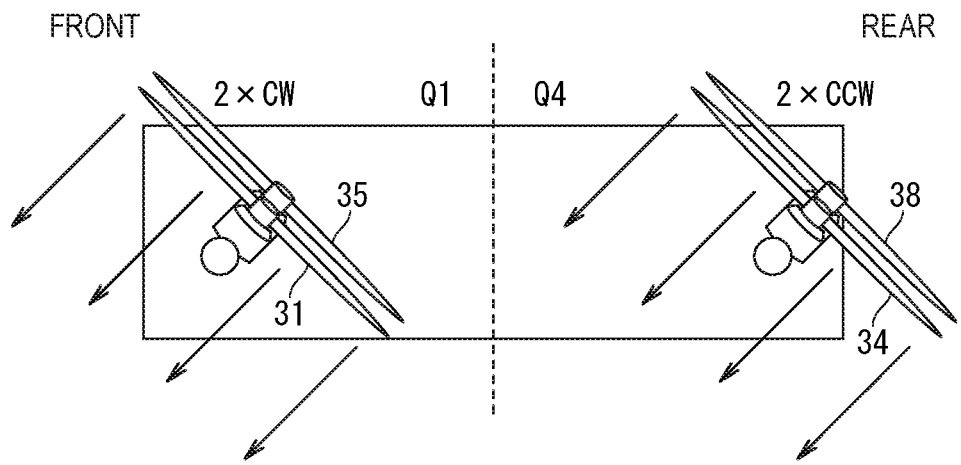
FIG. 55 is a side view illustrating a retreating mode of the aircraft according to the seventh embodiment by being tilted.

Each of FIG. 53 to FIG. 55 is a side view taken from a side of the first and fourth divided regions (quadrants) Q1 and Q4. As illustrated in FIG. 53, the tilt shafts are tilted along a CCW direction in the side view under the control of the tilt members T1 and T2, thereby obtaining an advancing mode. As illustrated in FIG. 54, the tilt shafts return to the original positions, thereby obtaining a hovering state, or a state staying in the same position in the air without moving. As illustrated in FIG. 55, the tilt shafts are tilted along a CW direction in the side view under the control of the tilt members T1 and T2, thereby obtaining a retreating mode. In order to return the airframe from an advancing mode as illustrated in FIG. 53 to the hovering state in FIG. 54, a brake is applied temporarily by the retreating action in FIG. 55, and then the state is shifted to the hovering state in FIG. 54. In order to return the airframe from a retreating mode as illustrated in FIG. 55 to the hovering state in FIG. 54, a brake is applied temporarily by the advancing action in FIG. 53, and then the state is shifted to the hovering state in FIG. 54. As illustrated in FIGS. 53 to 55, the front and rear tilt shafts are separated from each other by such distance that downward air currents from the rotors do not overlap with each other. When the multicopter, which has a tilting mechanism, moves frontward and rearward, it is not required to change thrust toward the front-and-rear direction. Further, the shift from the advancing mode to the hovering state and the shift from the retreating mode to the hovering state can easily be performed, therefore the multicopter having the tilting mechanism can achieve a high efficiency.

As another feature of the multicopter having the tilting mechanism, the airframe is not required to be tilted largely in the front-and-rear direction at the time of the respective operations in the advancing mode, the retreating mode, the shifting state from the advancing mode to the hovering state, and the shifting state from the retreating mode to the hovering state. The feature that the airframe is not required to be tilted largely is an advantageous factor important for achieving a comfortable riding in a manned multicopter. In a helicopter including a swash-plate mechanism, a cockpit may be tilted slightly in the front-and-rear direction, but the cockpit is not tilted largely in the front-and-rear direction.

Even with the multicopter having the tilting mechanism, the similar effect can be obtained because operations can be performed almost without tilting in the front-and-rear direction at the time of the respective shift operations.

Figure 57:
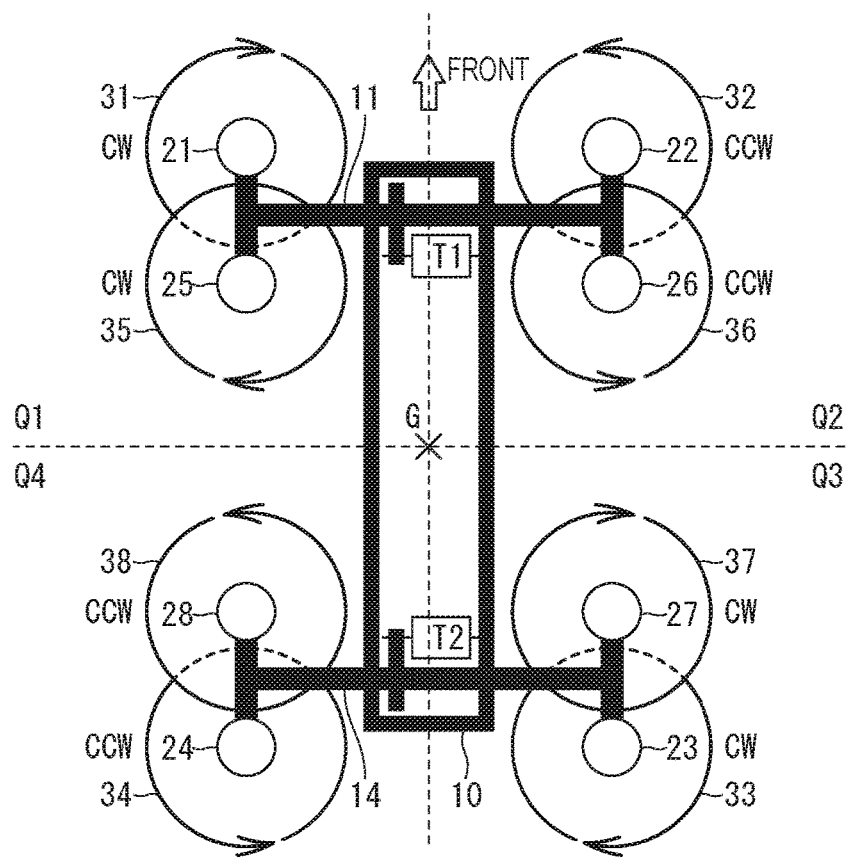
FIG. 57 is a top view illustrating another example of a basic configuration of the aircraft according to the seventh embodiment.

In the aircraft illustrated in FIG. 52, the main rotors 31 and 32, the auxiliary rotors 35 and 36, the main rotors 33 and 34, and the auxiliary rotors 37 and 38 are arranged linearly on the tilt shafts extending in the directions perpendicular to the front-and-rear direction (advancing or retreating direction). As illustrated in FIG. 57, the respective dense rotors may be arranged in parallel in the front-and-rear direction. The main rotor 31 and the auxiliary rotor 35, and the main rotor 32 and the auxiliary rotor 36 are arranged on both the ends of the tilt shaft in the direction perpendicular to the tilt shaft. Similarly, the main rotor 33 and the auxiliary rotor 37, and the main rotor 34 and the auxiliary rotor 38 are arranged on both the ends of the tilt shaft in the direction perpendicular to the tilt shaft. The octocopter illustrated in FIG. 57 has an airframe size larger than that the octocopter illustrated in FIG. 52.

Figure 58:
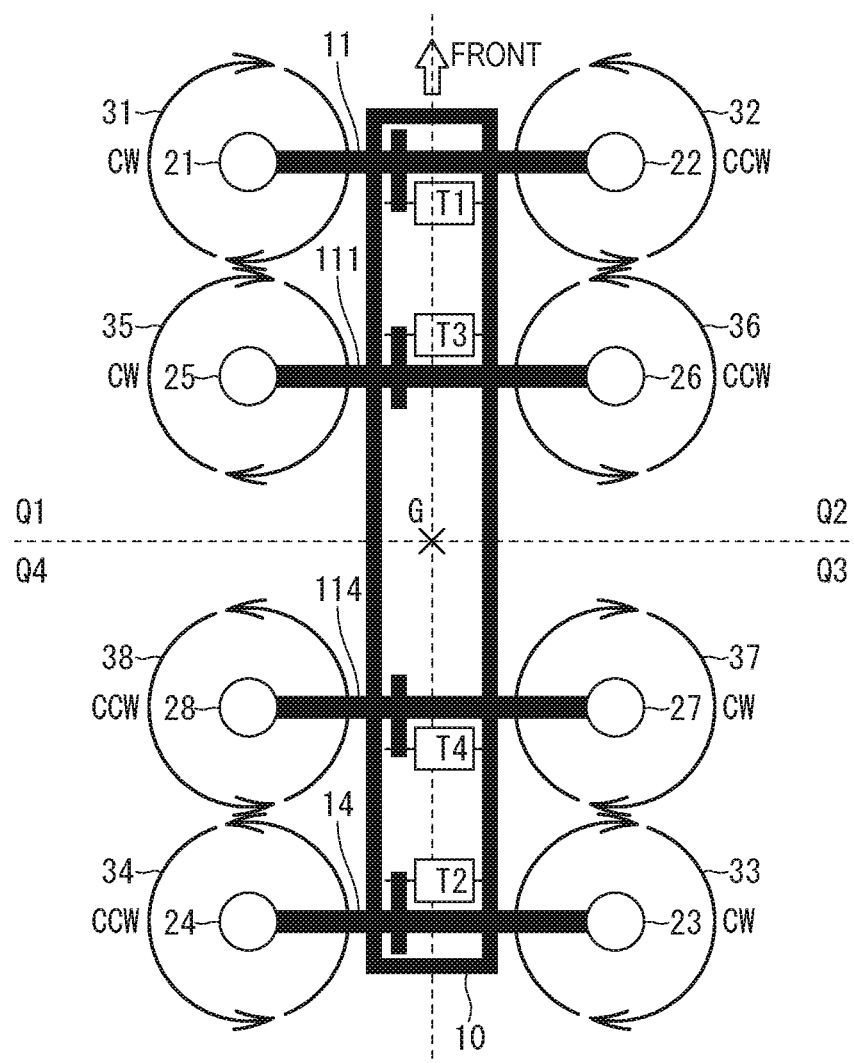
FIG. 58 is a top view illustrating another example of a basic configuration of the aircraft according to the seventh embodiment.
Figure 62:
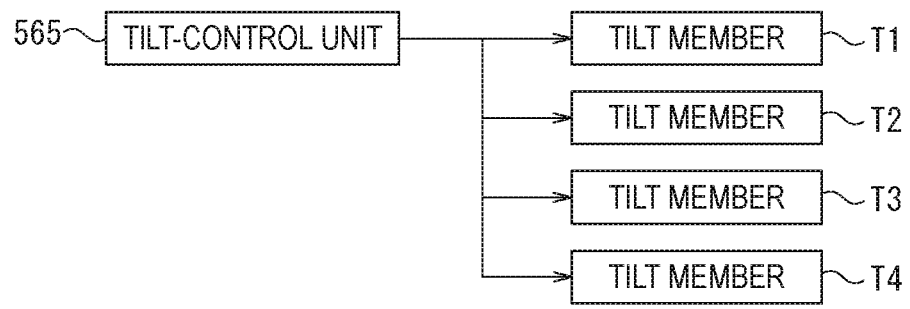
FIG. 62 is a block diagram illustrating a tilt-control unit of a flight controller of the aircraft represented by FIG. 58.

FIG. 58 is a view of an example in which the tilting mechanism is applied to an aircraft, or a VTOL aircraft that adopts the arrangement of the single rotors. In the first to fourth divided regions (quadrants) Q1 and Q2, the main rotors 31 and 32 are arranged on both the ends of the beam 11, and the auxiliary rotors 35 and 36 are arranged on both the ends of the beam 111. Similarly, in the third and fourth divided regions (quadrants) Q3 and Q4, the main rotor 33 and 34 are arranged on both the ends of the beam 14, and the auxiliary rotors 37 and 38 are arranged on both the ends of the beam 114. The tilt members T1, T2, T3, and T4 are provided on the beams 11, 14, 111, and 114, respectively. As illustrated in FIG. 62, the tilt members T1 to T4 are controlled by the tilt-control unit 565.

Figure 59:
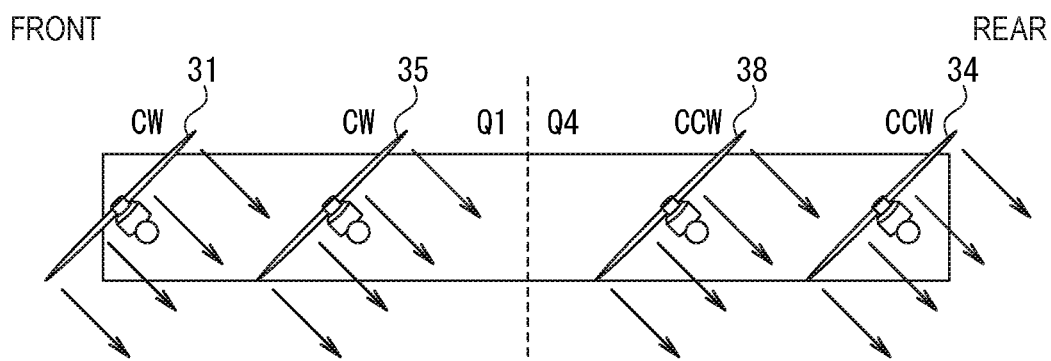
FIG. 59 is a side view illustrating an advancing mode of the aircraft represented by FIG. 58 by being tilted.
Figure 60:
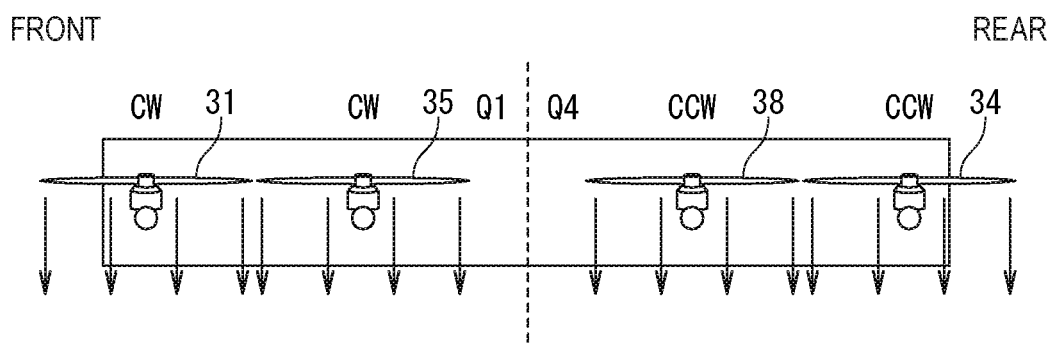
FIG. 60 is a side view illustrating a hovering state of the aircraft represented by FIG. 58 by being tilted.
Figure 61:
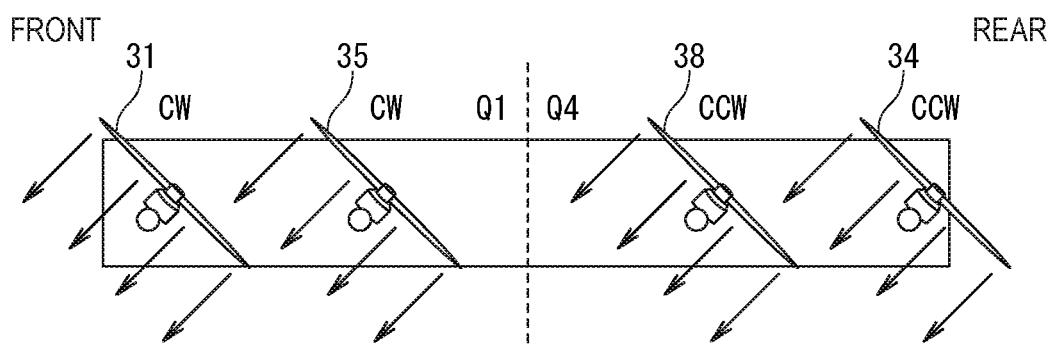
FIG. 61 is a side view illustrating a retreating mode of the aircraft represented by FIG. 58 by being tilted.

Each of FIG. 59 to FIG. 61 is a side view taken from a side of the first and fourth divided regions (quadrants) Q1 and Q4. As illustrated in FIG. 59, the tilt shafts are tilted along a CCW direction in the side view under the control of the tilt members T1 to T4, thereby obtaining an advancing mode. As illustrated in FIG. 60, the tilt shafts return to the original positions, thereby obtaining a hovering state. As illustrated in FIG. 61, the tilt shafts are tilted along a CW direction in the side view under the control of the tilt members T1 to T4, thereby obtaining a retreating state. As illustrated in FIG. 59 and FIG. 61, an interval between the beam 11 and the beam 111 and an interval between the beam 14 and the beam 114 are set in the advancing mode and the retreating mode so that the main rotors 31 to 34 and the auxiliary rotors 35 to 38 are in the dense-rotor arrangement. Further, in the advancing mode and the retreating mode, an interval between the beam 111 and the beam 114 is set to be such distance that downward air currents from the rotors do not overlap with each other. By selecting the interval between the beam 11 and the beam 111 and the interval between the beam 14 and the beam 114, in the octocopter illustrated in FIG. 58, the dense-rotor arrangement is achieved for the advancing operation and the retreating operation. Thus, energy efficiency is not degraded. The octocopter illustrated in FIG. 58 has an airframe size larger than the octocopters illustrated in FIG. 52 and FIG. 57. Therefore, the octocopter illustrated in FIG. 52 is desired because the airframe size can be minimized.

Eighth Embodiment

As described with the aircraft according to the first to seventh embodiments, the design criterion of the present invention inheres in that the rotors, which are rotated in the directions counter to those in the adjacent divided regions, are basically arranged in the quadrisected divided regions. That is, as the basic design method of the multicopter frame, in a plane view of the multicopter seen from the top, the plurality of rotors rotated in the same directions are arranged in the respective quadrisected divided regions, and the rotors rotated in the counter directions are arranged in the adjacent divided regions. The multicopter based on the design criterion of the present invention has the following four features:

(a) the control circuit of the traditional quadcopter can be used as it is;

(b) even when one rotor in a specific divided region is failed to operate properly, the other rotor in the same specific divided region can complement thrust or lift of the failed or faulty rotor;

(c) a stable flight can be achieved as far as a single rotor operates in each of the divided regions;

(d) a stable flight can be maintained by the attitude control mechanism of the flight controller, without requiring the detection of the faulty rotor system.

According to the design criterion of the present invention, only a single rotor is required to operate in a subject single divided region. Thus, a flight can be achieved in a scheme of rotating one rotor in each divided region, thereby saving the other rotor as a backup rotor for the time of a failure. As a matter of course, a flight may be performed in a scheme of rotating all the rotors in one divided region.

The design criterion of the present invention is not limited to the quadruple divided regions, and may be applied to a plane divided into any plural number of divided regions. For example, it is only required that a plane defined on the top of the multicopter be divided into a plurality of divided regions such as double divided regions, triple divided regions, quadruple divided regions, quintuple divided regions, hextuple divided regions, septuple divided regions, octuple divided regions, and nonuple divided regions, and that the rotors rotated in the counter directions be arranged in the adjacent divided regions. When the number of divided regions is odd, the main rotors in only one divided region are rotated in the same directions to those in the adjacent divided regions. In an eighth embodiment of the present invention, description is made of a case where the design criterion of the present invention is applied to hextuple divided regions, octuple divided regions, triple divided regions, and quintuple divided regions. The configurations, operations, and technical effects that are not described in the eighth embodiment are substantially same as those disclosed in the first to seventh embodiments, and hence description is omitted.

Figure 63:
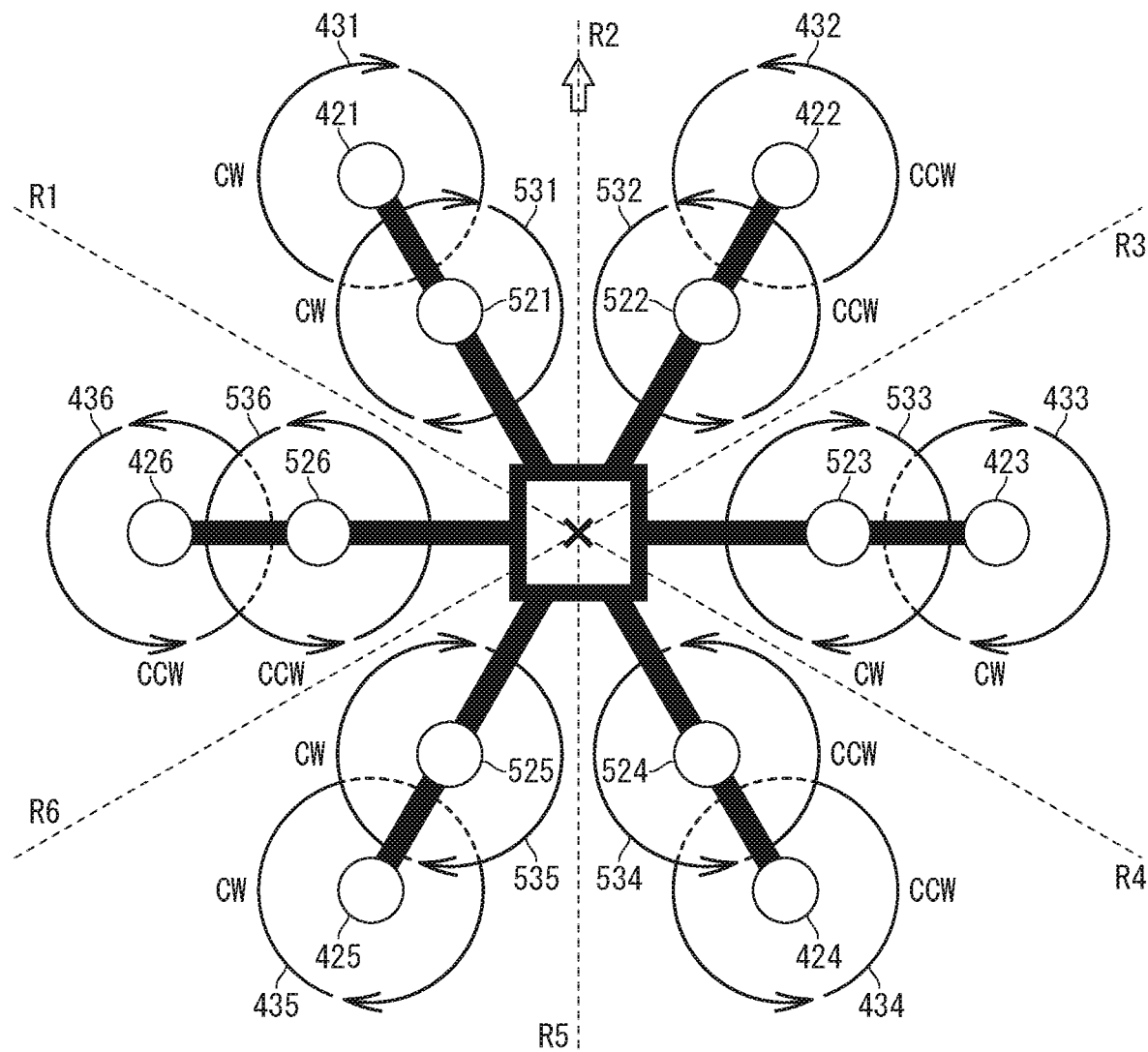
FIG. 63 is a top view illustrating an example of a basic configuration of an aircraft, or a VTOL aircraft according to an eighth embodiment of the present invention.

As illustrated in FIG. 63, an aircraft, or a VTOL aircraft according to the eighth embodiment is a dodecacopter airframe in which the dense rotors are arranged in first to sixth divided regions R1, R2, R3, R4, R5, and R6 defined around the main-body 10. In the first divided region R1, a main rotor (first rotor) 431 and a first motor 421 configured to rotate the main rotor 431, as well as an auxiliary rotor (second rotor) 531 and a second motors 521 configured to rotate the auxiliary rotors 531 are arranged. Similarly, in the second to sixth divided regions R2 to R6, main and auxiliary rotors 432 to 436, and 532 to 536 and first and second motors 422 to 426 and 522 to 526 configured to rotate the main and auxiliary rotors 432 to 436 and 532 and 536 are arranged. The rotors in the first, third, and fifth divided regions R1, R3, and R5 are rotated in the CW direction. The rotors in the second, fourth, and sixth divided regions R2, R4, and R6 are rotated in the CCW direction, so that the rotors are rotated in the directions counter to those in the adjacent divided regions.

Figure 64:
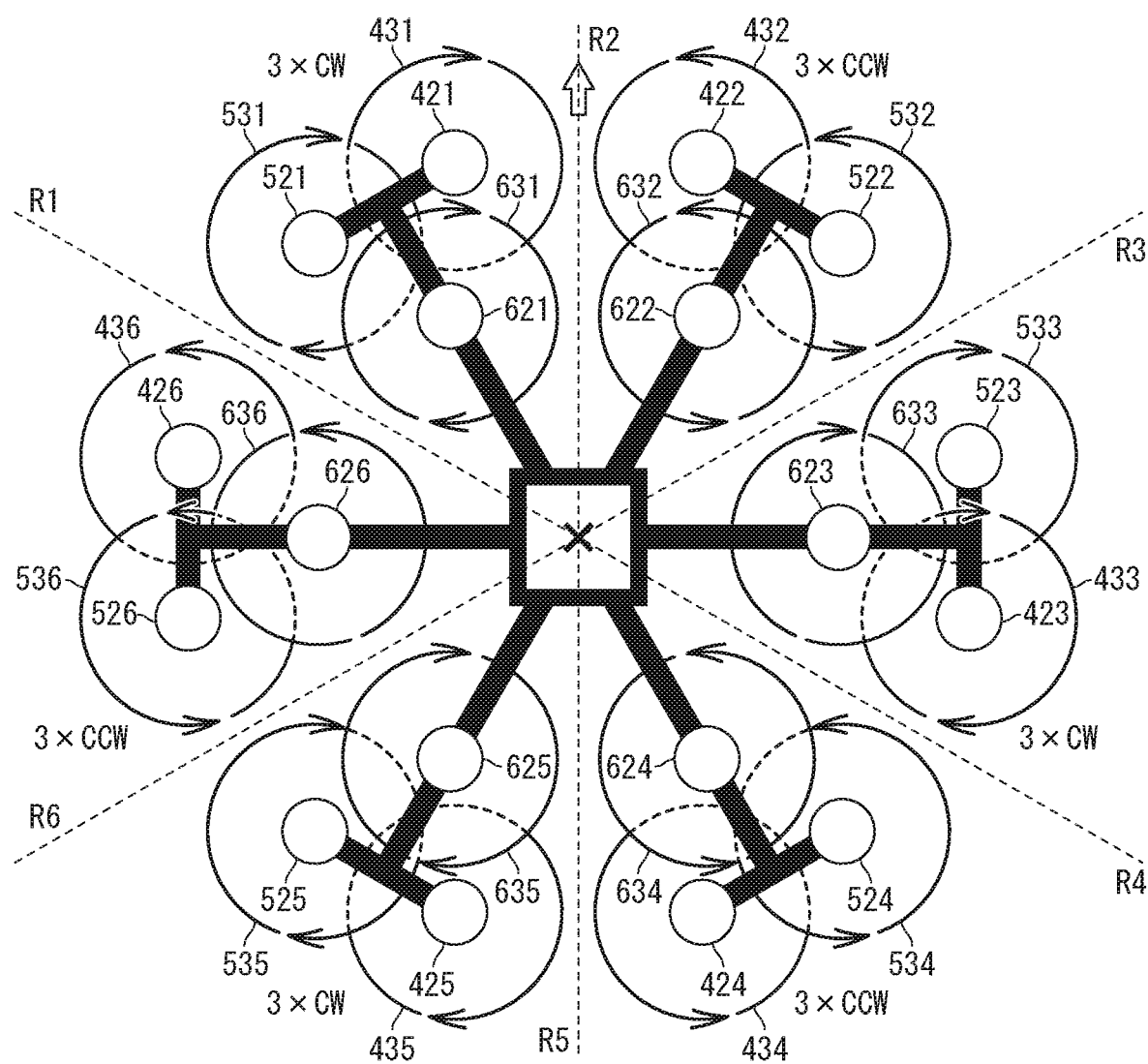
FIG. 64 is a top view illustrating another example of a basic configuration of the aircraft according to the eighth embodiment.

FIG. 64 is a view of an octadecacoper airframe adopting the dense-rotor arrangement including triple rotors in place of the dense-rotor arrangement including double rotors, which is illustrated in FIG. 63. As illustrated in FIG. 64, the first to third rotors 431 to 436, 531 to 536, and 631 to 636, and the first to third motors 421 to 426, 521 to 526, and 621 to 626, each of which being assigned in the independent power-drive systems, respectively, configured to rotate the first to third rotors 431 to 436, 531 to 536, and 631 to 636 are arranged in the first to sixth divided regions R1 to R6, respectively.

Figure 65:
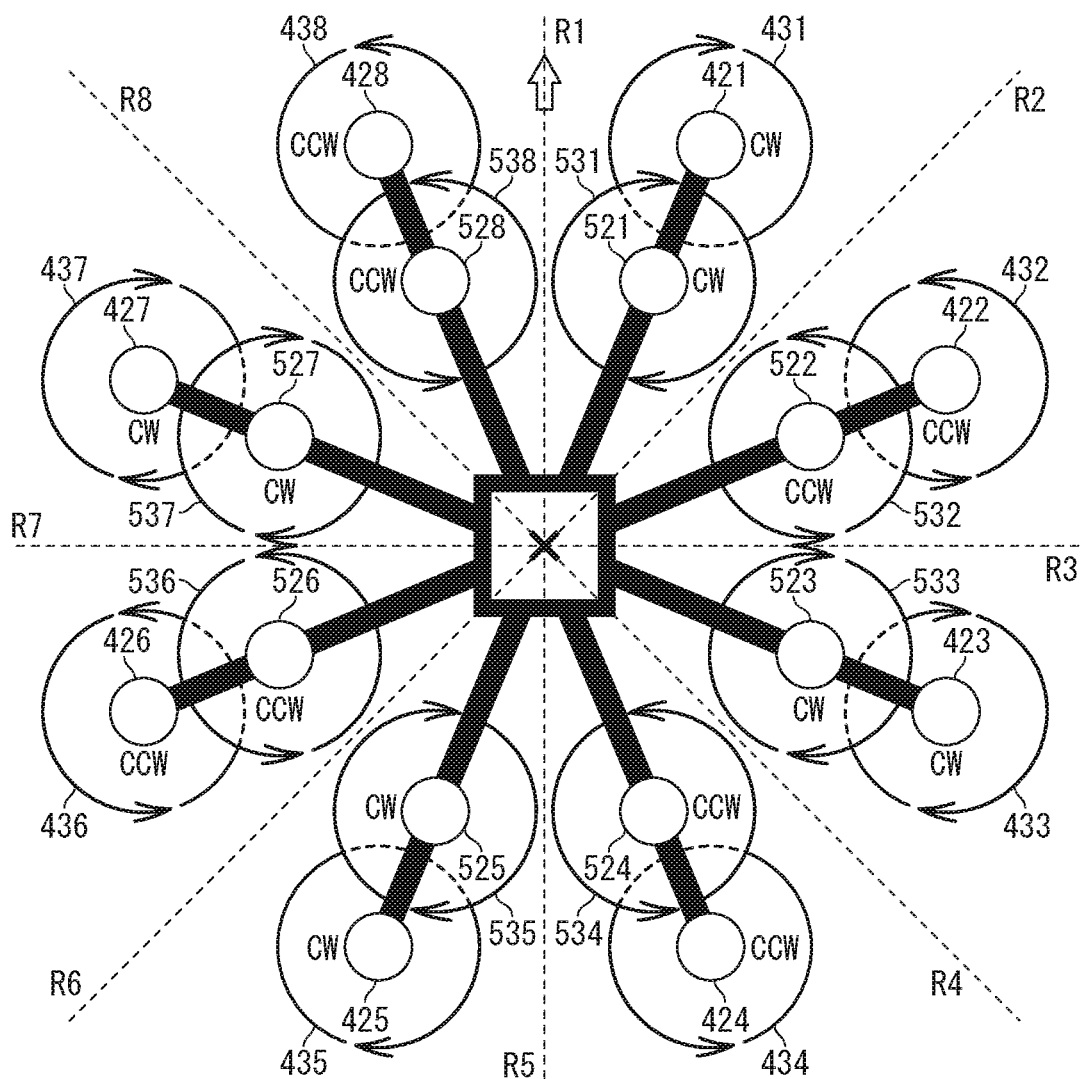
FIG. 65 is a top view illustrating another example of a basic configuration of the aircraft according to the eighth embodiment.

FIG. 65 is view of a hexadecacopter airframe in which the dese rotors are arranged in the first to eighth divided regions R1, R2, R3, R4, R5, R6, R7, and R8. As illustrated in FIG. 65, the main rotors 431 to 438, the auxiliary rotors 531 to 538, and the first motors 421 to 428 and the second motors 521 to 528 configured to rotate the main rotors 431 to 438 and the auxiliary rotors 531 to 538 are arranged in the first to eighth divided regions R1 to R8, respectively. In the main-body 10, the rotors in the first, third, fifth, and seventh divided regions R1, R3, R5, and R7 are rotated in the CW direction. The rotors in the second, fourth, sixth, and eighth divided regions R2, R4, R6, and R8 are rotated in the CCW direction. As described above, the rotors are rotated in the directions counter to those in the adjacent divided regions.

Figure 66:
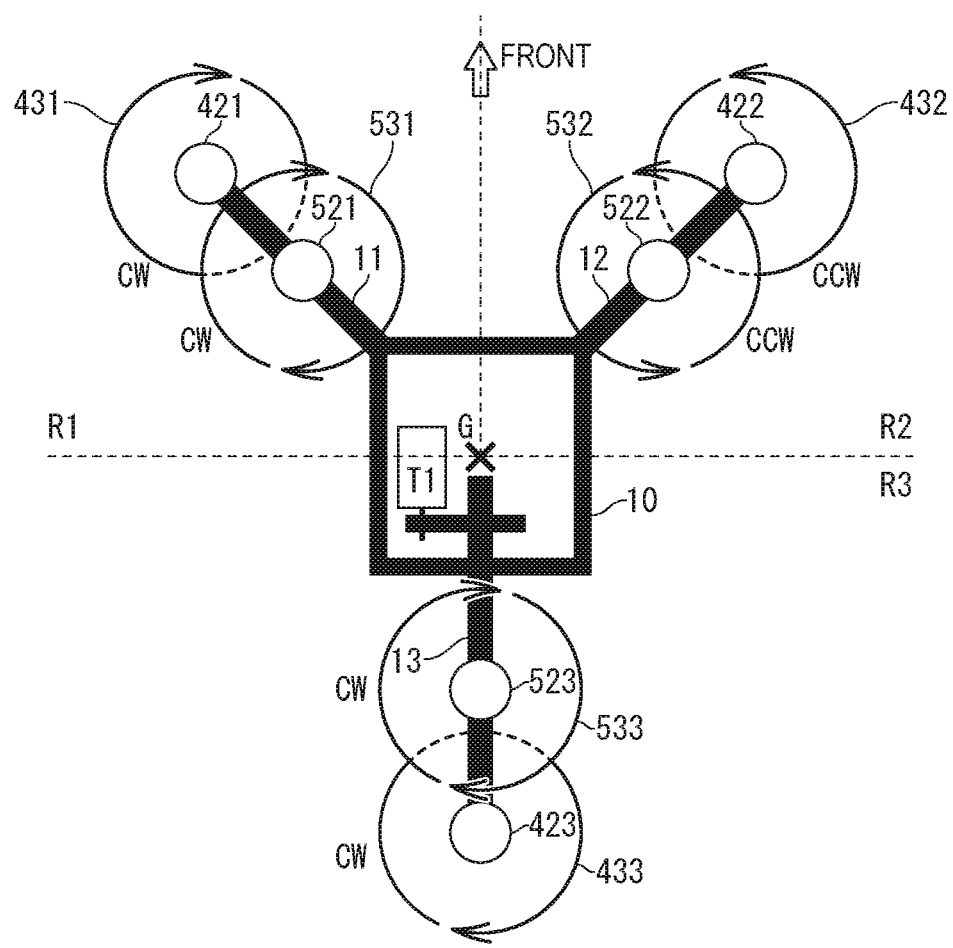
FIG. 66 is a top view illustrating another example of a basic configuration of the aircraft according to the eighth embodiment.

FIG. 66 is a view of a hexacopter in which the dense rotors are arranged in the first to third divided regions R1, R2, and R3. As illustrated in FIG. 66, the main rotor 431 and the auxiliary rotor 531, which are rotated in the CW direction, are arranged on the beam 11 in the first divided region R1. The main rotor 432 and the auxiliary rotor 532, which are rotated in the CCW direction, are arranged on the beam 12 in the second divided region R2. The main rotor 433 and the auxiliary rotor 533, which are rotated in the CW direction, are arranged on the beam 13 in the third divided region R3. The beams 11, 12, and 13 are arranged in a Y-shape from the gravity center G so that the beams 11 and 12 are symmetric with respect to the advancing direction and the beam 13 extends in the retreating direction. In the main-body 10, the tilt member T1 having the beam 13 as the tilt shaft is provided. The hexacopter in FIG. 66 is obtained by duplicating the rotors of the Y-shaped tricopter with the dense rotors. Thus, the control method is the same as that for the Y-shaped tricopter. The yaw-axis control for the Y-shaped tricopter is performed by the tilt member T1 instead of the ratio of the directions CW and the directions CCW. Thus, the yaw-axis control for the hexacopter in FIG. 66 is performed by the tilt member T1.

Figure 67:
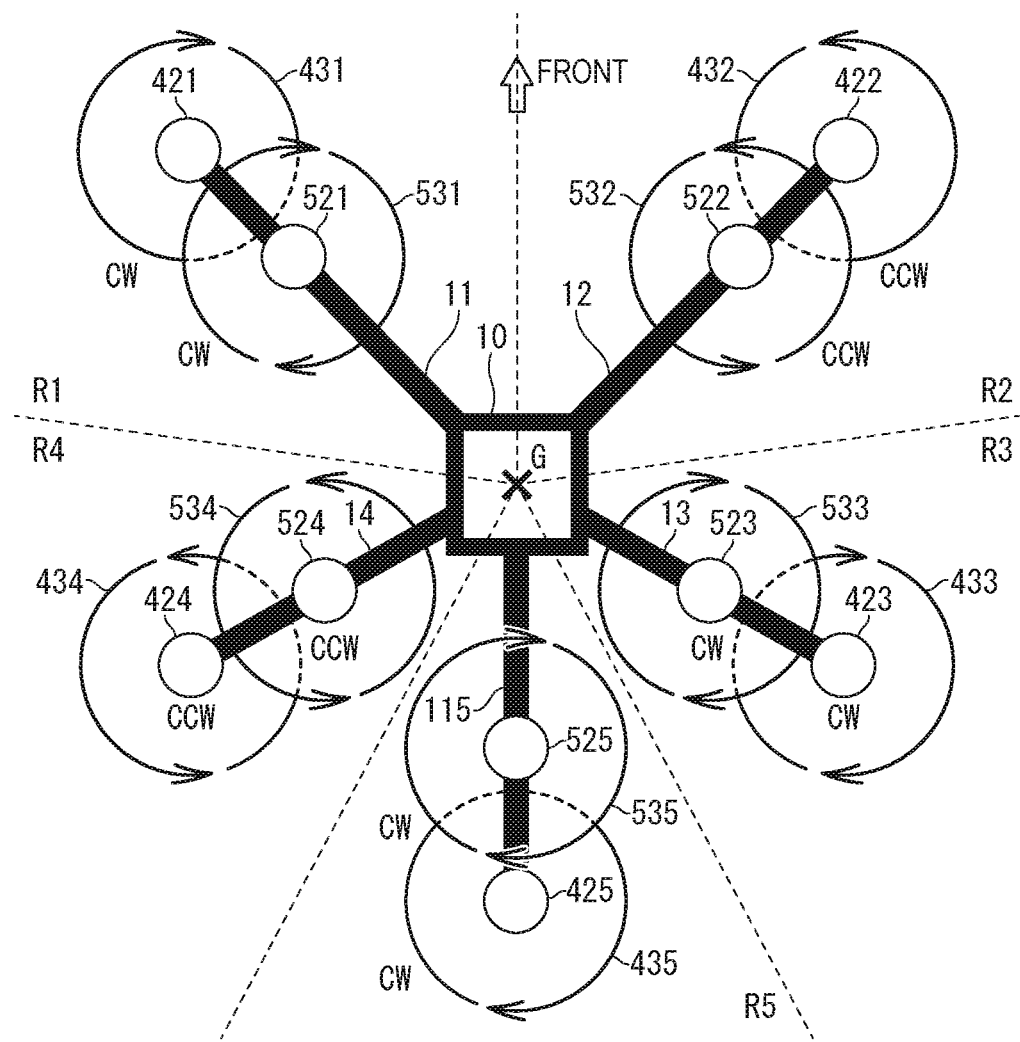
FIG. 67 is a top view illustrating another example of a basic configuration of the aircraft according to the eighth embodiment.

FIG. 67 is a view of a decacopter airframe in which the dense rotors are arranged in the first to fifth divided regions R1, R2, R3, R4, and R5. As illustrated in FIG. 67, the main rotors 431 to 435 and the auxiliary rotors 531 to 535 are arranged on the beams 11, 12, 13, 14, and 115 in the first to fifth divided regions R1, R2, R3, R4, and R5. The main rotor 431 and the auxiliary rotor 531, which are rotated in the CW direction, are arranged on the beam 11 in the first divided region R1. The main rotor 432 and the auxiliary rotor 532, which are rotated in the CCW direction, are arranged on the beam 12 in the second divided region R2. The main rotor 433 and the auxiliary rotor 533, which are rotated in the CW direction, are arranged on the beam 13 in the third divided region R3. The main rotor 434 and the auxiliary rotor 534, which are rotated in the CCW direction, are arranged on the beam 14 in the fourth divided region R4. The main rotor 435 and the auxiliary rotor 535, which are rotated in the CW direction, are arranged on the beam 115 in the fifth divided region R5. The beams 11, 12, 13, 14, and 115 extend from the gravity center G in such manner that the beams 11 and 12 are symmetric with respect to the advancing direction, the beams 13 and 14 are symmetric with respect to the retreating direction, and the beam 115 extends in the retreating direction. The decacopter in FIG. 67 is obtained by duplicating the rotors of the pentacopter with the dense rotors. Thus, the control method is the same as that for the pentacopter. In the pentacopter, the number of rotors rotated in the CW direction and the number of rotors rotated in the CCW direction are different from each other. However, there is no problem because the yaw-axis control is performed with the ratio of the directions CW and the directions CCW. Also, the yaw-axis control for the decacopter in FIG. 67 is performed with the ratio of the directions CW and the directions CCW.

Figure 68:
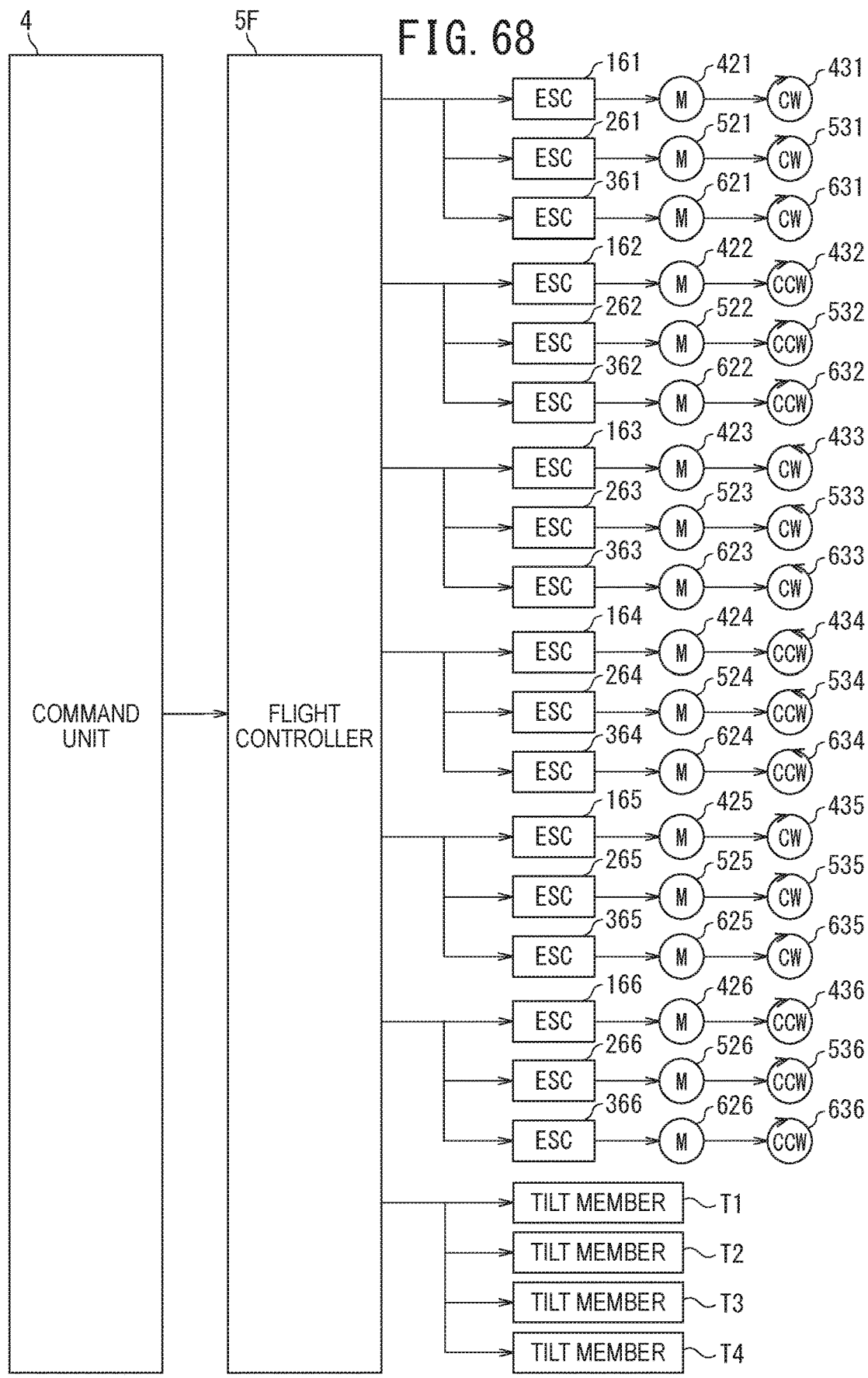
FIG. 68 is a block diagram illustrating an example of a control system of the aircraft according to the eighth embodiment.

FIG. 68 is a view of a control system capable of controlling the dodecacopter illustrated in FIG. 63 and the octadecacopter illustrated in FIG. 64. The tilt-control unit in FIG. 68 is not used for the control of the dodecacopter in FIG. 63 and the octadecacopter in FIG. 64. As illustrated in FIG. 68, an FC 5F controls the rotations of the first to third rotors 431 to 436, 531 to 536, and 631 to 636, which are arranged in the first to sixth divided regions R1 to R6, through the ESCs 161 to 166, 261 to 266, and 361 to 366, respectively. Note that, algorithm for controlling the general hexacopter can be used for the FC of the multicopter based on the design criterion adopting the six divided regions.

Figure 69:
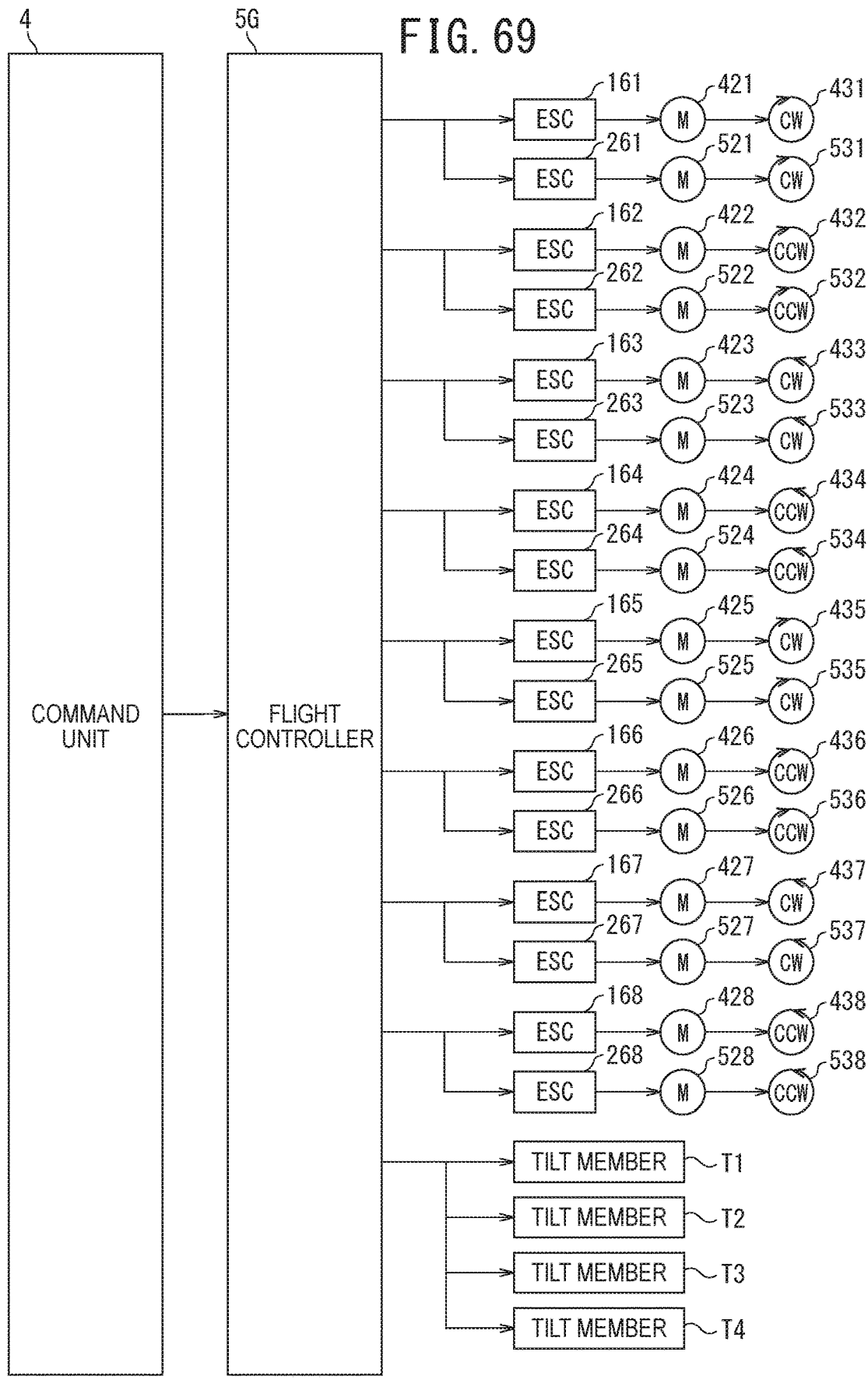
FIG. 69 is a block diagram illustrating another example of a control system of the aircraft according to the eighth embodiment.

FIG. 69 is a view of a control system capable of controlling the hexadecacopter illustrated in FIG. 65. The tilt-control unit in FIG. 69 is not used for the control of the hexadecacopter in FIG. 65. As illustrated in FIG. 69, an FC 5G controls the rotations of the main and auxiliary rotors 431 to 438 and 531 to 538, which are arranged in the first to eighth divided regions R1 to R8, through the ESCs 161 to 168 and 261 to 268, respectively. Note that, algorithm for controlling the traditional octocopter can be used for the FC of the multicopter based on the design criterion adopting the octuple divided regions.

FIG. 69 is also a view of a control system capable of controlling the hexacopter illustrated in FIG. 66. As illustrated in FIG. 69, the FC 5G controls the rotations of the main and auxiliary rotors 431 to 433 and 531 to 533, which are arranged in the first to third divided regions R1 to R3, through the ESCs 161 to 163 and 261 to 263. Further, the FC 5G includes the tilt-control unit 565 in FIG. 56, which has the same configuration of that of the FC 5E. The tilt member T1 rotates the beam 13 as the tilt shaft under control of the tilt-control unit 565, and tilts the main rotor 433 and the auxiliary rotor 533, which are coupled to the beam 13, in the third divided region R3. In FIG. 66, the yaw axis is controlled by tilting the main rotor 433 and the auxiliary rotor 533. Note that, algorithm for controlling the traditional tricopter can be used for the FC of the multicopter based on the design criterion adopting the triple divided regions.

FIG. 69 is also a view of a control system capable of controlling the decacopter illustrated in FIG. 67. The tilt-control unit in FIG. 69 is not used for the control of the decacopter in FIG. 67. As illustrated in FIG. 69, the FC 5G controls the rotations of the main and auxiliary rotors 431 to 435 and 531 to 535, which are arranged in the first to fifth divided regions R1 to R5, through the ESCs 161 to 165 and 261 to 265, respectively. Note that, algorithm for controlling the general pentacopter can be used for the FC of the multicopter based on the design criterion adopting the five divided regions.

Ninth Embodiment

Figure 70:
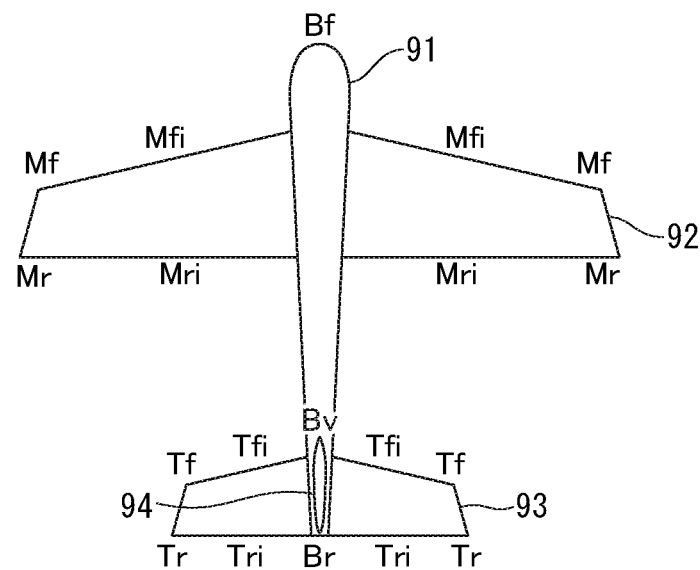
FIG. 70 is a schematic perspective view illustrating positions at which the dense rotors are applicable in a general aircraft.

With the aircraft according to the sixth to eighth embodiments, various cases where the dense rotors are applied to the multicopter are explained. However, the dense rotors can be used for a screw of other aircrafts and watercrafts. For example, in FIG. 70, positions at which the dense rotors can be applied to a general aircraft including an airframe 91, a main plane 92, and tail wings (93 and 94) are illustrated. As illustrated in FIG. 70, on the airframe 91, the dense rotors can be applied at a nose portion Bf, a front portion By and a rear portion Br of the tail wing 94, and the like. On the main wing 92, the dense rotors can be applied at a front distal portion Mf, a front intermediate portion Mfi, a rear distal portion Mr, a rear intermediate portion Mri, and the like. On horizontal wing tail 93, the dense rotors can be applied at a front distal portion Tf, a front intermediate portion Tfi, a rear intermediate portion Tri, and the like. Note that, it is desired that the dense rotors be provided on both right wings and left wings of the main wing and the horizontal tail wing in order to balance the airframe.

Figure 71:
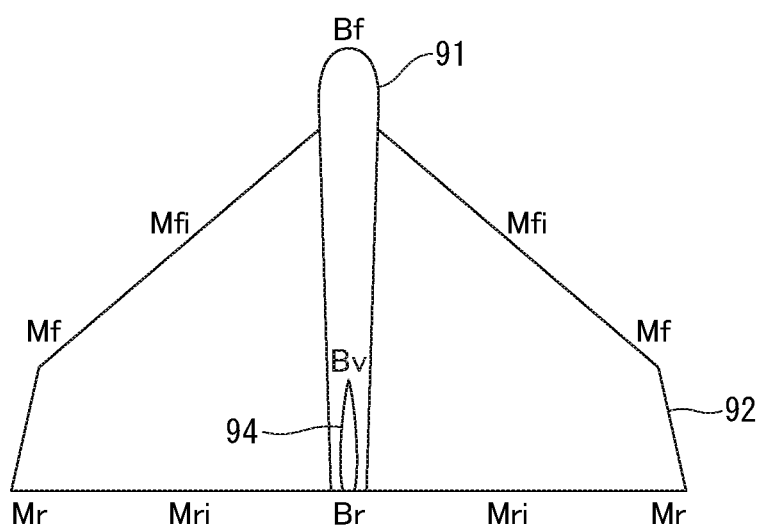
FIG. 71 is a schematic perspective view illustrating positions at which the dense rotors are applicable in a general aircraft including delta wings.

In FIG. 71, positions at which the dense rotors can be applied to a delta-wing aircraft including the airframe 91, the main wing 92, and the tail wing 94 are illustrated. As illustrated in FIG. 71, the dense rotors can be applied at the nose Bf of the airframe 91, the front portion By and the rear portion Br of the tail wing 94, the front distal portion Mf, the front intermediate portion Mfi, and the rear intermediate portion Mri of the main wing 92, and the like.

Figure 72:
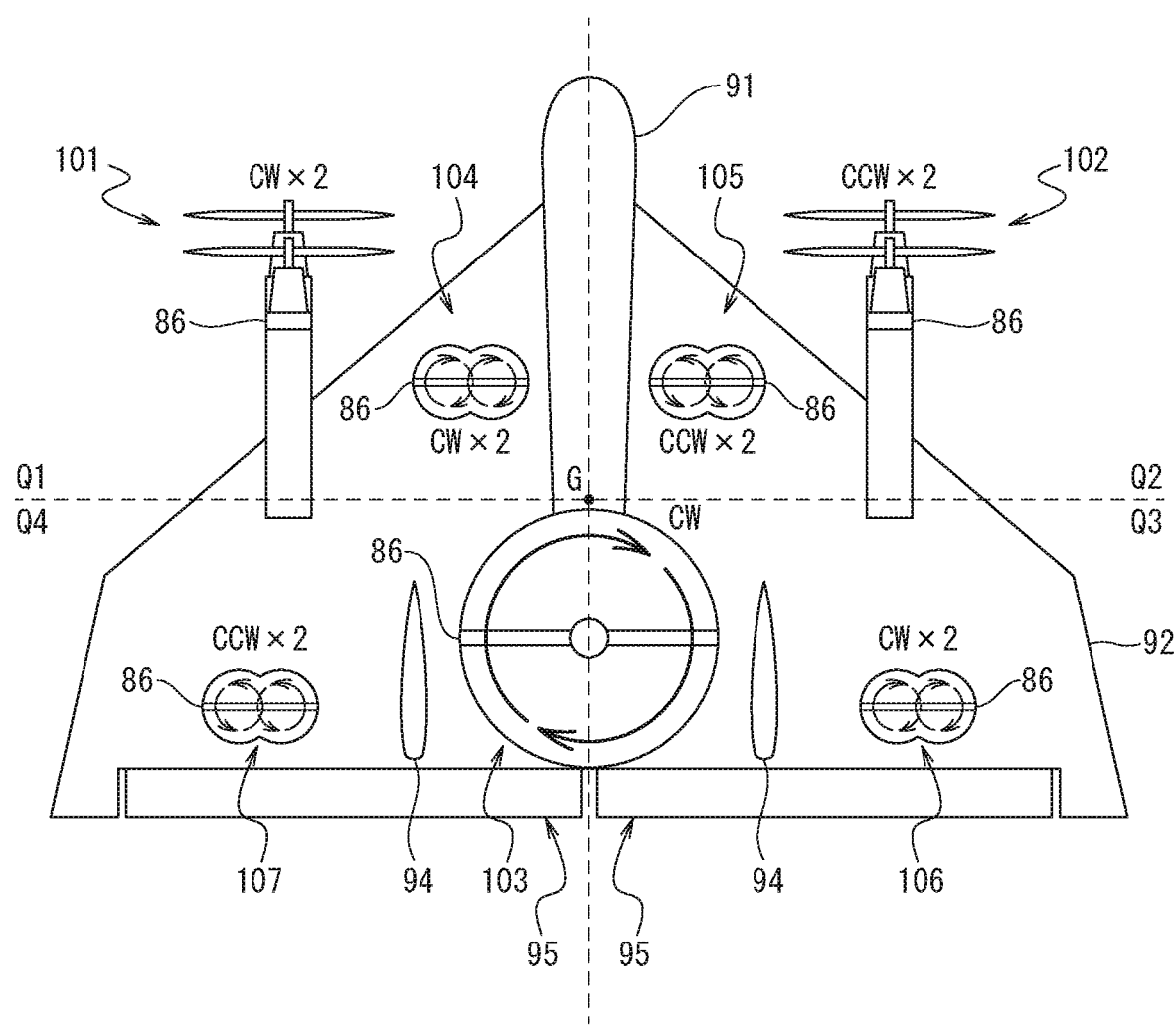
FIG. 72 is a schematic perspective view illustrating positions at which the dense rotors are applicable in a general VTOL aircraft.

In FIG. 72, positions at which the dense rotors can be applied to a VTOL aircraft including the airframe 91, the main wing 92, the tail wings 94 and rudders 95 are illustrated. As illustrated in FIG. 72, the aircraft includes the dense rotors 101, 102, 104, 105, 106, and 107, which are used for a horizontal flight and vertical take-off and landing, and the rotor 103. Each of all the rotors 101 to 107 has a tilting mechanism 86. The rotor 103 is mounted between the tail wings 94 on the rear portion of the airframe 91. In FIG. 72, the case of the two tail wings 94 is exemplified. However, one tail wing 94 may be arranged on an upper part of the center axis of the rotor 103. The rotor 103 may be a dense rotor similar to the rotor 104. When the rotors 101, 102, and 103 are tilted by the tilting mechanisms 86 at an angle of obtaining lift, a hovering state can be achieved by only triple rotors, which are the rotors 101 and 102 and the rotor 103. When the hovering state is achieved by the triple rotors, which are the rotors 101 and 102 and the rotor 103, the yaw-axis control can be performed by the tilting mechanisms 86 of the rotors 101 and 102. For example, as the rotor 101 is tilted frontward, and the rotor 102 is tilted rearward, the airframe can yaw in the CW direction. When the rotor 101 is tilted rearward, and the rotor 102 is tilted frontward, the airframe can yaw in the CCW direction. In place of the rotors 101 and 102, the rotors 104 and 105 may be used. In place of the rotor 103, the rotors 106 and 107 may be used. A flight can be performed in the first mode in which all the rotors 101 to 107 are operated. A state in which a part of the rotors is paused is referred to as the second mode. During the horizontal flight, when the respective rotors are tilted by the tilting mechanism 86 so as to be tilted frontward at 90 degrees, thrust in the advancing direction is generated, a flight can be performed with the lift generated by the main wing 92. The attitude control of the airframe at the time of the horizontal flight can be performed by the right and left independent rudders 95 that function as ailerons, elevators, and flaps.

OTHER EMBODIMENTS

As described above, the present invention is described with the above-mentioned first to ninth embodiment. However, the description and the drawings forming part of the present disclosure should not be understood as the matters limiting the present invention. From the present disclosure, various alternative embodiment, examples, and operation technologies may be apparent to a person skilled in the art.

For example, in the aircraft according to the first to ninth embodiments, the rotation directions in the first divided regions Q1 and R1, the second divided regions Q2 and R2, the third divided regions Q3 and R3, the fourth divided regions Q4 and R4, the fifth divided region R5, the sixth divided region R6, the seventh divided region R7, and the eighth divided region R8 may not necessarily be the same. The rotation direction of the rotors, which are assigned as majority rotors in each divided region, is only required to be counter to the rotation direction of the rotors, which serve as majority rotors in the adjacent divided regions. The number of blades of each rotor may be adjusted to appropriate values. Also, a diameter and a pitch of each rotor may be adjusted to appropriate values.

For example, with the aircraft according to the first to ninth embodiments, when one or more dense rotors in FIG. 40 are included, with regard to the rotation directions in the first divided regions Q1 and R1, the second divided regions Q2 and R2, the third divided regions Q3 and R3, the fourth divided regions Q4 and R4, the fifth divided region R5, the sixth divided region R6, the seventh divided region R7, and the eighth divided region R8, the number of rotors rotated in the CW direction and the number of rotors rotated in the CCW direction may be equal or substantially equal. In a case when one or more dense rotors are included, the number of blades of each rotor may be adjusted to appropriate values, and a diameter and a pitch of each rotor may be adjusted to appropriate values.

Further, in the second mode of the aircraft pertaining to the first to ninth embodiments, the rotors that are not used for a flight may be folded so as not to degrade efficiency of the lift generated by the rotating rotors. Further, in the respective divided regions, phases of the rotations of the rotors may be set so as not to overlap with each other.

Further, the aircraft according to the first to ninth embodiments is an aircraft powered by a plurality of rotors for lift and thrust. However, as lift and thrust, the aircraft may include other power sources such as a gas-turbine engine, a jet engine, a ducted fan.

Moreover, as a matter of course, the present invention includes various embodiments and the like, which are not described herein, such as configurations to which the above-mentioned configurations are mutually applied. Therefore, the technical scopes of the present invention are defined only by the reasonable technical features, which are used to define the invention, according to the scopes of claims based on the above-mentioned description.

What is claimed is:

1. An aircraft configured to take-off and land vertically, comprising:
    a main-body, in which a gravity center is defined in a planar pattern;
    a frame-structure configured to support the main-body, generating lifts in a same direction independently in each of a plurality of divided regions defined around the gravity center;
    a plurality of main rotors rotating around corresponding first rotation shafts, respectively, each of the first rotation shafts being provided to the frame-structure, each of the plurality of main rotors being assigned in a respective one of the plurality of divided regions;

a plurality of auxiliary rotors rotating around corresponding second rotation shafts, respectively, each of the second rotation shafts being provided to the frame-structure and being rotated by a power-drive system independent from a power-drive system for the first rotation shafts, in a divided region selected from the plurality of divided regions, an auxiliary rotor of the plurality of auxiliary rotors being rotated in a same direction as a main rotor of the plurality of main rotors; and a controller configured to control rotations of the main and auxiliary rotors according to first and second modes, such that in the first mode, the controller delivers a same control signal for rotating the set of the main and auxiliary rotors in each of the plurality of divided regions at a same rotation and frequency, and in response to one of the main and auxiliary rotors in any one of the plurality of divided regions becoming abnormal and a value of lift in an abnormal divided region becoming insufficient, the controller delivers the same control signal for increasing a rotation of a normal rotor other than the abnormal rotor for compensating a decrease of the lift by the abnormal rotor, and in the second mode, the controller delivers a control signal only to the normal rotor for increasing the rotation of the normal rotor, wherein sets of the main and auxiliary rotors in divided regions adjacent to a subject divided region are controlled to be rotated in a direction counter to a rotation direction of the main rotor in the subject divided region, wherein, in the first and second modes, the lifts of any set of the divided regions, in which the rotation directions are counter to each other, are equalized for balancing an orientation of the aircraft about a yaw axis, and the lifts in all of the plurality of divided regions are equalized for balancing the orientation about a roll axis and a pitch axis.

2. The aircraft of claim 1, wherein the plurality of divided regions is implemented by first, second, third, and fourth quadrants, the main rotor in the third quadrant is rotated in a same direction as a rotation direction of the main rotor in the first quadrant, and the main rotors in the second quadrant and the fourth quadrant are rotated in the direction counter to the rotation direction of the main rotor in the first quadrant.

3. The aircraft of claim 2, wherein, in each of the first to fourth quadrants, the main and auxiliary rotors are arranged so that, in a cross sectional plane vertical to rotation planes of the main and auxiliary rotors, levels of the rotation planes of the main and auxiliary rotors are away from each other, and areas of the rotation planes of the main and auxiliary rotors overlap with each other within a range smaller than a radius of the rotation planes.

4. The aircraft of claim 2, wherein, in each of the first to fourth quadrants, the first rotation shaft of the main rotor and the second rotation shaft of the auxiliary rotor are coaxial.

5. The aircraft according to claim 2, further comprising:
a first tilt member configured to tilt rotation planes of the main and auxiliary rotors simultaneously in each of the first quadrant and the second quadrant; and
a second tilt member configured to tilt rotation planes of the main and auxiliary rotors in each of the third quadrant and the fourth quadrant.

6. The aircraft according to claim 2, wherein in each of the plurality of divided regions, the main rotor is allocated on a side closer to the main-body with respect to the auxiliary rotor.

7. The aircraft according to claim 2, wherein the controller controls rotations of the main and auxiliary rotors independently in each of the first to fourth quadrants.

8. The aircraft of claim 7, wherein, in each of the first to fourth quadrants, the controller is configured to control the rotations of the main and auxiliary rotors and perform switching based on an attitude of the main-body.

9. The aircraft of claim 4, wherein, in the first mode, the main and auxiliary rotors are rotated in such phase that the main and auxiliary rotors are prevented from overlapping with each other.

10. The aircraft of claim 2, each of the plurality of divided regions further comprising a third rotor being rotated in a same direction as the direction of the main rotor, the third rotor being arranged between the main and auxiliary rotors in each of the first to fourth quadrants.

11. A control method for controlling an aircraft configured to take-off and land vertically, the aircraft comprising a main-body in which a gravity center for first to fourth quadrants is defined in a planar pattern, a frame-structure for supporting the main-body, four sets of main and auxiliary rotors allocated in the first to fourth quadrants, and a rotation direction of the set of the main and auxiliary rotors in the second and fourth quadrants is opposite to a rotation direction of the main rotor in the first quadrant, the control method comprising:

rotating the main rotors arranged with first rotation shafts allocated to the frame-structure, in each of the first to fourth quadrants for lifting the main-body in a same direction, independently in each of the first to fourth quadrants;

rotating the auxiliary rotors arranged with second rotation shafts allocated to the frame-structure in each of the first to fourth quadrants and are rotated in a same rotation direction as the main rotor, respectively, by power-drive systems independent from power-drive systems of the main rotors; and controlling rotations of the main and auxiliary rotors with first and second modes, such that in the first mode, by delivering a same control signal for rotating the set of the main and auxiliary rotors in each of the first to fourth quadrants at a same rotation frequency, and in response to one of the main and auxiliary rotors in any one of the first to fourth quadrants becoming abnormal and a value of lift in an abnormal quadrant becoming insufficient, delivering the same control signal for increasing a rotation of a normal rotor other than the abnormal rotor for compensating a decrease of the lift by the abnormal rotor, and in the second mode, delivering a control signal only to the normal rotor for increasing the rotation of the normal rotor, wherein values of lifts in each of the two quadrants having the rotation directions counter to each other are equalized for balancing an orientation of the aircraft about a yaw axis, and values of lifts in each of the first to fourth quadrants are equalized for balancing the orientation about a roll axis and a pitch axis.

12. A controller for controlling an aircraft configured to take-off and land vertically, the aircraft comprising a main-body in which a gravity center for first to fourth quadrants is defined in a planar pattern, a frame-structure for supporting the main-body, four sets of main rotors and auxiliary rotors allocated in the first to fourth quadrants to the frame-structure, the controller comprising:
- a flight controller configured to rotate the main and auxiliary rotors, the auxiliary rotor being rotated by a power-drive system independent from a power-drive system of the main rotor, to generate lifts in a same direction independently in the first to fourth quadrants; and
- a line-control unit configured to rotate the sets of the main and auxiliary rotors in each of the first to fourth quadrants, operating with first and second modes, such that in the first mode, by delivering a same control signal for rotating the set of the main and auxiliary rotors at a same rotation frequency, and in response to one of the main and auxiliary rotors in any one of the first to fourth quadrants becoming abnormal and a value of lift in an abnormal quadrant becoming insufficient, the line-control unit delivers the same control signal for increasing a rotation of a normal rotor other than the abnormal rotor for compensating a decrease of the lift by the abnormal rotor, and that in the second mode, the line-control unit delivers a control signal only to the normal rotor for increasing the rotation of the normal rotor,
- wherein a rotation direction of the set of the main and auxiliary rotors in the second and fourth quadrants is opposite to a rotation direction of the main rotor in the first quadrant, and a rotation direction of the set of the main and auxiliary rotors in the second and fourth quadrants is a same as the rotation direction of the main rotor in the first quadrant, and
- wherein, values of the lifts in each of the two quadrants having the rotation directions counter to each other are equalized for balancing an orientation of the aircraft about a yaw axis, and values of the lifts in the first to fourth quadrants are equalized for balancing the orientation about a roll axis and a pitch axis.

13. A non-transitory computer readable storage medium storing a control program of an aircraft configured to take-off and land vertically, the aircraft comprising a main-body in which a gravity center for first to fourth quadrants is defined in a planar pattern, a frame-structure for supporting the main-body, four sets of main and auxiliary rotors allocated in the first to fourth quadrants, and a rotation direction of the set of the main and auxiliary rotors in the second and fourth quadrants is opposite to a rotation direction of the main rotor in the first quadrant, the control program causing a computer to execute processing for controlling the aircraft by a series of instructions for performing operations comprising:
- rotating the main rotors arranged with first rotation shafts allocated to the frame-structure, in each of the first to fourth quadrants for lifting the main-body in a same direction, independently in each of the first to fourth quadrants;
- rotating the auxiliary rotors arranged with second rotation shafts allocated to the frame-structure in each of the first to fourth quadrants and are rotated in a same rotation direction as the main rotor, respectively, by power-drive systems independent from power-drive systems of the main rotors; and
- controlling rotations of the main and auxiliary rotors with first and second modes, such that in the first mode, by delivering a same control signal for rotating the set of the main and auxiliary rotors in the first to fourth quadrants at a same rotation frequency, and in response one of the main and auxiliary rotors in any one of the first to fourth quadrants becoming abnormal and a value of lift in an abnormal quadrant becoming insufficient, delivering the same control signal for increasing a rotation of a normal rotor other than the abnormal rotor for compensating a decrease of the lift by the abnormal rotor, and that in the second mode, delivering a control signal only to the normal rotor for increasing the rotation of the normal rotor,
- wherein by the control program, the computer executes processing to perform operations further comprising equalizing values of lifts in each of the two quadrants having the rotation directions counter to each other so that an orientation of the aircraft about a yaw axis are balanced, and for equalizing values of lifts in each of the first to fourth quadrants so that the orientation about a roll axis and a pitch axis are balanced.

14. An aircraft having a plurality of dense rotors, each of the dense rotors comprising a main rotor rotating around a first rotation shaft and an auxiliary rotor rotating around a second rotation shaft, the second rotation shaft being parallelly away from the first rotation shaft in a cross sectional plane vertical to a rotation plane of the main rotor, the second rotation shaft being rotated by a power-drive system independent from the first rotation shaft, the auxiliary rotor rotating in a same direction as the main rotor, the rotation planes of the main and auxiliary rotors being away from each other in the cross sectional plane, and the rotation planes of the main and auxiliary rotors partially overlapping with each other, the aircraft comprising:
- an airframe in which a gravity center for first to fourth quadrants is defined in a planar pattern;
- a main wing configured to generate lifts by advancement of the airframe, the main wing being fixed to a center of the airframe;
- the dense rotors arranged in the first to fourth quadrants to generate lifts in a same direction independently in the first to fourth quadrants; and
- a controller configured to control rotations of the dense rotors with first and second modes, such that in the first mode, the controller delivers a same control signal for rotating the dense rotors in each of the first to fourth quadrants at a same rotation frequency, and in response to one of the main and auxiliary rotors in any one of the first to fourth quadrants becoming abnormal and a value of lift in an abnormal quadrant becoming insufficient, the controller delivers the same control signal for increasing a rotation of a normal rotor other than the abnormal rotor for compensating a decrease of the lift by the abnormal rotor, and in the second mode, the controller delivers a control signal only to the normal rotor for increasing the rotation of the normal rotor,
- wherein the dense rotors in another quadrant adjacent to the first quadrant are rotated in a direction counter to a rotation direction of the dense rotor in the first quadrant, and
- wherein, values of the lifts in each of the two quadrants having the rotation directions counter to each other are equalized for balancing an orientation of the aircraft about a yaw axis, and the values of the lifts in the first to fourth quadrants are equalized for balancing the orientation about a roll axis and a pitch axis.

15. The aircraft of claim 14, wherein the dense rotors are arranged on at least one of a nose of the airframe, a side in an advancing direction of the main wing, and a side opposite to the advancing direction of the main wing.

16. The aircraft of claim 14, further comprising a tail wing provided to a rear portion of the airframe, wherein the dense rotors are arranged on at least one of a side in an advancing direction of the tail wing and the side opposite to an advancing direction of the main wing.

* * * * *